United States Patent
Kasahara

(10) Patent No.: US 6,531,804 B2
(45) Date of Patent: Mar. 11, 2003

(54) ELECTROSTATIC ACTUATOR

(75) Inventor: Akihiro Kasahara, Sambu-gun (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 09/970,943

(22) Filed: Oct. 5, 2001

(65) Prior Publication Data

US 2002/0074896 A1 Jun. 20, 2002

(30) Foreign Application Priority Data

Oct. 6, 2000 (JP) ........................................ 2000-307728

(51) Int. Cl.⁷ .............................. H02K 1/00; G02B 7/04
(52) U.S. Cl. ..................... 310/309; 396/75; 396/133; 348/374; 310/12; 359/823
(58) Field of Search ................................ 310/309, 112; 318/116; 396/75, 661, 439, 133; 348/374; 359/823, 824

(56) References Cited

U.S. PATENT DOCUMENTS

| 5,235,225 | A | * | 8/1993 | Colgate et al. ................ 310/12 |
| 5,523,639 | A | * | 6/1996 | Okamoto et al. ........... 310/309 |
| 2001/0028203 | A1 | * | 10/2001 | Kasahara et al. ........... 310/309 |
| 2002/0037171 | A1 | * | 3/2002 | Kashara ........................ 396/661 |
| 2002/0050764 | A1 | * | 5/2002 | Koga et al. .................. 310/309 |
| 2002/0074896 | A1 | * | 6/2002 | Kasahara ..................... 310/309 |
| 2002/0106204 | A1 | * | 8/2002 | Miyamaru .................... 396/89 |

FOREIGN PATENT DOCUMENTS

| JP | 03-169278 | * | 11/1989 | ............ H02N/11/00 |
| JP | 08-33361 | * | 2/1996 | ............ H02N/1/00 |
| JP | 09-163761 | * | 6/1997 | ............ H02N/1/00 |
| JP | 10-239578 | * | 9/1998 | ............ G02B/7/04 |
| JP | 10-239740 | * | 9/1998 | ............ G02B/7/04 |
| JP | 11-004803 | * | 1/1999 | ............ G02B/7/04 |
| JP | 11-281870 | * | 10/1999 | ............ G02B/7/04 |

OTHER PUBLICATIONS

"Electrostatic Linear Micro Actuators with Vibrating Motion for Pan–tilt Drive of a Micro CCD Camera", Koga et al.Jan. 1996.*

"Attachment/Detachment Electrostatic Micro Actuator for Pan–Tilt Drive of Micro CCD Camera", Koga et al.Jan. 1996.*

"Electrostatic Linear Microactuator Mechanism for Focusing a CCD Camera", Koga et al.Jan. 1999.*

U.S. patent application Ser. No. 09/818,840, Filed Mar. 28, 2001, Pending.

U.S. patent application Ser. No. 09/964,699, Filed Sep. 28, 2001, Pending.

U.S. patent application Ser. No. 09/963,424, Filed Sep. 27, 2001, Pending.

U.S. patent application Ser. No. 09/970,943, Filed Oct. 05, 2001, Pending.

U.S. patent application Ser. No. 09/984,686, Filed Oct. 31, 2001, Pending.

* cited by examiner

Primary Examiner—Karl Jamai
(74) Attorney, Agent, or Firm—Oblon, Spivak, McClelland, Maier & Neustadt, P.C.

(57) ABSTRACT

An electrostatic actuator comprises stators a movable section, and a holder. The stator is fixed to the holder and forms a stator frame together with the holder. The stator is mounted to the holder, faces the stator, and is positioned a predetermined distance away from the stator. Stripe-shaped stator electrodes extending in a predetermined direction are formed on the stators. The movable section comprises a support body arranged within a predetermined clearance and movable in a predetermined direction and movable section electrodes formed on the surface of the support body and positioned to face the stator electrodes. The movable section electrodes are arranged deviant in the moving direction, and the movable section electrodes are arranged deviant in the direction opposite to the moving direction. The movable section is attracted by applying voltage at a predetermined timing to each of the stator electrodes so as to move the movable section.

14 Claims, 30 Drawing Sheets

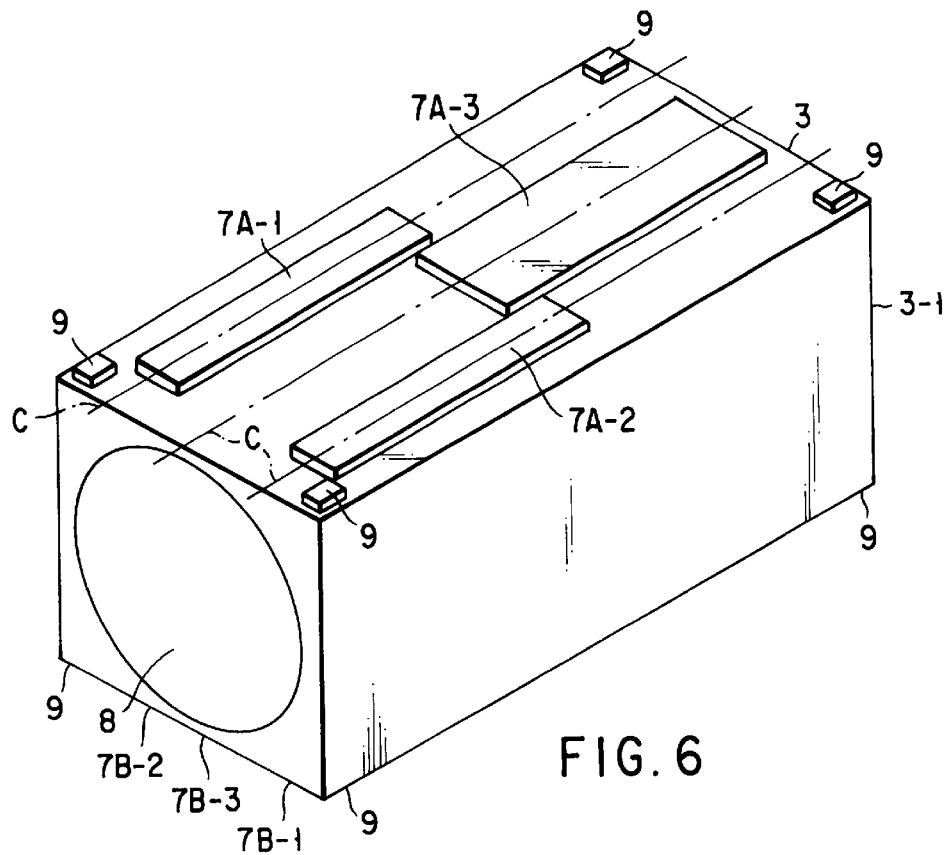
FIG. 6
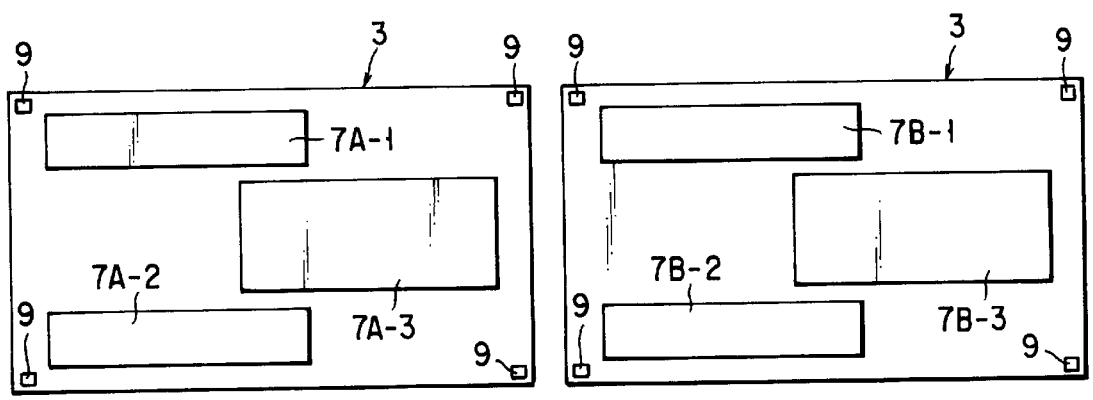
FIG. 7A
FIG. 7B

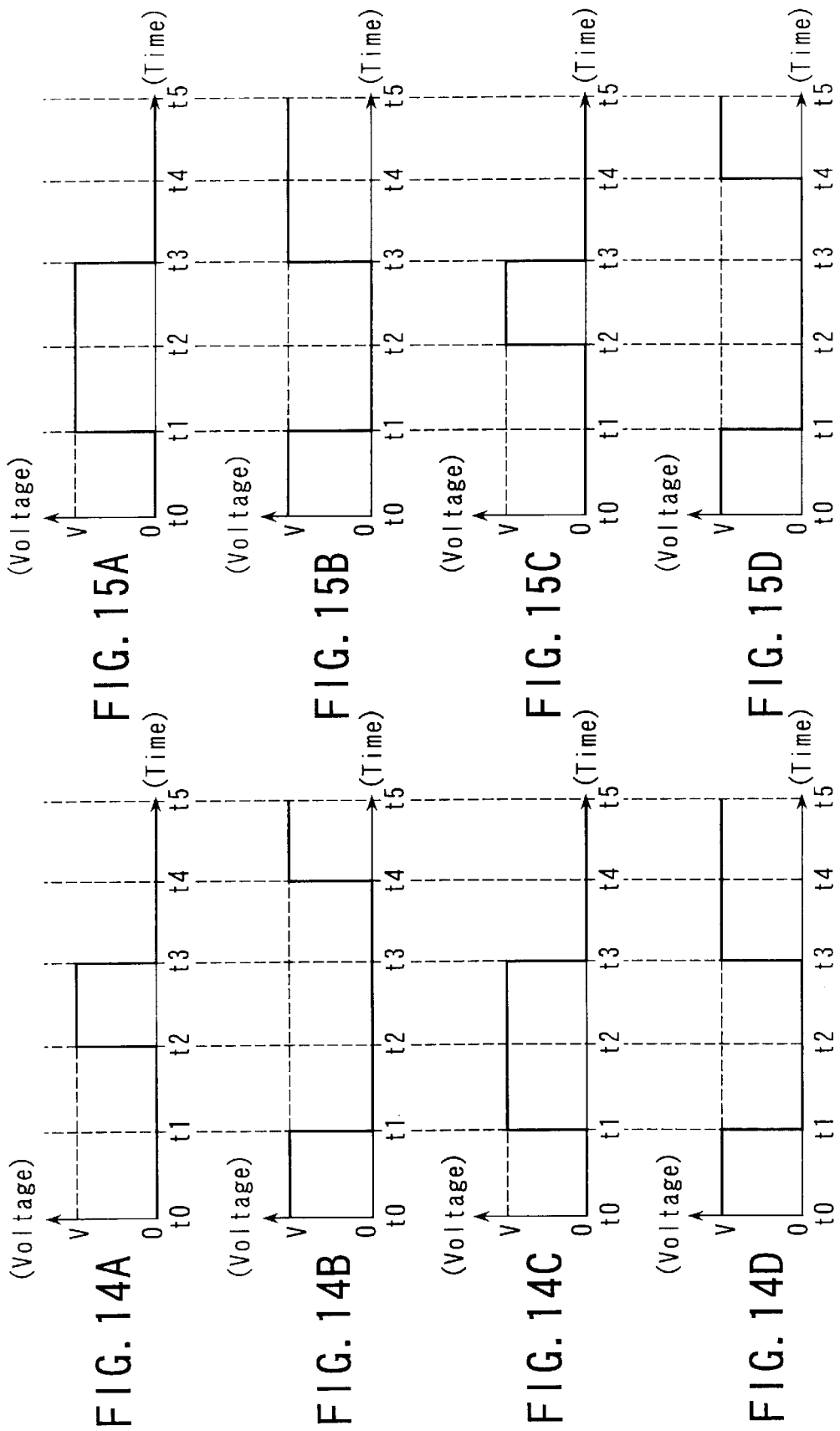

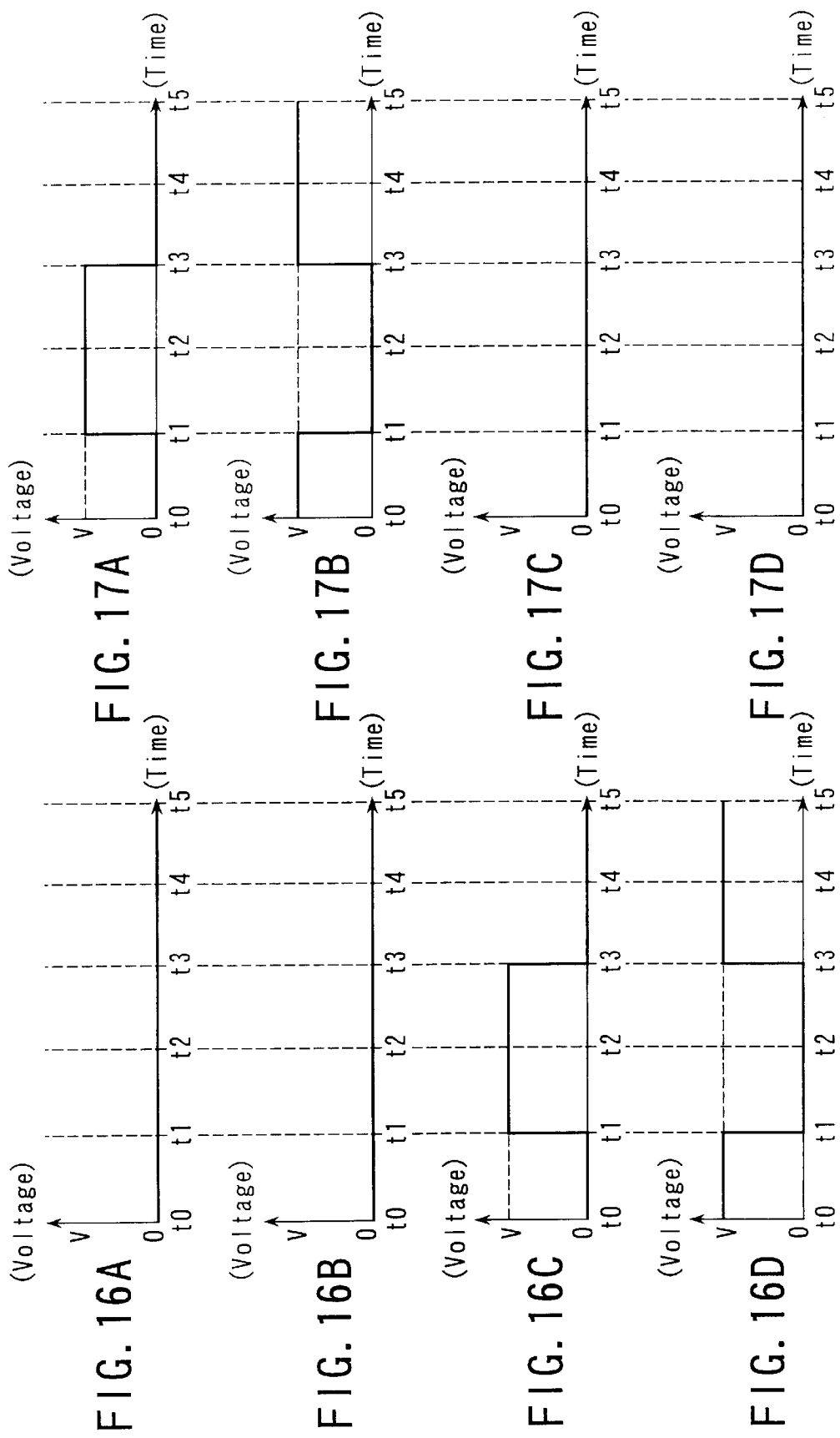

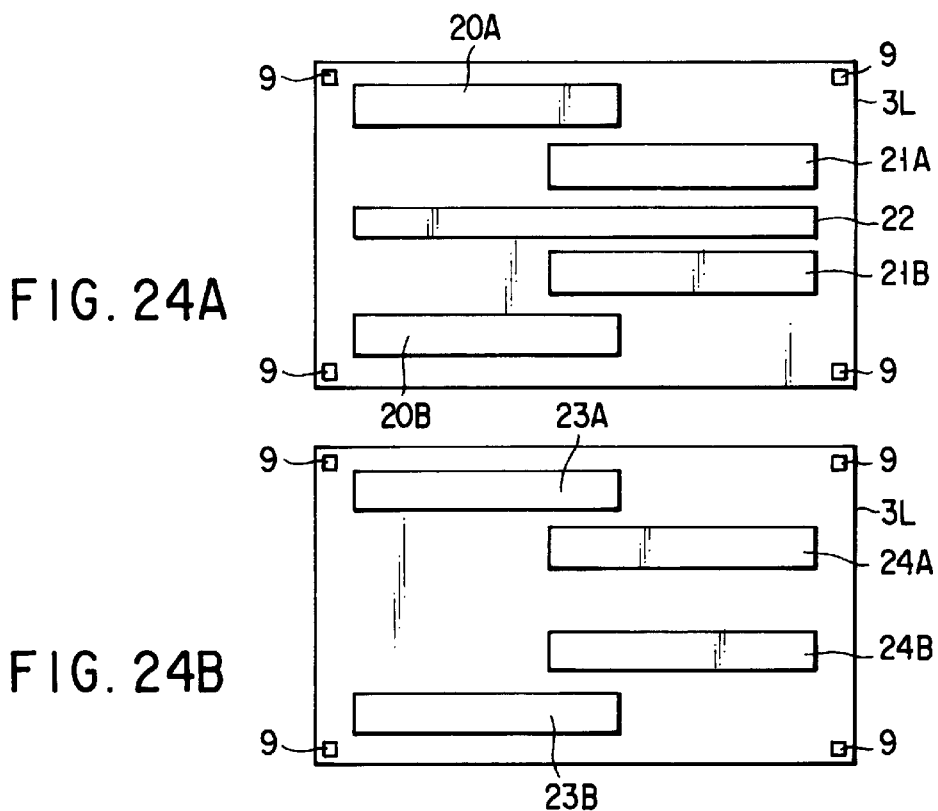
FIG. 24A
FIG. 24B
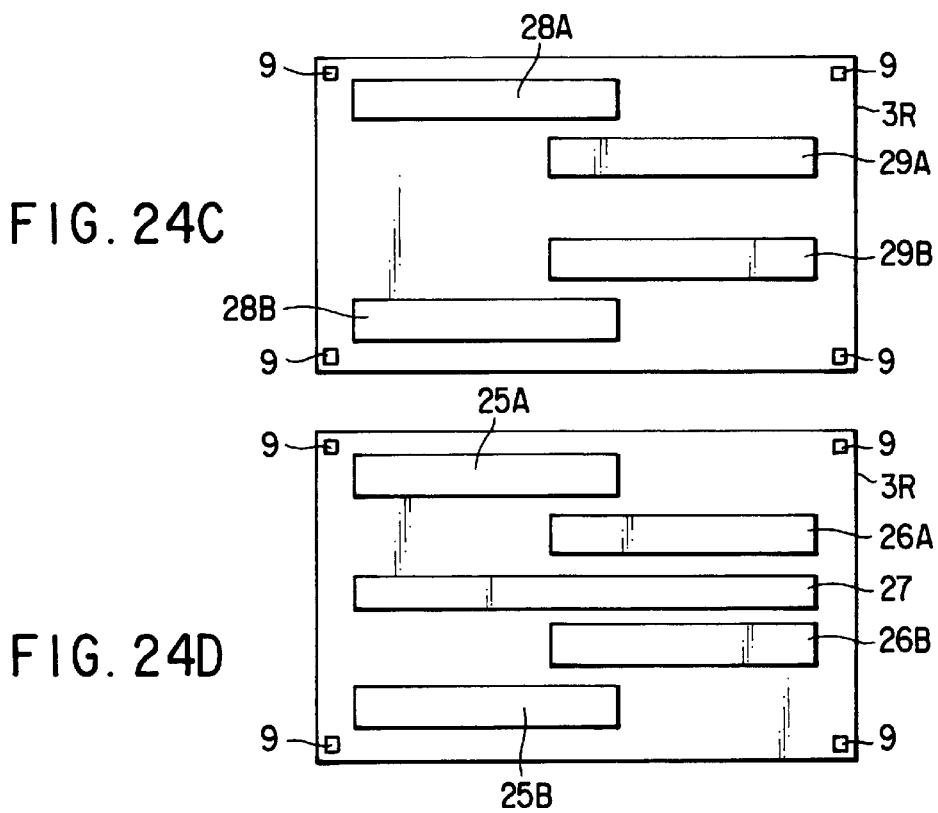
FIG. 24C
FIG. 24D

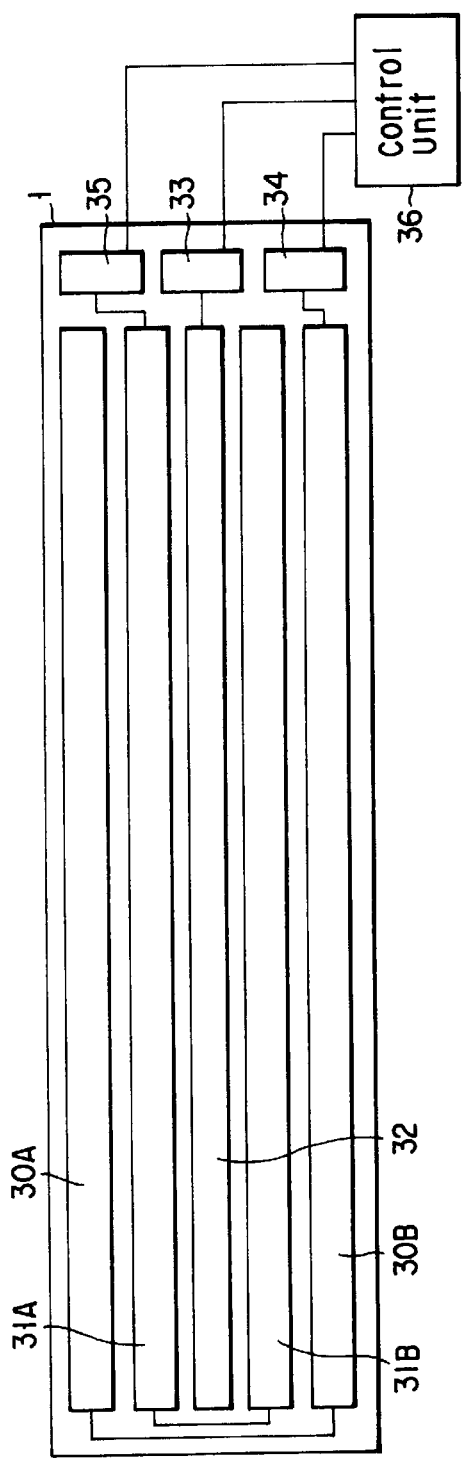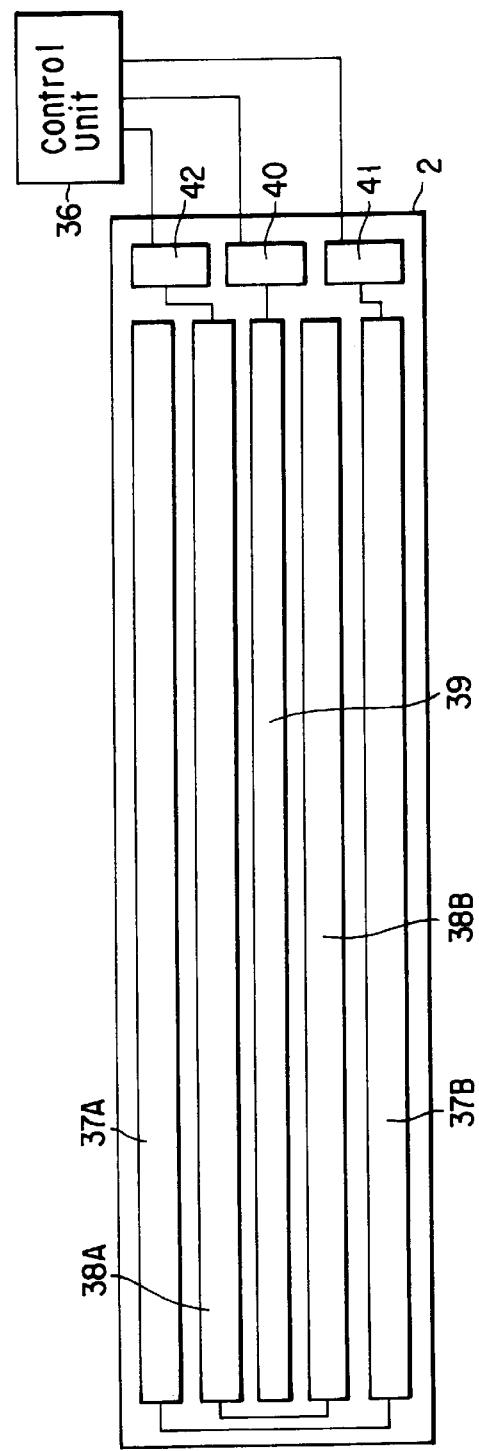
FIG. 25A
FIG. 25B

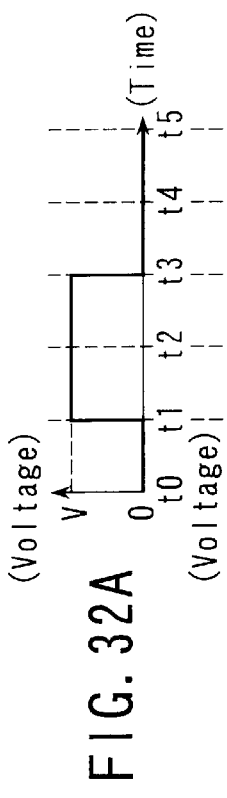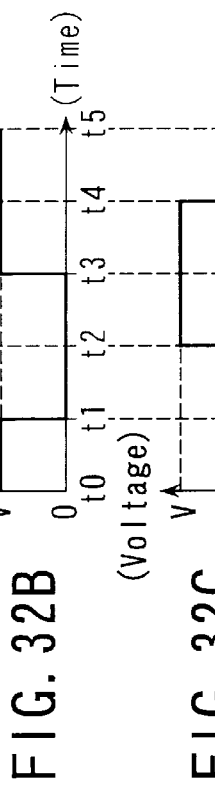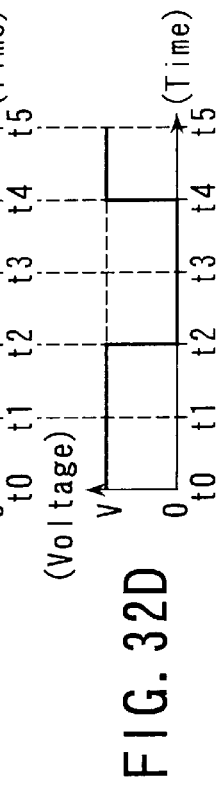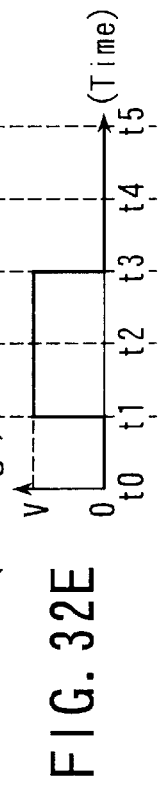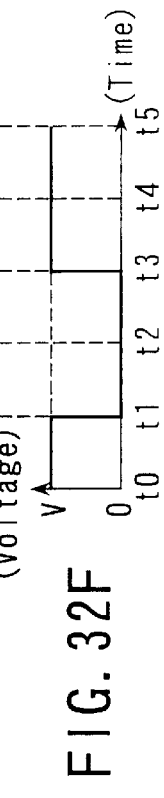
FIG. 32A FIG. 32B FIG. 32C FIG. 32D FIG. 32E FIG. 32F
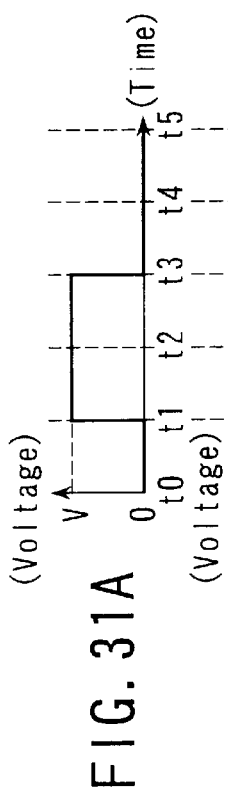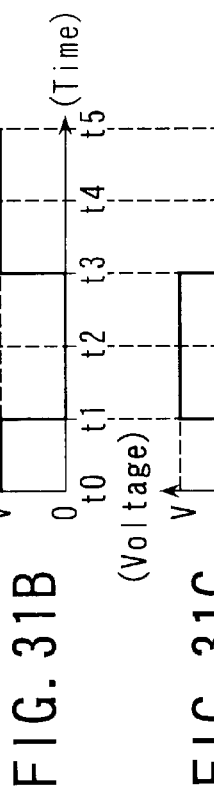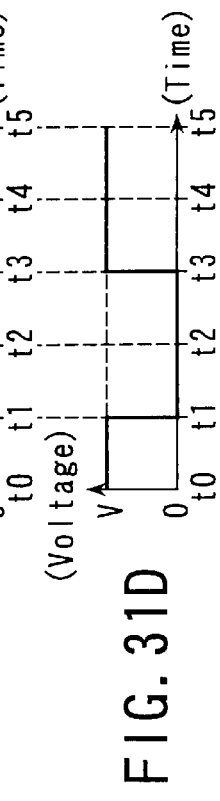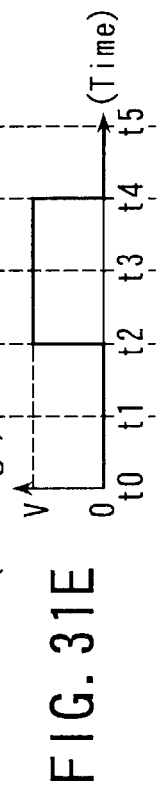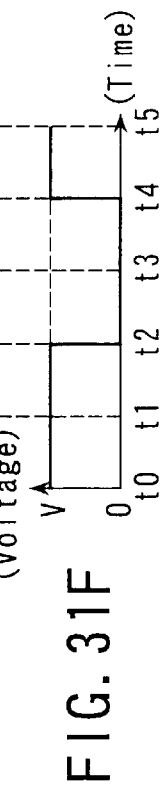
FIG. 31A FIG. 31B FIG. 31C FIG. 31D FIG. 31E FIG. 31F

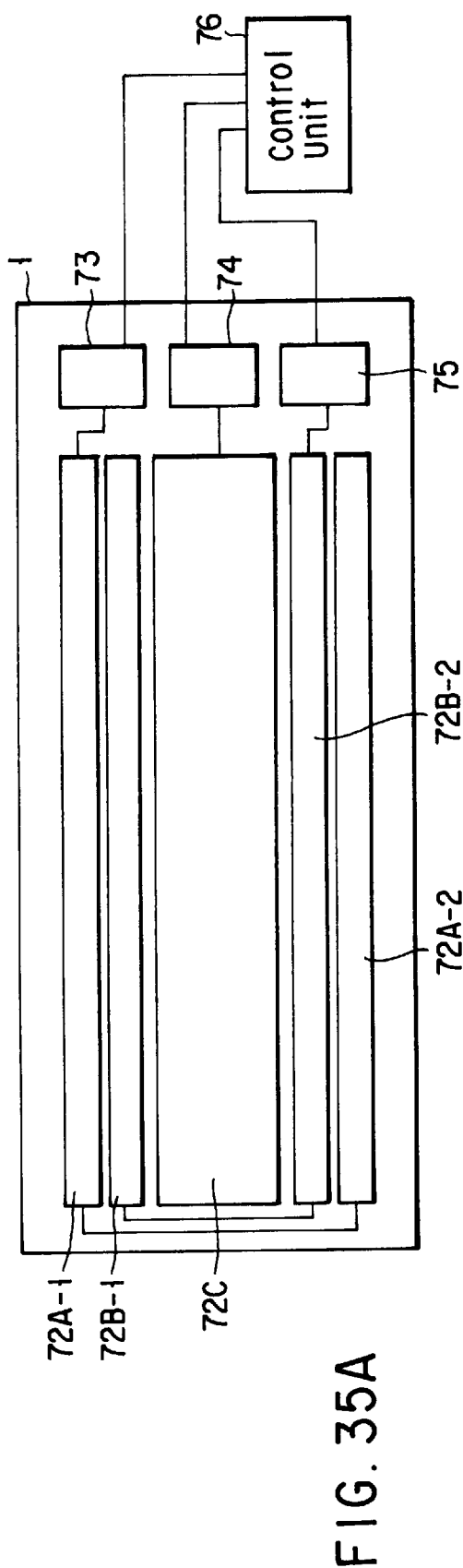
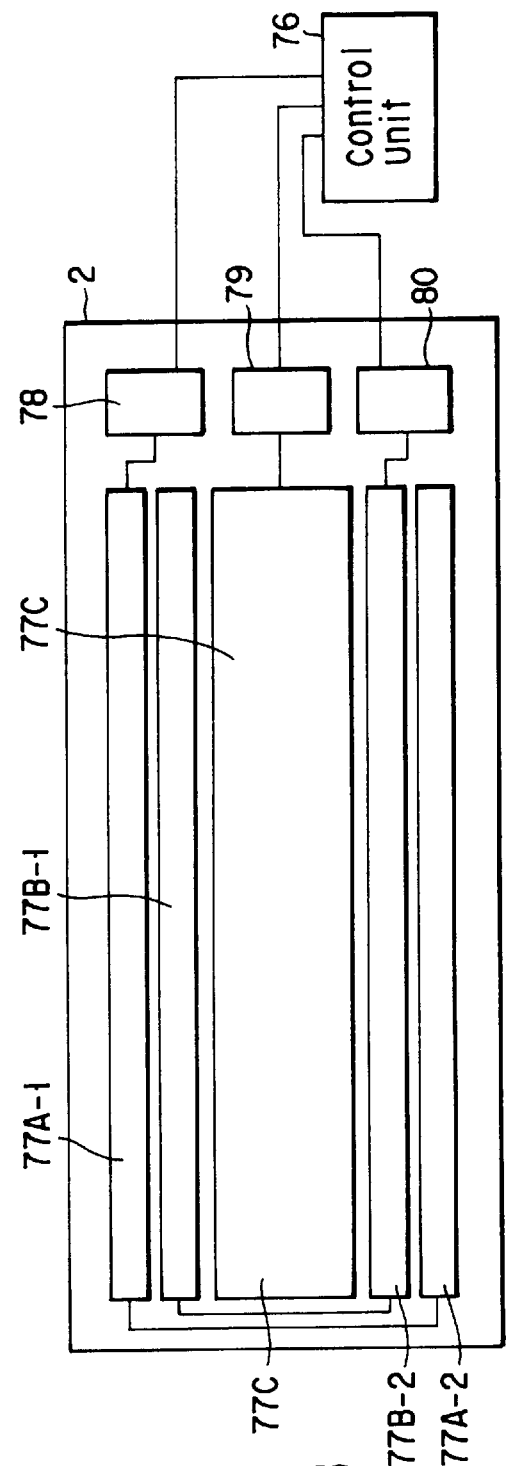
FIG. 35A
FIG. 35B

ELECTROSTATIC ACTUATOR

CROSS-REFERENCE TO RELATED APPLICATIONS

This application is based upon and claims the benefit of priority from the prior Japanese Patent Application No. 2000-307728, filed Oct. 6, 2000, the entire contents of which are incorporated herein by reference.

BACKGROUND OF THE INVENTION

1. Field of the Invention

The present invention relates to an electrostatic actuator.

2. Description of the Related Art

An electrostatic actuator is a kind of an actuator for driving a movable section by an electrostatic force. The basic construction of the electrostatic actuator is disclosed in, for example, Japanese Patent Disclosure (Kokai) No. 8-140367. The electrostatic actuator, which is small and lightweight, can be mounted to, for example, an endoscope, a movable telephone such as a portable telephone, and various PDA (Personal Digital Assistant) for the focusing of the lens system. Such being the situation, the electrostatic actuator attracts keen attentions in recent years.

FIG. 1 is an oblique view showing in a dismantled fashion a conventional electrostatic actuator 100. As shown in FIG. 1, the electrostatic actuator 100 comprises stators 101A, 101B each being in the shape of a flat plate, a movable section 102 made of an electrical conductor and substantially in the form of a parallelepiped, and spacers 103A, 103B each being substantially in the form of a parallelepiped.

The stators 101A, 101B are bonded to the spacers 103A, 103B, respectively, in parallel and apart from each other. The movable section 102 is inserted into the space defined by the stators 101A, 101B and the spacers 103A, 103B such that a gap is provided between the movable section 102 and each of the stators 101A, 101B and the spacers 103A, 103B. It should be noted that the movable section 102 is movable along an imaginary axis A equidistant from the stators 101A, 101B and also equidistant from the axis in the longitudinal direction of each of the spacers 103A and 103B.

Oblong stator electrodes 104A, 104B and 105A, 105B are formed by patterning on the mutually facing surfaces of the stators 101A and 101B, respectively. The stator electrodes 104A, 104B, 105A and 105B are substantially equal to each other in the area. As apparent from the drawing, the stator electrode 104A and the stator electrode 105A are positioned to face each other. Likewise, the stator electrode 104B and the stator electrode 105B are positioned to face each other. Also, the stator electrodes 104A and 104B are arranged along the imaginary axis A and formed apart from each other on both sides of the stator 101A. Likewise, the stator electrodes 105A and 105B are arranged like the stator electrodes 104A and 104B and are shaped equal to the stator electrodes 104A and 104B. It should be noted that the gap between the movable section 102 and each of the stators 101A and 101B is set at about several microns.

If voltage of a predetermined pattern is applied to the stator electrodes 104A, 104B, 105A and 105B, the movable section 102 is moved between the stators 101A and 101B so as to be moved microscopically along the imaginary axis A.

The procedure for moving the movable section 102 will now be described with reference to FIGS. 2 to 4E.

FIG. 2 is a sideward cross sectional view schematically showing the construction of the actuator shown in FIG. 1.

FIG. 3A is a waveform diagram showing the voltage pattern of the voltage applied to the stator electrode 105B. FIG. 3B is a waveform diagram showing the voltage pattern of the voltage applied to the stator electrode 105A. FIG. 3C is a waveform diagram showing the voltage pattern of the voltage applied to the stator electrode 104B. Further, FIG. 3D is a waveform diagram showing the voltage pattern of the voltage applied to the stator electrode 104A.

(1) In the first step, voltage V [V] is applied to the stator electrodes 104A, 104B during the time period between time points t0 and t1, as shown in FIGS. 3C and 3D. As a result, the movable section 102 is temporarily attracted to and held by the stator electrodes 104A, 104B by the electrostatic force generated between the stator electrodes 104A and 104B, as shown in FIG. 4A.

(2) In the next step, voltage V [V] is applied to the stator electrode 105B, with voltage V [V] kept applied to the stator electrode 104A, during the time period between time points t1 and t2, as shown in FIGS. 3A and 3D. As a result, one end of the movable section 102 is held by the stator electrode 104A and the movable section 102 is swung about the particular one end in the clockwise direction, as shown in FIG. 4B. In other words, if voltage is applied to the stator electrode 105B with one end of the movable section 102 held by the stator electrode 104A, the other end of the movable section 102 is electrostatically attracted by the stator electrode 105B so as to be held temporarily. It should be noted that the other end of the movable section 102 is slightly moved by a distance δ to the left in FIGS. 4A and 4B, compared with the state (1) shown in FIG. 4A.

(3) Then, voltage V [V] is applied to the stator electrode 105A, with voltage V [V] kept applied to the stator electrode 105B, during the time period between time points t2 and t3, as shown in FIGS. 3A and 3B. As a result, the other end of the movable section 102 is held by the stator electrode 105B, and the movable section 102 is swung about the other end of the movable section 102 in the counterclockwise direction. It follows that the movable section 102 is temporarily held by the stator electrodes 105A and 105B, as shown in FIG. 4C. In other words, since voltage is applied to the stator electrode 105A, with the other end of the movable section 2 held by the stator electrode 105B, one end of the movable section 102 is electrostatically attracted to and held temporarily by the stator electrode 105A. In this case, the movable section 102 is slightly moved to the left in FIG. 4C by a distance 2δ, compared with the state shown in FIG. 4A.

(4) Further, voltage V [V] is applied to the stator electrode 104B, with voltage V [V] kept applied to the stator electrode 105B, during the time period between time points t3 and t4, as shown in FIGS. 3B and 3C. As a result, one end of the movable section 102 is held by the stator electrode 105A, and the movable section 102 is swung about said one end in the counterclockwise direction, as shown in FIG. 4D. In other words, since voltage is applied to the stator electrode 104B, with one end of the movable section 102 held by stator electrode 105A, the other end of the movable section 102 is electrostatically attracted to and temporarily held by the stator electrode 104B. In this case, the other end of the movable section 102 is slightly moved to the left in FIG. 4D by a distance 2 δ, compared with the state shown in FIG. 4A.

(5) Still further, voltage V [V] is applied to the stator electrode 104A, with voltage V [V] kept applied to the stator electrode 104B during the time period between time points t4 and t5, as shown in FIGS. 3C and 3D. As a result, the other end of the movable section 102 is held by the stator electrode 104B, and the movable section 102 is swung about the other end in the clockwise direction. It follows that the movable section 102 is held temporarily by the stator electrodes 104A and 104B. In other words, since voltage is applied to the stator electrode 104A, with the other end of the movable section 102 kept held by the stator electrode 104B, one end of the movable section 102 is electrostatically attracted to and held temporarily by the stator electrode 104A. In this case, the movable section 102 is slightly moved to the left in FIG. 4E by a distance 2δ, compared with the state shown in FIG. 4A.

As described above, it is possible to move the movable section 102 to the left by a desired distance by repeatedly applying the operations described above to the movable section 102.

Incidentally, it is possible to move the movable section 102 to the right in FIGS. 4A to 4E by applying voltage to each of the stator electrodes 104A, 104B, 105A and 105B such that the time is changed from time points t5 to t1, which opposite to the lapse of time shown in FIGS. 3A to 3D.

In the conventional electrostatic actuator of the construction described above, it is certainly possible to move the movable section only within the range in which the movable section can be brought into contact with the stator electrodes. However, it is impossible to move the movable section by a distance larger than the length of the stator electrode, giving rise to the problem that the moving range of the movable section is limited and, thus, the movable section cannot be moved over a wide range.

BRIEF SUMMARY OF THE INVENTION

An object of the present invention is to provide an electrostatic actuator in which the movable section can be moved over a wide range.

According to an aspect of the present invention, there is provided an electrostatic actuator, comprising;
- a first stator provided with a first group including first, second and third stator electrodes extending substantially in a predetermined direction, the first stator electrode of the first group being arranged between the second and third stator electrodes of the first group and electrically isolated from the second and third stator electrodes of the first group, and the second and third stator electrodes of the first group being electrically connected to each other;
- a second stator arranged to face the first stator with a space therebetween, and provided with a second group including first, second and third stator electrodes extending substantially along the predetermined direction, the first stator electrode of the second group being arranged between the second and third stator electrodes of the second group and being electrically isolated from the second and third stator electrodes of the second group, and the second and third stator electrodes of the second group being electrically connected to each other;
- a movable section located in the space to be movable along the predetermined direction and having first and second electrode surfaces which include first and second center regions and are faced to the first and second stators, respectively, the movable section comprising a third group including first, second and third movable section electrodes and extending on the first electrode surfaces substantially in the predetermined direction, and a fourth groups including first, second and third movable section electrodes and extending on the second electrode surface substantially in the predetermined direction, the first centers of the first movable section electrodes of the third and fourth groups being so positioned as to deviate from the first and second center regions in one side of the predetermined direction, respectively, and the second and third centers of the second and third electrodes of the third and fourth groups being so positioned as to deviate from the first and second center regions in the other side of the predetermined direction, respectively.

BRIEF DESCRIPTION OF THE SEVERAL VIEWS OF THE DRAWING

FIG. 6 is an oblique view showing the construction of the movable section included in the electrostatic actuator shown in FIG. 5;

FIGS. 7A and 7B are an upper view and a lower view, respectively, of the movable section shown in FIG. 6;

FIGS. 14A to 14D are graphs showing the driving method of the electrostatic actuator according to the second embodiment of the present invention, which is shown in FIG. 5, i.e., the graphs each showing the relationship between the voltage applied to the stator electrode and time in the case of moving the movable section shown in FIG. 5 to the left;

FIGS. 15A to 15D are graphs showing the driving method of the electrostatic actuator according to the second embodiment of the present invention, which is shown in FIG. 5, i.e., the graphs each showing the relationship between the voltage applied to the stator electrode and time in the case of moving the movable section shown in FIG. 5 to the right;

FIGS. 16A to 16D are graphs showing the driving method of the electrostatic actuator according to the second embodiment of the present invention, which is shown in FIG. 5, i.e., the graphs each showing the relationship between the voltage applied to the stator electrode and time in the case of moving the movable section shown in FIG. 5 to the left;

FIGS. 17A to 17D are graphs showing the driving method of the electrostatic actuator according to the second embodiment of the present invention, which is shown in FIG. 5, i.e., the graph each showing the relationship between the voltage applied to the stator electrode and time in the case of moving the movable section shown in FIG. 5 to the right;

FIGS. 24A and 24B are plan views showing the upper surface and the lower surface, respectively, of one movable section shown in FIG. 23A;

FIGS. 24C and 24D are plan views showing the upper surface and the lower surface, respectively, of the other movable section shown in FIG. 23B;

FIGS. 25A and 25B are plan views each showing the stator of the electrostatic actuator shown in FIG. 22;

FIGS. 31A to 31F are timing charts each showing the relationship between the voltage applied to the stator electrode of the electrostatic actuator shown in FIG. 26 and time, covering the case where the movable section is moved to the left;

FIGS. 32A to 32F are timing charts each showing the relationship between the voltage applied to the stator electrode of the electrostatic actuator shown in FIG. 26 and time, covering the case where the movable section is moved to the right;

FIGS. 35A and 35B are plan views each showing the stator included in the electrostatic actuator shown in FIG. 33;

DETAILED DESCRIPTION OF THE INVENTION

An electrostatic actuator according to one embodiment of the present invention will now be described with reference to the accompanying drawings.

An electrostatic actuator, which is small and lightweight, is used for the focusing of a lens system incorporated in, for example, an endoscope, a movable telephone such as a portable telephone, or various PDA (Personal Digital Assistants) or used as an apparatus for magnifying or diminishing the image to be photographed.

First Embodiment

FIGS. 5 to 12D collectively show an electrostatic actuator according to a first embodiment of the present invention.

Figure 1:
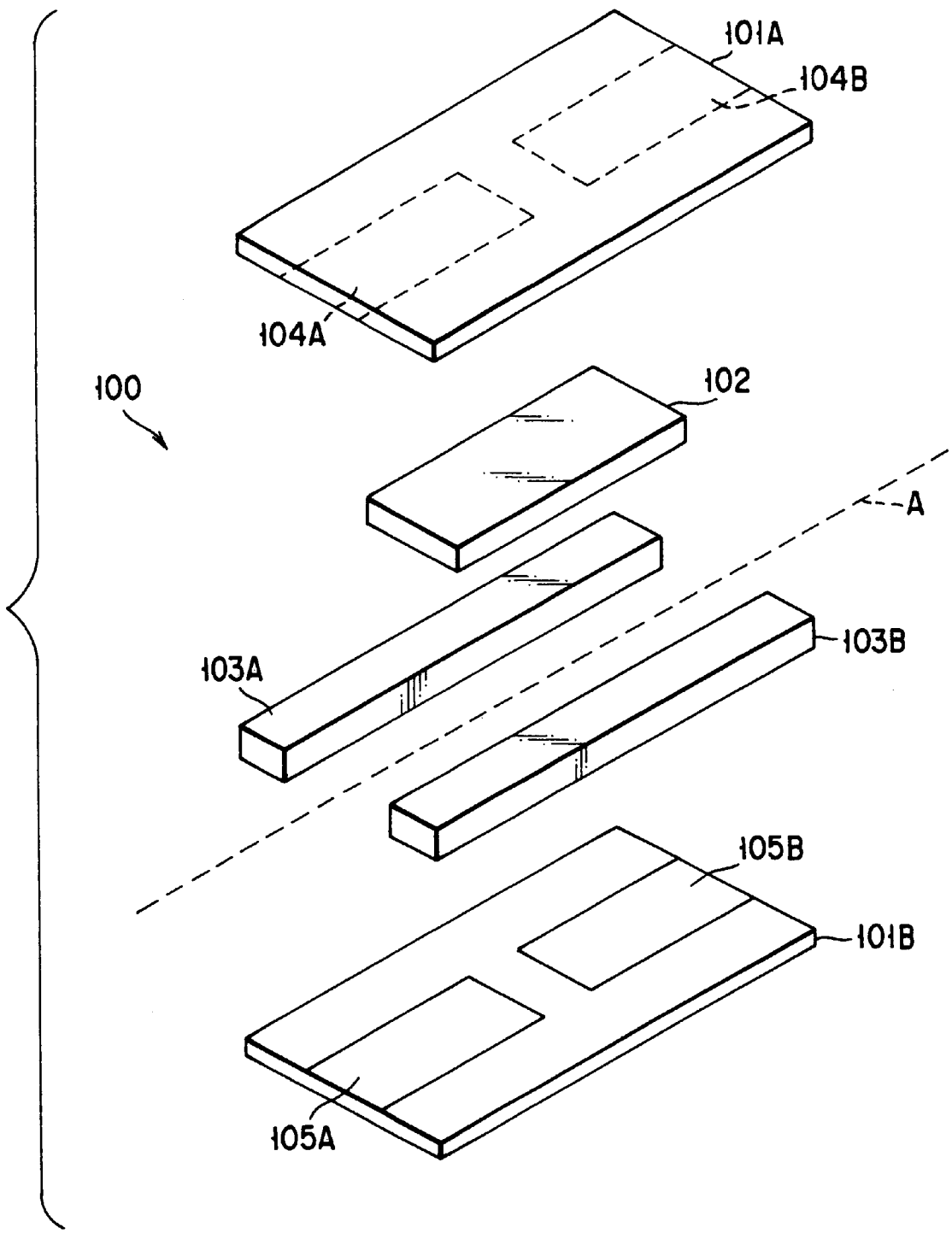
FIG. 1 is an oblique view schematically showing in a dismantled fashion the construction of a conventional electrostatic actuator.
Figure 2:
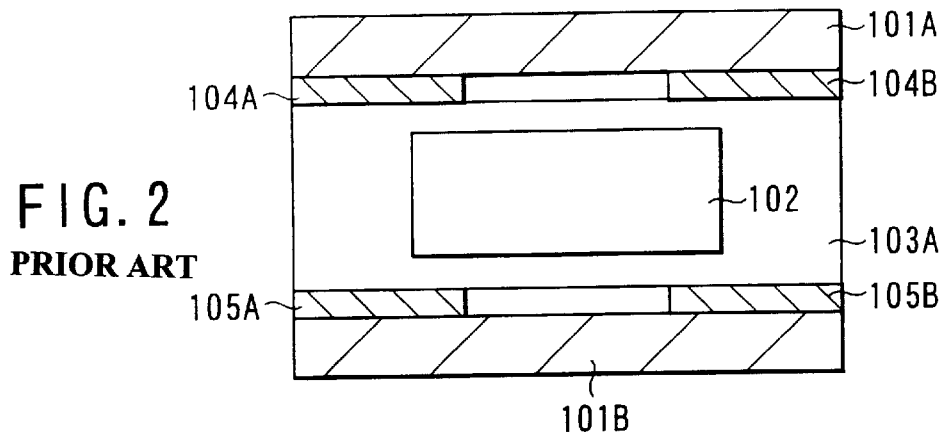
FIG. 2 is a front view showing the conventional electrostatic actuator shown in FIG. 1.
Figure 3A:
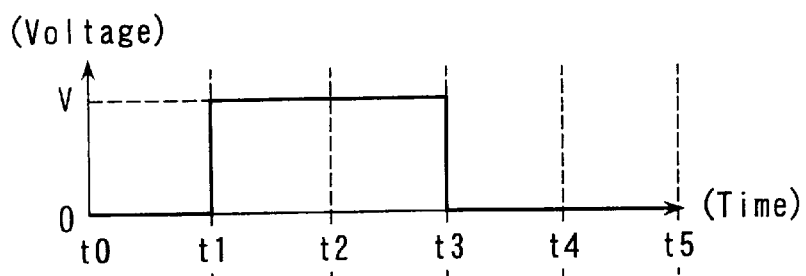
FIGS. 3A to 3D are graphs showing the relationship between the voltage applied to the stator electrode and time in the case where the movable section shown in FIG. 1 is moved to the left.
Figure 3B:
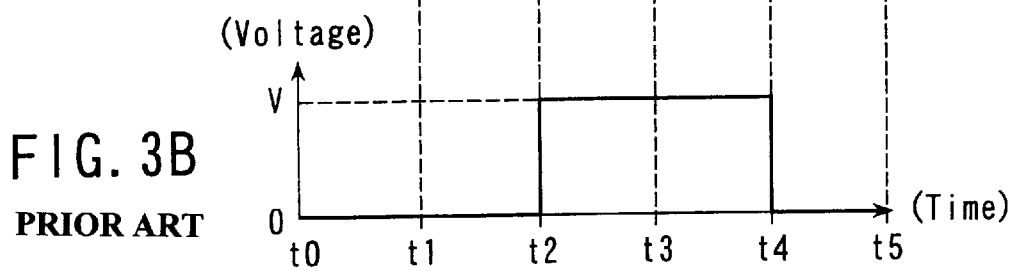
Figure 3C:
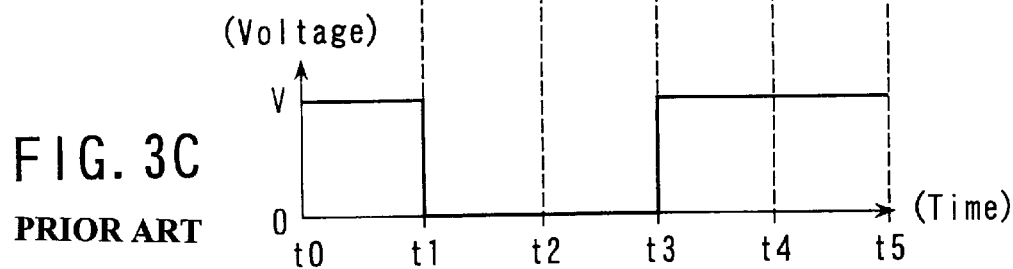
Figure 3D:
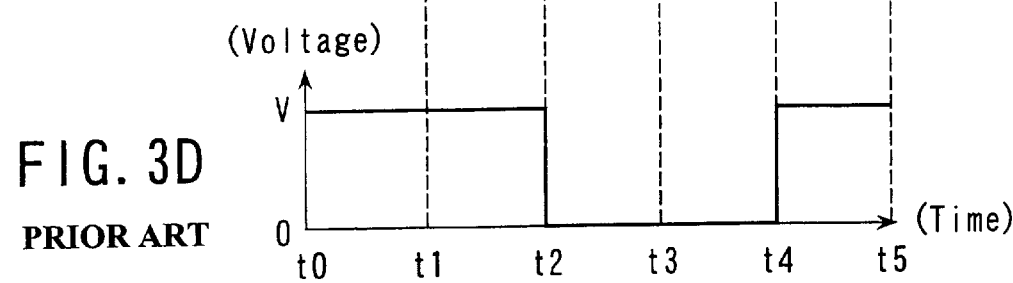
Figure 4A:
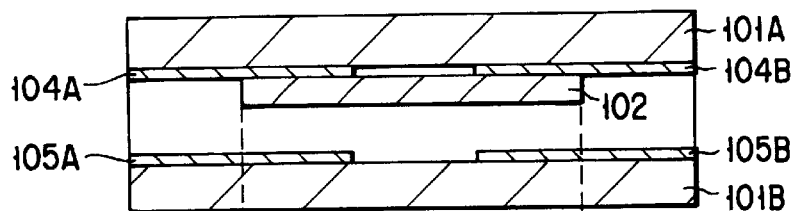
FIGS. 4A to 4E are vertical cross sectional views of the electrostatic actuator for explaining the operation of the movable section shown in FIG. 1.
Figure 4B:
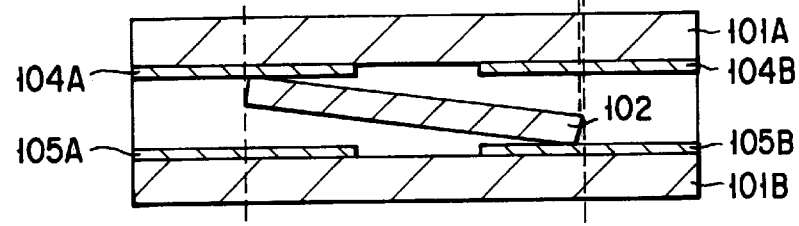
Figure 4C:
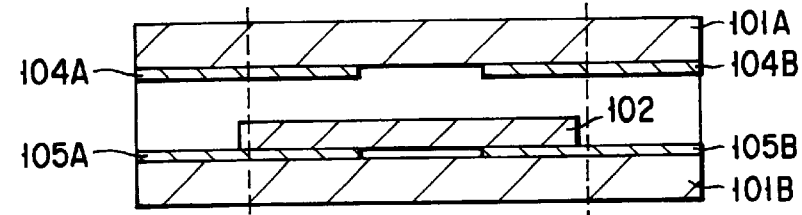
Figure 4D:
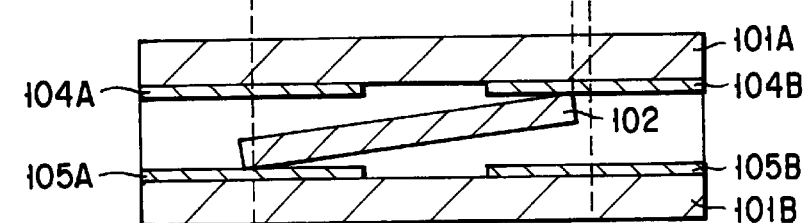
Figure 4E:
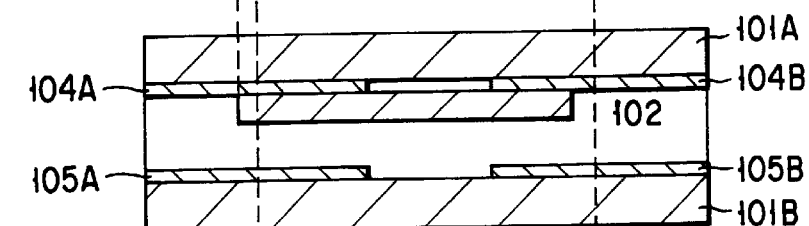
Figure 5:
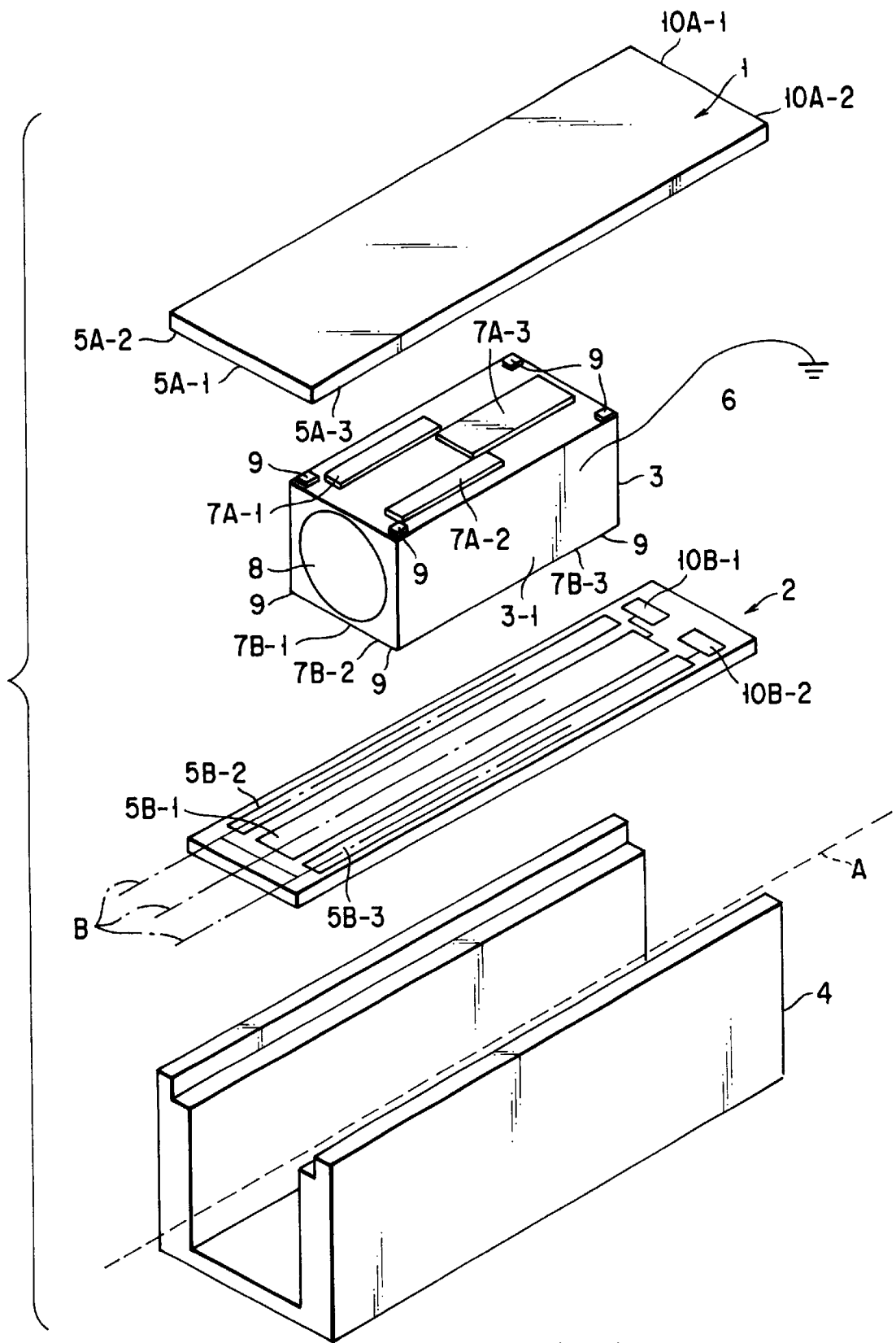
FIG. 5 is an oblique view schematically showing in a dismantled fashion an electrostatic actuator according to one embodiment of the present invention.

Specifically, FIG. 5 is an oblique view showing in a dismantled fashion the electrostatic actuator according to the first embodiment of the present invention. As shown in FIG.

5, the electrostatic actuator according to the first embodiment of the present invention comprises stators or fixing sections 1 and 2 each shaped like a flat plate and formed of a glass having a high electric resistance. Stripe-shaped electrodes extending in a predetermined direction are formed on the surface of each of these stators 1 and 2, and these stators 1 and 2 are arranged to face each other. A movable section 3 in the form of a parallelepiped and movable in a predetermined direction is arranged between the flat plate-like stators 1 and 2. A plurality of conductive members are formed on the front and back surfaces of the movable section 3 in a manner to face the plural stripe-shaped electrodes of the stators 1 and 2. The stator 1 is fitted into a holder 4 having a substantially U-shaped cross section. The holder 4 is in the form of a hollow frame so as to define the moving path in which the movable section 3 is guided. The stator 2 is also fitted into the holder 4 in a manner to face the stator 1 fitted into the holder 4 with a predetermined gap provided between the stators 1 and 2. Also, the movable section 3 is arranged in the moving path defined by the stators 1, 2 and the holder 4 such that a predetermined gap is provided between the movable section 3 and each of the stators 1, 2 and the holder 4. The gap between the movable section 3 and the stator 1 or between the movable section 3 and the stator 2 is set at about 5 microns.

To be more specific, in the stator 1, three oblong stator electrodes 5A-1 to 5A-3 are formed on a glass surface by patterning a conductive film on the glass surface. Likewise, a stator electrode terminal 10A-1 for applying voltage to the stator electrode 5A-1 and a stator electrode terminal 10A-2 for applying the same voltage to the stator electrodes 5A-2 and 5A-3 are formed on the glass surface of the stator 1 by patterning a conductive film. The stator electrode 5A-1 is formed in the central region of the stator 1, and the stator electrodes 5A-2 and 5A-3 are arranged on both sides of the stator electrode 5A-1. Further, these stator electrodes 5A-1 to 5A-3 are arranged apart from each other in a manner to form columns extending in the longitudinal direction of the stator 1, and each of these stators 5A-1 to 5A-3 has a length substantially equal to the length of the stator 1. Still further, the stator electrodes 5A-2 and 5A-3 are equal to each other in width.

Three oblong stator electrodes 5B-1 to 5B-3 are formed on a glass surface of the stator 2 by patterning a conductive film formed on the glass surface. Likewise, a stator electrode terminal 10B-1 for applying voltage to the stator electrode 5B-1 and a stator electrode terminal 10B-2 for applying the same voltage to the stator electrodes 5B-2 and 5B-3 are formed on a glass surface of the stator 2 by patterning a conductive film formed on the glass surface. The stator electrode 5B-1 is formed in the central region of the stator 2, and the stator electrodes 5B-2 and 5B-3 are arranged on both sides of the stator electrode 5B-1. Further, these stator electrodes 5B-1 to 5B-3 are arranged apart from each other in a manner to form columns extending in the longitudinal direction of the stator 2, and each of these stators 5B-1 to 5B-3 has a length substantially equal to the length of the stator 2. Still further, the stator electrodes 5B-2 and 5B-3 are equal to each other in width.

Incidentally, each of the stator electrodes and each of the terminals of the stator electrodes can be formed by patterning a conductive film formed on the glass surface by means of an etching process, by bonding a metal thin film to the glass surface, by depositing a conductive film on the glass surface by means of a sputtering method or a vapor deposition method, or by depositing a conductive film on the glass surface by means of a CVD (Chemical Vapor Deposition) method. Also, in a laminate structure in which the electrodes are stacked one upon the other, it is necessary to form an insulating film between the adjacent electrodes. The insulating film can also be formed by the method equal to the method of forming the electrode. Incidentally, the insulating film is formed of a material having a high electrical resistivity, e.g., silicon oxide.

The movable section 3 comprises a support body 3-1 made of an electrical conductor or a resistor. The support body 3-1 is substantially in the form of a hollow parallelepiped, and a plurality of lenses 8, which are to be moved, are arranged in the hollow portion of the support body 3-1. Three movable section driving electrodes 7A-1 to 7A-3 each formed of a conductive material are formed on the upper surfaces of the support body 3-1. Also, flat plate-like movable section electrodes 7B-1 to 7B-3 (conductive members) each formed of a conductive material are formed on the lower surface of the support body 3-1. Further, stoppers 9 having the same shape and size are formed in the four corners on the upper surface and the lower surface of the support body 3-1, and a wire 6 having one end connected to the ground for removing the electric charge accumulated in the support body 3-1 is connected to the support body 3-1. It should also be noted that the movable section driving electrodes 7A-1 to 7A-3 are arranged to face the stator electrode 5A-1 to 5A-3, and the movable section driving electrodes 7B-1 to 7B-3 are arranged to face the stator electrodes 5B-1 to 5B-3. Each of the movable section driving electrodes 7A-1 to 7A-3 and 7B-1 to 7B-3 has a length which is substantially half the length of the movable section 3. Also, each of the movable section driving electrodes 7A-1 and 7A-2 extends from the central region of the movable section 3 toward one end in the moving direction of the movable section 3, and the movable section driving electrode 7A-3 extends from the central region of the movable section 3 toward the other end in the moving direction of the movable section 3.

FIG. 6 is an oblique view showing in a magnified fashion the movable section 3. FIG. 7A is a plan view showing the upper surface of the movable section 3 on which are formed the movable section driving electrodes 7A-1 to 7A-3. Further, FIG. 7B is a plan view showing the lower surface of the movable section 3 on which are formed the movable section driving electrodes 7B-1 to 7B-3.

The movable section driving electrodes 7A-1, 7A-2, 7B-1, and 7B-2 are substantially equal to each other in the shape and size. Also, the movable section driving electrodes 7A-1, 7A-2, 7A-3, 7B-1, 7B-2 and 7B-3 are substantially equal to each other in length. Further, the movable section driving electrodes 7A-1 and 7B-1 has a width substantially half the width of the movable section driving electrodes 7A-3 and 7B-3, respectively. Still further, the movable section driving electrodes 7A-1 to 7A-3 and 7B-1 to 7B-3 are substantially equal to each other in the height (thickness). Incidentally, the lower surface of the movable section 3 on which are formed the movable section driving electrodes 7B-1 to 7B-3 is substantially equal in construction to the upper surface of the movable section 3 on which are formed the movable section driving electrodes 7A-1 to 7A-3. In other words, the movable section driving electrode 7A-1, the movable section driving electrode 7A-2, and the movable section driving electrode 7A-3 are formed on the upper surface of the movable section 3 in a manner to correspond to the movable section driving electrode 7B-1, the movable section driving electrode 7B-2 and the movable section driving electrode 7B-3, respectively.

The movable section driving electrodes 7A-1 and 7B-1 are arranged in symmetry with respect to the plane including the center of gravity of the movable section 3. Likewise, the movable section driving electrodes 7A-2 and 7B-2 are arranged in symmetry with respect to the plane including the center of gravity of the movable section 3, and the movable section driving electrodes 7A-3 and 7B-3 are arranged in symmetry with respect to the plane including the center of gravity of the movable section 3.

Also, the movable section driving electrode 7A-3 extends between the movable section driving electrodes 7A-1 and 7A-2 in the central region on the upper surface of the movable section 3, and the movable section driving electrode 7B-3 extends between the movable section driving electrodes 7B-1 and 7B-2 in the central region on the lower surface of the movable section 3. The movable section driving electrode 7A-3 is formed in the center and the movable section driving electrodes 7A-1 and 7A-2 are arranged substantially in symmetry with respect to the movable section driving electrode 7A-3. Incidentally, the movable section driving electrodes 7A-1 to 7A-3 are substantially equal to each other in height. Also, the movable electrode driving electrode 7A-1 is substantially equal to the movable section driving electrode 7A-2 in area, and the sum of the areas of the movable section driving electrodes 7A-1 and 7A-2 is substantially equal to the area of the movable section driving electrodes 7A-3. Also, the movable section driving electrode 7B-3 is formed in the center and the movable section driving electrodes 7B-1 and 7B-2 are arranged substantially in symmetry with respect to the movable section driving electrode 7B-3. Incidentally, the movable section driving electrodes 7B-1 to 7B-3 are substantially equal to each other in height. Also, the movable electrode driving electrode 7B-1 is substantially equal to the movable section driving electrode 7B-2 in area, and the sum of the areas of the movable section driving electrodes 7B-1 and 7B-2 is substantially equal to the area of the movable section driving electrodes 7A-3.

Each of the movable section driving electrodes 7A-3 and 7B-3 is arranged on the right side portion in the drawings, and each the movable section driving electrodes 7A-1, 7A-2, 7B-1 and 7B-2 is arranged on the left side portion in the drawing. The center of each of the movable section driving electrodes 7A-1, 7A-2, 7A-3 and the center of each of the movable section driving electrodes 7B-1, 7B-2, 7B-3 is arranged in symmetry with respect to the plane including the center of gravity of the movable section 3 and perpendicular to the longitudinal direction of the movable section driving electrodes 7A-1 to 7A-3 and 7B-1 to 7B-3, and each of the movable section driving electrodes 7A-3 and 7B-3 is shaped in symmetry with respect to the plane noted above. Further, the center of each of the movable section driving electrodes 7A-1, 7A-2, 7A-3, 7B-1, 7B-2 and 7B-3 is substantially equidistant from the center of gravity of the movable section 3. Incidentally, the center of the electrode represents the center of the planar figure corresponding to the shape of the electrode.

Figure 8A:
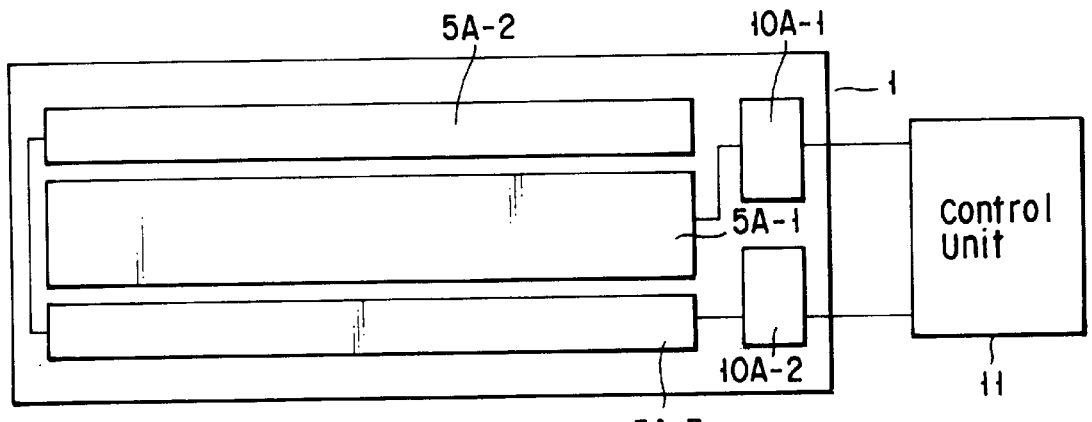
FIGS. 8A and 8B are plan views showing one stator arranged in an upper portion and the other stator arranged in the lower portion, respectively, included in the electrostatic actuator shown in FIG. 5.
Figure 8B:
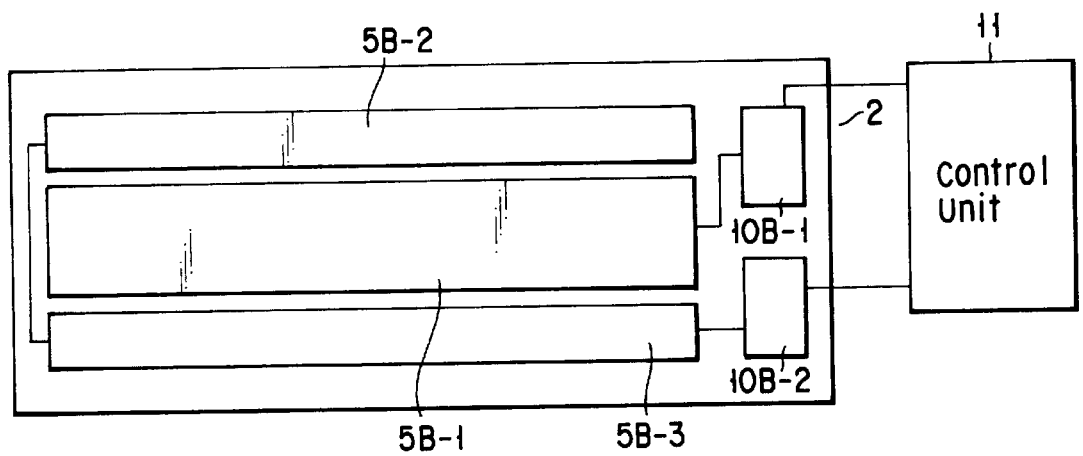

The connection wiring of the stators 1 and 2 will now be described with reference to FIGS. 8A and 8B, wherein FIG. 8A is a plan view of the stator 1, and FIG. 8B is a plan view of the stator 2.

As shown in FIG. 8A, a stator electrode terminal 10A-1, which is connected to a stator electrode 5A-1 by patterning, and a stator electrode terminal 10A-2, which is connected to a stator electrode 5A-3 by patterning, are formed in one side edge portion of the stator 1. The stator electrode 5A-1 and the stator electrode 5A-3 are connected to each other in the other edge portion of the stator 1. Also, each of the stator terminal electrodes 10A-1 and 10A-2 is connected to a control unit 11.

On the other hand, as shown in FIG. 8B, a stator electrode terminal 10B-1, which is connected to a stator electrode 5B-1 by patterning, and a stator electrode terminal 10B-2, which is connected to a stator electrode 5B-3 by patterning, are formed in one side edge portion of the stator 2. The stator electrode 5B-1 and the stator electrode 5B-3 are connected to each other in the other edge portion of the stator 2. Also, each of the stator terminal electrodes 10B-1 and 10B-2 is connected to a control unit 11.

The control unit 11 includes a memory section storing the voltage applied to the stator electrodes 5A-1 to 5A-3 and 5B-1 to 5B-3 and the timing of applying the voltage as a voltage pattern. Voltage is selectively applied to each of the stator electrodes in accordance with the voltage pattern.

The operation of the electrostatic actuator according to the first embodiment of the present invention, which is constructed as described above, will now be described with reference to FIGS. 9 to 13E.

Figure 9:
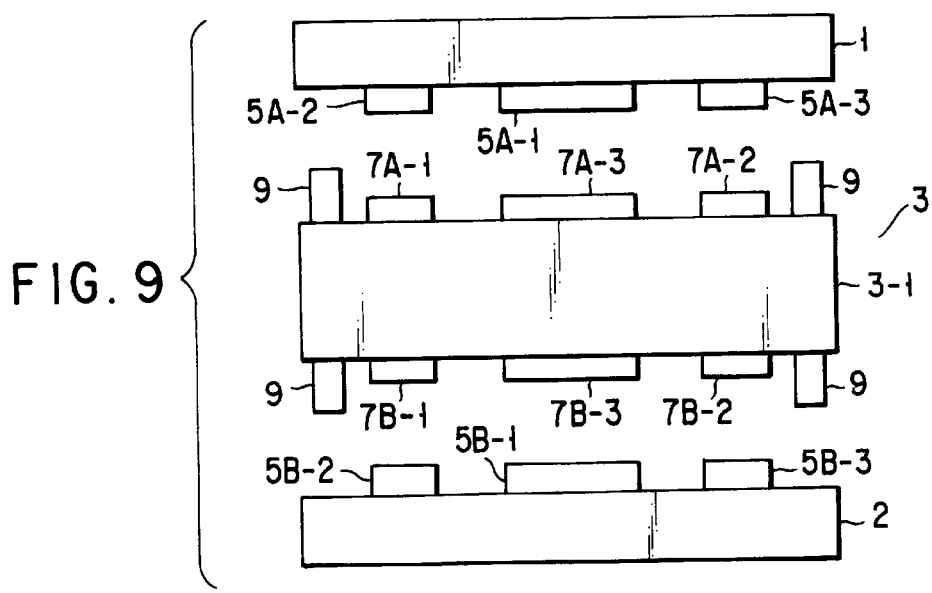
FIG. 9 is a front view showing the electrostatic actuator shown in FIG. 5.
Figure 10A:
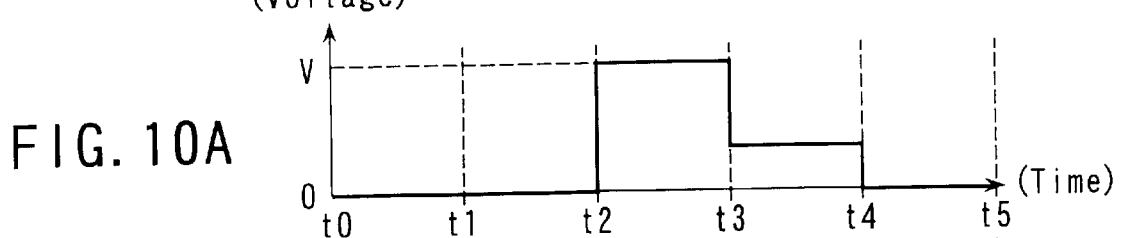
FIGS. 10A to 10D are graphs collectively showing the driving method of the electrostatic actuator according to the first embodiment of the present invention, which is shown in FIG. 5, i.e., the graphs each showing the relationship between the voltage applied to the stator electrode and time in the case of moving the movable section to the left.
Figure 10B:
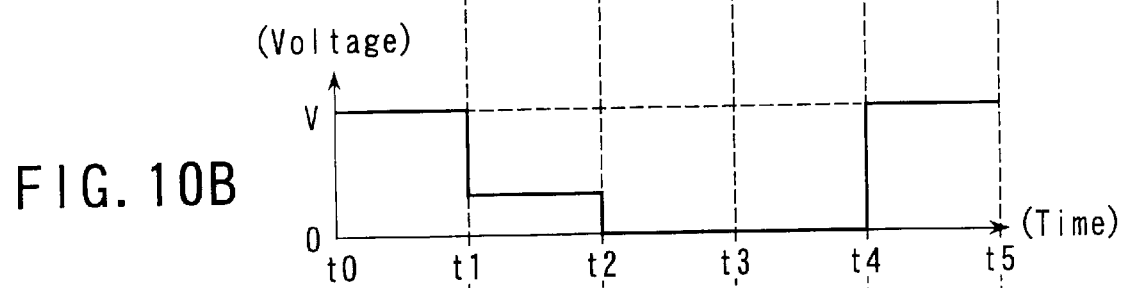
Figure 10C:
Figure 10D:
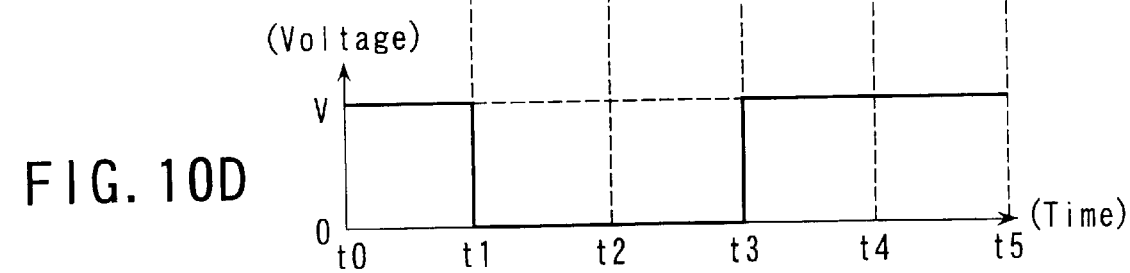

FIG. 9 is a front view as viewed in the moving direction of the electrostatic actuator. FIG. 10A is a timing chart showing the pattern of the voltage applied to the stator electrodes 5A-2 and 5A-3. FIG. 10B is a timing chart showing the pattern of the voltage applied to the stator electrodes 5B-2 and 5B-3. FIG. 10C is a timing chart showing the pattern of the voltage applied to the stator electrodes 5A-1. Further, FIG. 10D is a timing chart showing the pattern of the voltage applied to the stator electrodes 5B-1. Further, each of FIGS. 11A to 11E shows the driving state of the movable section 3. Specifically, each of FIGS. 11A to 11E shows that the movable section 3 is displaced from the state denoted by dotted lines to the state denoted by solid lines.

The following description covers the case where the movable section 3 is moved in a predetermined direction (i.e., in the forward direction in which the movable section 3 is moved to the left in the drawing), as shown in FIGS. 11A to 11E.

Figure 11A:
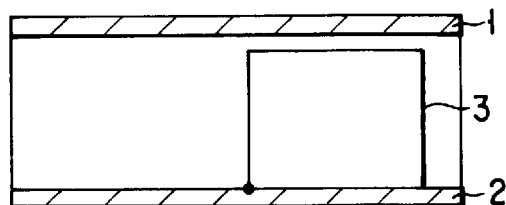
FIGS. 11A to 11E are vertical cross sectional views showing the operation of the electrostatic actuator driven by the voltage shown in FIGS. 10A to 10D, i.e., showing the operation of the electrostatic actuator for explaining the moving operation of the movable section to the left in FIG. 5.

(1) In the first step, voltage V [V] is applied to the stator electrodes 5B-1 to 5B-3 during the time period between time points t0 and t1, as shown in FIGS. 10B and 10D. As a result, the movable section driving electrodes 7B-1 to 7B-3 are electrostatically attracted by the stator electrodes 5B-1 to 5B-3 so as to be held temporarily on the side of the stator 2 under the state that the stopper 9 on the lower surface of the movable section 3 is brought into contact with the stator 2, as shown in FIG. 11A.

Figure 11B:
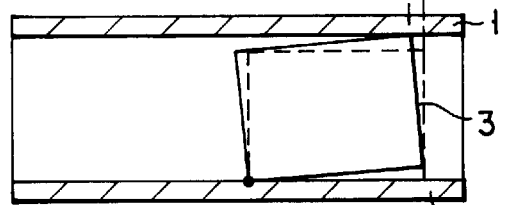

(2) In the next step, voltage V [V] is applied to the stator electrode 5A-1 during the time period between time points t1 and t2, as shown in FIG. 10C, and voltage 1/3V [V] is applied to each of the stator electrodes 5A-2 and 5A-3 as shown in FIG. 10B. As a result, the movable section driving electrode 7A-3 is electrostatically attracted by the stator electrode 5A-1, with the result that the movable section 3 is swung in the counterclockwise direction around a point α as shown in FIG. 11B. It should be noted that the point α represents the contact point between the stopper 9 adjacent to the movable section driving electrodes 7B-1, 7B-2 and the stator 2 and corresponds to the edge of the pair of the stoppers 9 on the side of the lower surface in the moving direction of the movable section 2. The movable section driving electrode 7A-3 is temporarily held by the stator 1 under the state that the stopper 9 is in contact with the stator 1.

Figure 11C:
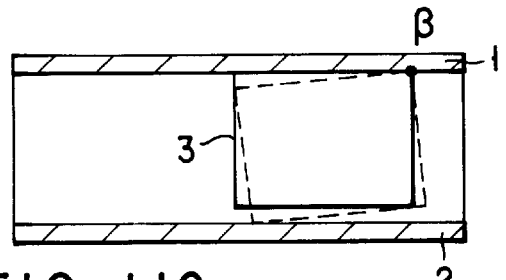

(3) Then, voltage V [V] is applied to the stator electrode 5A-1 during the time period between time points t2 and t3 as shown in FIG. 10C, and voltage V [V] is applied to each of the stator electrodes 5A-2 and 5A-3 as shown in FIG. 10A. As a result, the movable section driving electrodes 7A-1 and 7A-2 are electrostatically attracted by the stator electrodes 5A-2 and 5A-3, with the result that the movable section 3 is swung in the clockwise direction around a point β, as shown in FIG. 11C. It should be noted that the point β represents the contact point between the stopper 9 adjacent to the movable section driving electrode 7A-3 and the stator 1 and corresponds to the edge of the pair of the stoppers 9 on the side of the upper surface in the back side direction opposite to the moving direction of the movable section 3. The movable section 3 is temporarily held by the stator 1 under the state that the stopper 9 close to each of the movable section driving electrodes 7A-1 and 7A-2 is in contact with the stator 1. In this state, the movable section 3 is moved to the left in the drawing by a distance δ, compared with the state shown in FIG. 11A.

Figure 11D:
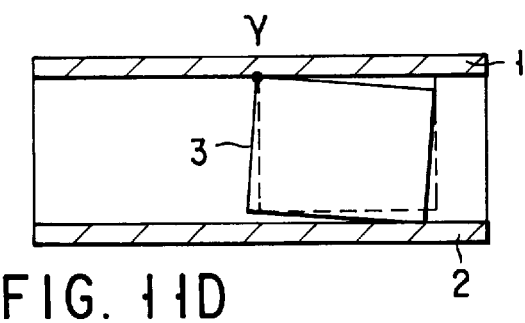

(4) Further, voltage 1/3V [V] is applied to each of the stator electrodes 5A-2 and 5A-3 during the time period between time points t3 and t4 as shown in FIG. 10A, and voltage V is applied to the stator electrode 5B-1 as shown in FIG. 10D. As a result, the movable section driving electrode 7B-3 is electrostatically attracted by the stator electrode 5B-1, with the result that the movable section 3 is swung in the clockwise direction about a point γ, as shown in FIG. 11D. It should be noted that the point γ represents the contact point between the stopper 9 adjacent to the movable section driving electrodes 7A-1, 7A-2 and the stator 1 and corresponds to the edge of the pair of the stoppers 9 on the side of the upper surface in the moving direction of the movable section 3. The movable section 3 is temporarily held by the stator 2 under the state that the stopper 9 close to the movable section driving electrodes 7B-3 is in contact with the stator 2.

Figure 11E:
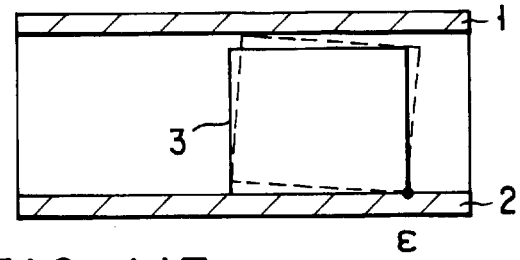

(5) Still further, voltage V [V] is applied to each of the stator electrodes 5B-1 to 5B-3 during the time period between time points t4 and t5 as shown in FIGS. 10B and 10D. As a result, the movable section driving electrodes 7B-1 and 7B-2 are electrostatically attracted by the stator electrodes 5B-2 and 5B-3, with the result that the movable section 3 is swung in the clockwise direction around a point ε, as shown in FIG. 11E. It should be noted that the point ε represents the contact point between the stopper 9 close to the movable section driving electrode 7B-3 and the stator 2 and corresponds to the edge of the pair of stoppers 9 on the side of the lower surface in the back side direction opposite to the moving direction of the movable section 3. The movable section 3 is temporarily held by the stator 2 under the state that the stopper 9 close to each of the movable section driving electrodes 7B-1 and 7B-2 is in contact with the stator 2. In this state, the movable section 3 is moved to the left in the drawing by a distance 2δ, compared with the state shown in FIG. 11A.

As described above, the movable section 3 is moved in a predetermined direction by the voltage pattern shown in FIGS. 10A to 10D. Also, the movable section 3 can be moved by a desired distance to the left as shown in FIGS. 11A to 11D by repeating the operations (1) to (5) described above.

If the movable section (3) is moved by a desired distance, the focus of the lens system is aligned on the subject and an image of the subject is formed on a CCD camera (not shown). The image of the subject thus formed is converted into video signals. When the image of the subject is photographed by the CCD camera so as to generate video signals, the movable section 3 of the electrostatic actuator is temporarily held by any one of the stators 1 and 2.

The following description covers the case where the movable section 3 is moved in a back side direction (i.e., in the backward direction in which the movable section 3 is moved to the right in the drawing), which is opposite to the predetermined direction (i.e., in the forward direction in which the movable section 3 is moved to the left in the drawing), as shown in FIGS. 13A to 13E, with reference to FIGS. 12A to 12D and FIGS. 13A to 13E.

Figure 12A:
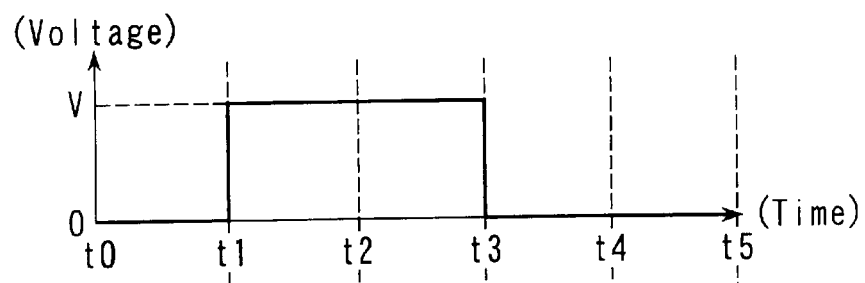
FIGS. 12A to 12D are graphs showing the driving method of the electrostatic actuator according to the first embodiment of the present invention, which is shown in FIG. 5, i.e., the graph each showing the relationship between the voltage applied to the stator electrode and time in the case of moving the movable section shown in FIG. 5 to the right.
Figure 12B:
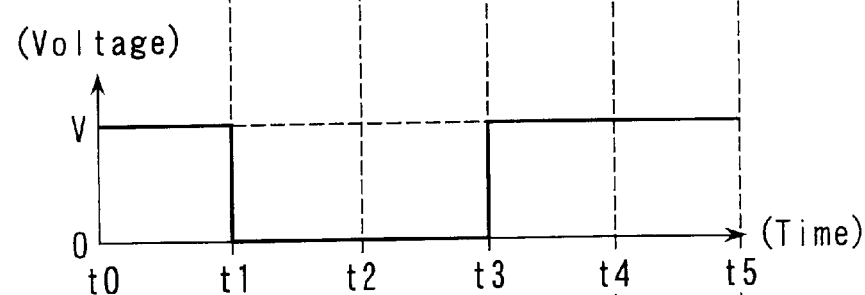
Figure 12C:
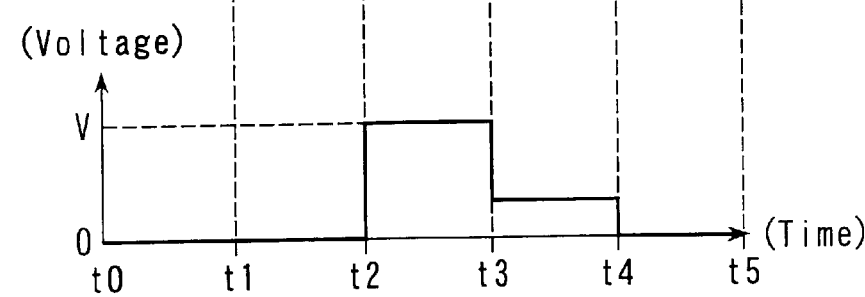
Figure 12D:
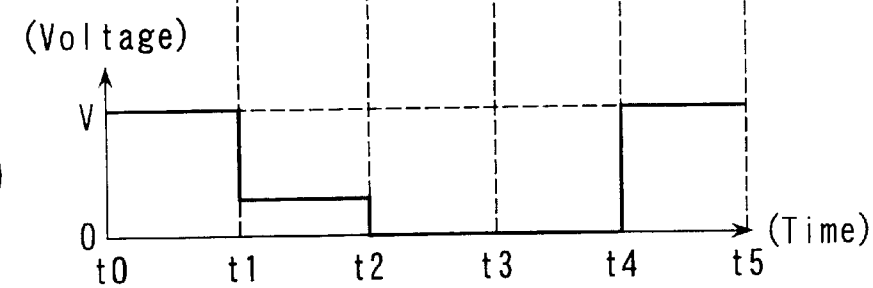

FIG. 12A is a timing chart showing the pattern of the voltage applied to the stator electrodes 5A-1 and 5A-3. FIG. 12B is a timing chart showing the pattern of the voltage applied to each of the stator electrodes 5B-2 and 5B-3. FIG. 12C is a timing chart showing the pattern of the voltage applied to the stator electrode 5A-1. Further, FIG. 12D is a timing chart showing the pattern of the voltage applied to the stator electrode 5B-1. On the other hand, each of FIGS. 13A to 13E shows the driven state of the movable section 3. In each of FIGS. 13A to 13E, it is shown that the movable section 3 is displaced from the state denoted by the dotted lined to the state denoted by the solid lines.

(1) In the first step, voltage V [V] is applied to the stator electrodes 5B-1 to 5B-3 during the time period between time points t0 and t1, as shown in FIGS. 12B. As a result, the movable section driving electrodes 7B-1 to 7B-3 are electrostatically attracted by the stator electrodes 5B-1 to 5B-3 so as to be held temporarily on the side of the stator 2 under the state that the stopper 9 on the lower surface of the movable section 3 is brought into contact with the stator 2.

(2) In the next step, voltage V [V] is applied to each of the stator electrodes 5A-2 and 5A-3 during the time period between time points t1 and t2, as shown in FIG. 12A, and voltage 1/3V [V] is applied to the stator electrode 5B-1 as shown in FIG. 12D. As a result, the movable section driving electrodes 7A-1 and 7A-2 are electrostatically attracted by the stator electrodes 5A-2 and 5A-3, with the result that the movable section 3 is swung in the counterclockwise direction around a point α as shown in FIG. 12B. It should be noted that the point α represents the contact point between the stopper 9 adjacent to the movable section driving electrodes 7B-3 and the stator 2 and corresponds to the edge of the pair of the stoppers 9 on the side of the lower surface in the moving direction of the movable section 3. The movable section driving electrodes 7A-1 and 7A-2 are temporarily held by the stator 1 under the state that the stopper 9 is in contact with the stator 1.

(3) Then, voltage V [V] is applied to each of the stator electrode 5A-2 and 5A-3 during the time period between time points t2 and t3 as shown in FIG. 12A, and voltage V [V] is applied to each of the stator electrode 5A-1 as shown in FIG. 12C. As a result, the movable section driving electrodes 7A-3 and 7A-2 are electrostatically attracted by the stator electrode 5A-1, with the result that the movable section 3 is swung in the counterclockwise direction around a point β, as shown in FIG. 12C. It should be noted that the point β represents the contact point between the stopper 9 adjacent to each of the movable section driving electrodes 7A-1, 7A-2 and the stator 1 and corresponds to the edge of the pair of the stoppers 9 on the side of the upper surface in the back side direction opposite to the moving direction of the movable section 3. The movable section 3 is temporarily held by the stator 1 under the state that the stopper 9 close to the movable section driving electrode 7A-3 is in contact with the stator 1. In this state, the movable section 3 is moved to the left in the drawing by a distance δ, compared with the state shown in FIG. 13A.

(4) Further, voltage V [V] is applied to each of the stator electrodes 5B-2 and 5B-3 during the time period between time points t3 and t4 as shown in FIG. 12B, and voltage 1/3V [V] is applied to the stator electrode 5A-1 as shown in FIG. 12C. As a result, the movable section driving electrodes 7B-1 and 7B-2 are electrostatically attracted by the stator electrodes 5B-2 and 5B-3, with the result that the movable section 3 is swung in the counterclockwise direction about a point γ, as shown in FIG. 12D. It should be noted that the point γ represents the contact point between the stopper 9 adjacent to the movable section driving electrode 7A-3 and the stator 1 and corresponds to the edge of the pair of the stoppers 9 on the side of the upper surface in the moving direction of the movable section 3. The movable section 3 is temporarily held by the stator 2 under the state that the stopper 9 close to each of the movable section driving electrodes 7B-1 and 7B-2 is in contact with the stator 2.

(5) Still further, voltage V [V] is applied to each of the stator electrodes 5B-1 to 5B-3 during the time period between time points t4 and t5 as shown in FIGS. 12B and 12D. As a result, the movable section driving electrode 7B-3 is electrostatically attracted by the stator electrode 5B-1, with the result that the movable section 3 is swung in the clockwise direction around a point ε. It should be noted that the point ε represents the contact point between the stopper 9 close to each of the movable section driving electrodes 7B-1, 7B-2 and the stator 2 and corresponds to the edge of the pair of stoppers 9 on the side of the lower surface in the back side direction opposite to the moving direction of the movable section 3. The movable section 3 is temporarily held by the stator 2 under the state that the stopper 9 close to the movable section driving electrode 7B-3 is in contact with the stator 2. In this state., the movable section 3 is moved to the right in the drawing by a distance 2δ, compared with the state shown in FIG. 13A.

As described above, the movable section 3 is moved in a predetermined direction by the voltage pattern shown in FIGS. 12A to 12D. Also, the movable section 3 can be moved by a desired distance to the right as shown in FIGS. 13A to 13D by repeating the operations (1) to (5) described above.

If the movable section (3) is moved by a desired distance, the focus of the lens system is aligned on the subject and an image of the subject is formed on a CCD camera (not shown). The image of the subject thus formed is converted into video signals. When the image of the subject is photographed by the CCD camera so as to generate video signals, the movable section 3 of the electrostatic actuator is temporarily held by any one of the stators 1 and 2.

As described above, in the electrostatic actuator according to the first embodiment of the present invention, which is constructed as described above, it is possible to make the moving range of the movable section larger than that in the conventional electrostatic actuator. It follows that it is possible to widen the range in which the lens system 8 is moved for the focusing purpose.

Second Embodiment

An electrostatic actuator according to a second embodiment of the present invention will now be described with reference to FIGS. 14A to 15D.

In each of the embodiments described in the following, the same constituents of the electrostatic actuators are denoted by the same reference numerals so as to avoid an overlapping description.

In the electrostatic actuator according to the second embodiment of the present invention, the pattern of the voltage applied to each of the stator electrodes is made simple, compared with the first embodiment described above.

The electrostatic actuator according to the second embodiment of the present invention is equal in construction to the electrostatic actuator according to the first embodiment described above with reference to FIGS. 5 to 9.

FIG. 14A is a timing chart showing the pattern of the voltage applied to each of the stator electrodes 5A-2 and 5A-3. FIG. 14B is a timing chart showing the pattern of the voltage applied to each of the stator electrodes 5B-2 and 5B-3. FIG. 14C is a timing chart showing the pattern of the voltage applied to the stator electrode 5A-1. Further, FIG. 14C is a timing chart showing the pattern of the voltage applied to the stator electrode 5B-1. On the other hand, each of FIGS. 15A to 15E shows the driven state of the movable section 3. In each of FIGS. 15A to 15E, it is shown that the movable section 3 is displaced from the position denoted by the dotted lines to the position denoted by the solid lines.

Where the movable section 3 is moved to the left in the first embodiment described previously, voltage 1/3V [V] is applied to each of the stator electrodes 5B-2 and 5B-3 during the time period between time points t1 and t2, and voltage 1/3V [V] is applied to each of the stator electrodes 5A-2 and 5A-3 during the time period between time points t3 and t4 as shown in FIGS. 10A and 10B. Also, where the movable section 3 is moved to the right, voltage 1/3V [V] is applied to the stator electrode 5B-1 during the time period between time points t1 and t2, and voltage 1/3V [V] is applied to the stator electrode 5A-1 during the time period between time points t3 and t4, as shown in FIGS. 12C and 12D. On the other hand, where the movable section 3 is moved to the left in the second embodiment of the present invention, voltage 1/3V [V] is not applied to the stator electrodes 5B-2 and 5B-3 during the time period between time points t1 and t2, and voltage 1/3V [V] is not applied to the stator electrodes 5A-2 and 5A-3 during the time period between time points t3 and t4, as shown in FIGS. 14A and 14B. Also, where the movable section 3 is moved to the right in the second embodiment of the present invention, voltage 1/3V [V] is not applied to the stator electrode 5B-1 during the time period between time points t1 and t2, and voltage 1/3V [V] is not applied to the stator electrode 5A-1 during the time period between time points t3 and t4, as shown in FIGS. 15C and 15D.

Let us describe now the case where the movable section 3 is moved to the left with reference to FIGS. 14A to 14D.

In the first step, voltage V [V] is applied to each of the stator electrodes 5B-1, 5B-2 and 5B-3 during the time period between time points t0 and t1 as shown in FIGS. 14B and 14D. As a result, the movable section driving electrodes 7B-1, 7B-2 and 7B-3 are electrostatically attracted by the stator electrodes 5B-1, 5B-2 and 5B-3, with the result that the movable section 3 is temporarily held by the stator 2, as shown in FIG. 11A.

In the next step, voltage V [V] is applied to the stator electrode 5A-1 during the time period between time points t1 and t2, as shown in FIG. 14C. As a result, the movable section driving electrode 7A-3 is electrostatically attracted by the stator electrode 5A-1. It should be noted that the movable section driving electrode 7A-3 is arranged deviant from the center of gravity of the movable section 3 in the backward direction opposite to the moving direction, as apparent from FIG. 5. It follows that the stopper 9 corresponding to the edge in the backward direction of the movable section 3 is upheaved as shown in FIG. 11B. Then, voltage V [V] is applied to the stator electrodes 5A-2 and 5A-3, in addition to the stator electrode 5A-1 during the time period between time points t2 and t3, as shown in FIG. 14A, with the result that the stopper 9 corresponding to the edge in the moving direction of the movable section 3 is upheaved as shown in FIG. 11C. In this stage, an inertia force is generated in the clockwise direction in the movable section 3 around the center of gravity of the movable section 3. It follows that force is applied to the movable section 3 such that the stopper 9 corresponding to the edge in the backward direction of the movable section 3 is moved away from the stator 1. If voltage V [V] is applied to the stator electrode 5B-1 during the time period between time points t3 and t4 as shown in FIG. 14D, the electrostatic force generated between the movable section driving electrode 7B-3 and the stator electrode 5B-1 functions to move the stopper 9 corresponding to the edge in the backward direction of the movable section 3 away from the stator 1, with the result that the stopper 9 corresponding to the particular edge is directed to the stator 1 as shown in FIG. 11D. Then, voltage V [V] is applied to each of the stator electrodes 5B-1, 5B-2 and 5B-3 during the time period between time points t4 and t5 as shown in FIGS. 14B and 14D, with the result that the stopper 9 corresponding to the edge in the moving direction of the movable section 3 is directed to the stator 1, as shown in FIG. 11E. It follows that the movable section 3 is moved by a distance 2δ in a predetermined direction as shown in FIGS. 11A to 11E.

Let us describe the case where the movable section 3 is moved to the right with reference to FIGS. 15A to 15D.

Figure 13A:
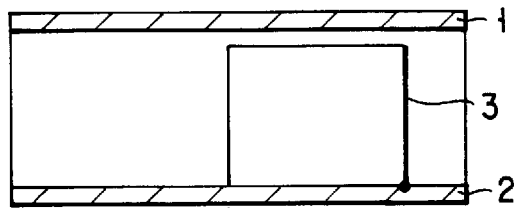
FIGS. 13A to 13E are vertical cross sectional views showing the operation of the electrostatic actuator driven by the voltage shown in FIGS. 12A to 12D, i.e., showing the operation of the electrostatic actuator in the case of moving the movable section shown in FIG. 5 to the right.

In the first step, voltage V [V] is applied to each of the stator electrodes 5B-1, 5B-2 and 5B-3 during the time period between time points t0 and t1 as shown in FIGS. 15B and 15D. As a result, the movable section driving electrodes 7B-1, 7B-2 and 7B-3 are electrostatically attracted by the stator electrodes 5B-1, 5B-2 and 5B-3, with the result that the movable section 3 is temporarily held by the stator 2, as shown in FIG. 13A.

Figure 13B:
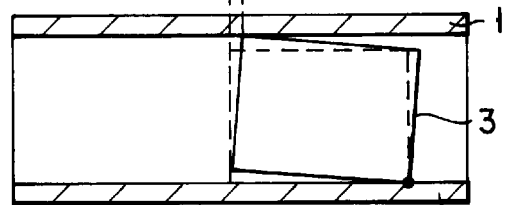
Figure 13C:
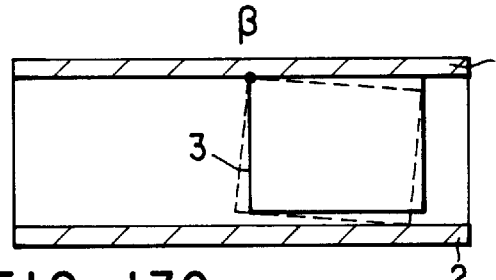
Figure 13D:
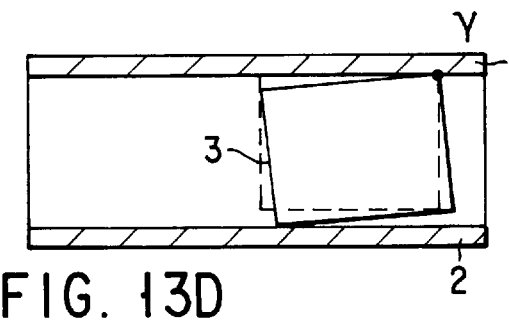
Figure 13E:
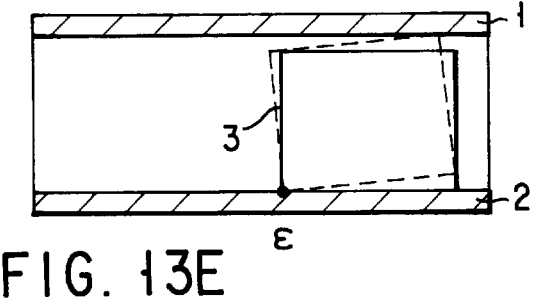

In the next step, voltage V [V] is applied to each of the stator electrodes 5A-2 and 5A-3 during the time period between time points t1 and t2, as shown in FIG. 15A. As a result, the movable section driving electrodes 7A-1 and 7A-2 are electrostatically attracted by the stator electrodes 5A-2 and 5A-3. It should be noted that the movable section driving electrodes 7A-1 and 7A-2 are arranged deviant from the center of gravity of the movable section 3 in the backward direction opposite to the moving direction, as apparent from FIG. 5. It follows that the stopper 9 corresponding to the edge in the backward direction of the movable section 3 is upheaved as shown in FIG. 13B. Then, voltage V [V] is applied to the stator electrodes 5A-1, 5A-2 and 5A-3 during the time period between time points t2 and t3, with the result that the stopper 9 corresponding to the edge in the moving direction of the movable section 3 is upheaved as shown in FIG. 13C. In this stage, an inertia force is generated in the clockwise direction in the movable section 3 around the center of gravity of the movable section 3. It follows that force is applied to the movable section 3 such that the stopper 9 corresponding to the edge in the backward direction of the movable section 3 is moved away from the stator 1. If voltage V [V] is applied to each of the stator electrodes 5B-2 and 5B-3 during the time period between time points t3 and t4 as shown in FIG. 15B, the electrostatic force generated between the movable section driving electrodes 7B-1, 7B-2 and the stator electrodes 5B-2, 5B-3 functions to move the stopper 9 corresponding to the edge in the backward direction of the movable section 3 away from the stator 1, with the result that the stopper 9 corresponding to the particular edge is directed to the stator 1 as shown in FIG. 13D. Then, voltage V [V] is applied to each of the stator electrodes 5B-1, 5B-2 and 5B-3 during the time period between time points t4 and t5 as shown in FIGS. 15B and 15D, with the result that the stopper 9 corresponding to the edge in the moving direction of the movable section 3 is directed to the stator 1, as shown in FIG. 13E. It follows that the movable section 3 is moved by a distance 2δ in a predetermined direction as shown in FIGS. 13A to 13E.

In the second embodiment of the present invention described above, it is possible to facilitate the control by making simpler the pattern of the voltage applied to each of the stator electrodes so as to promote the operation of the electrostatic actuator. Incidentally, in order to use the inertia force efficiently, the time interval between the adjacent time points is set in advance at an appropriate value.

Third Embodiment

An electrostatic actuator according to a third embodiment of the present invention will now be described with reference to FIGS. 16A to 17D. In the electrostatic actuator according to the third embodiment of the present invention, the pattern of the voltage applied to each of the stator electrodes is made simpler than that in each of the first and second embodiments described above.

Where the movable section 3 is moved to the left in the drawing as shown in FIGS. 11A to 11D, employed in the third embodiment of the present invention is the driving system that voltage is not applied at all to any of the stator electrodes 5B-2, 5B-3 and the stator electrodes 5A-2, 5A-3 during the time period between time points t1 and t5, as shown in FIGS. 16A and 16B. Also, where the movable section 3 is moved to the right in the drawing as shown in FIGS. 13A to 13D, employed in the third embodiment of the present invention is the driving system that voltage is not applied at all to any of the stator electrodes 5A-1 and 5B-1 during the time period between time points t1 and t5, as shown in FIGS. 17C and 17D.

Let us describe now the case where the movable section 3 is moved to the left with reference to FIGS. 16A to 16D.

In the first step, voltage V [V] is applied to the stator electrodes 5B-1 during the time period between time points t0 and t1 as shown in FIG. 16D. As a result, the movable section driving electrodes 7B-3 is electrostatically attracted by the stator electrode 5B-1, with the result that the movable section 3 is temporarily held by the stator 2, as shown in FIG. 11A.

In the next step, voltage V [V] is applied to the stator electrode 5A-1 during the time period between time points t1 and t2, as shown in FIG. 16C. As a result, the movable section driving electrode 7A-3 is electrostatically attracted by the stator electrode 5A-1. It should be noted that the movable section driving electrode 7A-3 is arranged deviant from the center of gravity of the movable section 3 in the backward direction opposite to the moving direction, as apparent from FIG. 5. It follows that the stopper 9 corresponding to the edge in the backward direction of the movable section 3 is upheaved as shown in FIG. 11B. Voltage V [V] continues to be applied to the stator electrode 5A-1 during the time period between time points t2 and t3, with the result that the stopper 9 corresponding to the edge in the moving direction of the movable section 3 is upheaved as shown in FIG. 11C. In this stage, an inertia force is generated in the clockwise direction in the movable section 3 around the center of gravity of the movable section 3. It follows that force is applied to the movable section 3 such that the stopper 9 corresponding to the edge in the backward direction of the movable section 3 is moved away from the stator 1. If voltage V [V] is applied to the stator electrode 5B-1 during the time period between time points t3 and t4, the electrostatic force generated between the movable section driving electrode 7B-3 and the stator electrode 5B-1 functions to move the stopper 9 corresponding to the edge in the backward direction of the movable section 3 away from the stator 1, with the result that the stopper 9 corresponding to the particular edge is directed to the stator 1 as shown in FIG. 11D. Then, voltage V [V] continues to be applied to the stator electrode 5B-1 during the time period between time points t4 and t5, with the result that the stopper 9 corresponding to the edge in the moving direction of the movable section 3 is directed to the stator 1, as shown in FIG. 11E. It follows that the movable section 3 is moved by a distance 2δ in a predetermined direction as shown in FIGS. 11A to 11E.

Let us describe the case where the movable section 3 is moved to the right with reference to FIGS. 17A to 17D.

In the first step, voltage V [V] is applied to each of the stator electrodes 5B-2 and 5B-3 during the time period between time points t0 and t1 as shown in FIG. 17B. As a result, the movable section driving electrodes 7B-1 and 7B-2 are electrostatically attracted by the stator electrodes 5B-2 and 5B-3, with the result that the movable section 3 is temporarily held by the stator 2, as shown in FIG. 13A.

In the next step, voltage V [V] is applied to each of the stator electrodes 5A-2 and 5A-3 during the time period between time points t1 and t2, as shown in FIG. 17A. As a result, the movable section driving electrodes 7A-1 and 7A-2 are electrostatically attracted by the stator electrodes 5A-2 and 5A-3. It should be noted that the movable section driving electrodes 7A-1 and 7A-2 are arranged deviant from the center of gravity of the movable section 3 in the backward direction opposite to the moving direction, as apparent from FIG. 5. It follows that the stopper 9 corresponding to the edge in the backward direction of the movable section 3 is upheaved as shown in FIG. 13B. Then, voltage V [V] is applied to the stator electrodes 5A-2 and 5A-3 during the time period between time points t2 and t3, with the result that the stopper 9 corresponding to the edge in the moving direction of the movable section 3 is upheaved as shown in FIG. 13C. In this stage, an inertia force is generated in the clockwise direction in the movable section 3 around the center of gravity of the movable section 3. It follows that force is applied to the movable section 3 such that the stopper 9 corresponding to the edge in the backward direction of the movable section 3 is moved away from the stator 1. If voltage V [V] is applied to each of the stator electrodes 5B-2 and 5B-3 during the time period between time points t3 and t4 as shown in FIG. 15B, the electrostatic force generated between the movable section driving electrodes 7B-1, 7B-2 and the stator electrodes 5B-2, 5B-3 functions to move the stopper 9 corresponding to the edge in the backward direction of the movable section 3 away from the stator 1, with the result that the stopper 9 corresponding to the particular edge is directed to the stator 1 as shown in FIG. 13D. Then, voltage V [V] continues to be applied to each of the stator electrodes 5B-2 and 5B-3 during the time period between time points t4 and t5, with the result that the stopper 9 corresponding to the edge in the moving direction of the movable section 3 is directed to the stator 1, as shown in FIG. 13E. It follows that the movable section 3 is moved by a distance 2δ in a predetermined direction as shown in FIGS. 13A to 13E.

In the third embodiment of the present invention described above, it is possible to facilitate the control by making simpler the pattern of the voltage applied to each of the stator electrodes so as to promote the operation of the electrostatic actuator. Incidentally, in order to use the inertia force efficiently, the time interval between the adjacent time points is set in advance at an appropriate value.

Fourth Embodiment

An electrostatic actuator according to a fourth embodiment of the present invention and another electrostatic actuator according to a modification of the fourth embodiment will now be described with reference to FIGS. 18A to 18C.

The electrostatic actuator according to the fourth embodiment of the present invention differs from the electrostatic actuator according to the first embodiment in the shape of the movable section electrode.

Figure 18A:
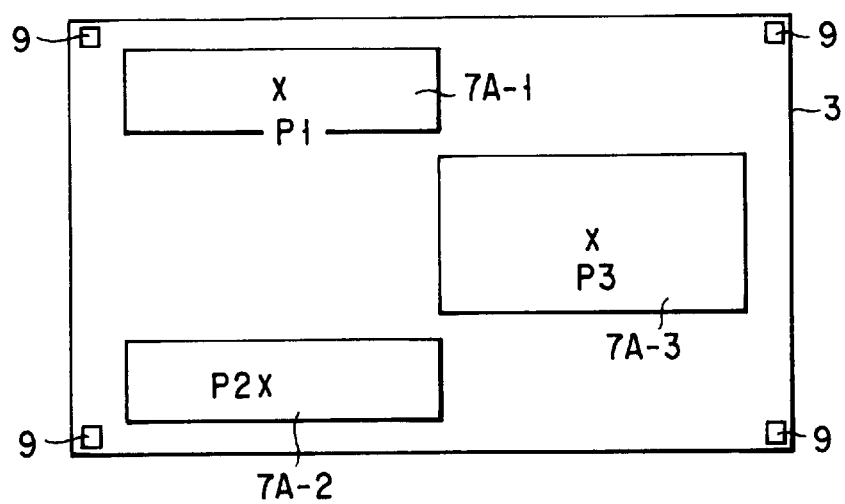
FIGS. 18A to 18C are plan views schematically showing the construction of the movable section included in an electrostatic actuator according to a fourth embodiment of the present invention and in an electrostatic actuator according to a modification of the fourth embodiment.

FIG. 18A is a plan view schematically showing the movable section of the electrostatic actuator according to the fourth embodiment of the present invention. FIG. 18B is a plan view schematically showing a movable section according to a modification of FIG. 18A. FIG. 18C is a plan view schematically showing a movable section according to another modification of FIG. 18A. In FIGS. 18A to 18C, the marks P1 to P11 denote the centers of movable section driving electrodes 7A-1 to 7A-4, 7A1-3, and 7A2-3. The centers P1 to P11 represent the centers of the planar figures depicted by the electrode patterns and correspond to the centers of gravity of the movable section driving electrodes 7A-1 to 7A-3.

In the movable section shown in FIG. 18A, the extending portion of the movable section driving electrode 7A-3 is not arranged between the movable section driving electrodes 7A-1 and 7A-3, and the inner sides of the movable section driving electrodes 7A-1, 7A-2 and 7A-3 are substantially aligned in the central region on the surface of the movable section 3. Each of the movable section driving electrodes 7A-1 to 7A-3 has a length smaller than half the length of the movable section 3 and has an area smaller than that of each of the movable section driving electrodes in the electrostatic actuator according to the first embodiment of the present invention. Also, the movable section driving electrodes 7A-1 and 7A-2 are equal to each other in area, and the sum of the areas of these movable section driving electrodes 7A-1 and 7A-2 is substantially equal to the area of the movable section driving electrode 7A-3.

Figure 18B:
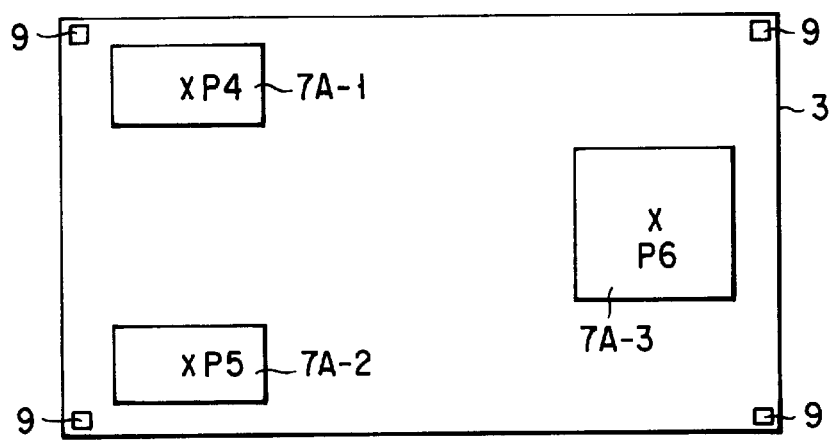

In the movable section 3 shown in FIG. 18B, the movable section driving electrodes 7A-1 to 7A-3 have areas smaller than the areas of the movable section driving electrodes 7A-1 to 7A-3 shown in FIG. 18A. These movable section driving electrodes 7A-1 to 7A-3 are formed rectangular, e.g., formed substantially square, as apparent from FIG. 18B.

Figure 18C:
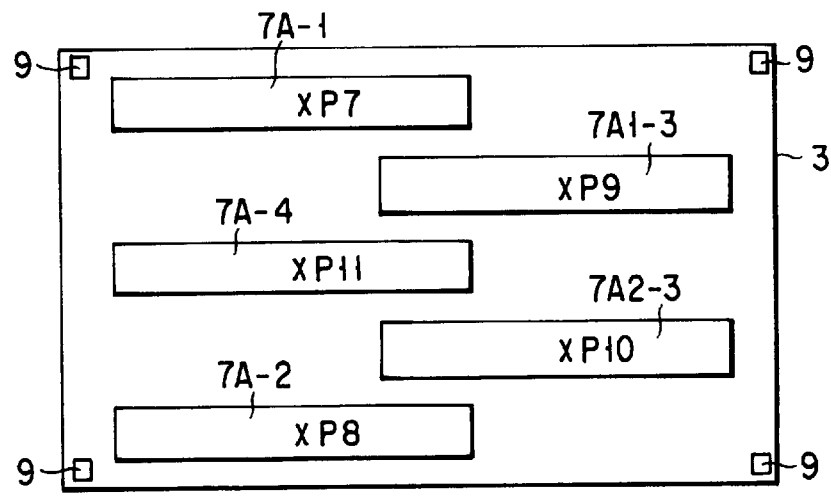

In the movable section 3 shown in FIG. 18C, three movable section driving electrodes 7A-1, 7A-4 and 7A-2 extend from the central region of the movable section 3 toward one side, and two movable section driving electrodes 7A1-3 and 7A2-3 extend from the central region of the movable section 3 toward the other side. In the arrangement shown in FIG. 18C, the movable section driving electrode 7A2-3 is positioned between the movable section driving electrodes 7A-2 and 7A-4, and the movable section driving electrode 7A2-3 is positioned between the movable section driving electrodes 7A-4 and 7A-2. Further, the edge portions of the movable section driving electrodes 7A-2, 7A2-3, 7A-4, 7A1-3 and 7A-1 in the central region of the movable section 3 are arranged in the lateral direction. It should be noted that the movable section driving electrode 7A-1, the movable section driving electrode 7A-2 and the movable section driving electrode 7A-4 have substantially the same areas. Also, the sum of the areas of the movable section driving electrodes 7A-1, 7A-2 and 7A-4 is set substantially equal to the sum of the areas of the movable section driving electrodes 7A1-3 and 7A2-3.

The movable section driving electrodes equal to those shown in FIGS. 18A to 18C are also formed on the opposite surface of each of the movable sections.

The relationship between the centers P1 to P11 of the movable section driving electrodes shown in FIGS. 18A to 18C and the center of gravity of the movable section 3 will now be described with reference to FIG. 19.

Figure 19:
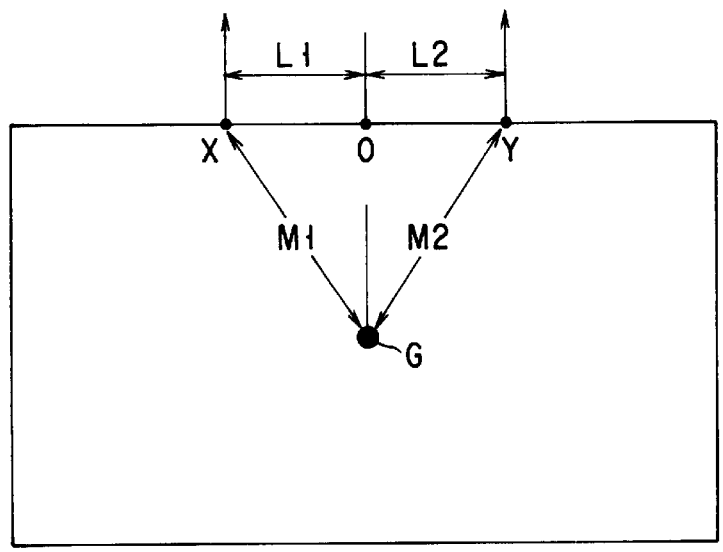
FIG. 19 is a side view of the movable section showing the relationship between the centers P1 to P11 of the movable section driving electrodes shown in FIGS. 18A to 18C and the center of gravity of the movable section 3.

FIG. 19 shows the side surface of the movable section 3. The letter "X" shown in FIG. 19 corresponds to any of the centers P1, P2, P4, P5, P7, P8, P11 of the movable section driving electrodes 7A-1, 7A-2 and 7A-4 shown in FIGS. 18A to 18C. On the other hand, the letter "Y" shown in FIG. 19 corresponds to any of the centers P3, P6, P9, P10 of the movable section driving electrodes 7A-3, 7A1-3 and 7A2-3 shown in FIGS. 18A to 18C. Further, the letter "G" shown in FIG. 19 denotes the center of gravity of the movable section 3, and the letter "O" denotes the point where a line crossing at right angles the plane of the movable section 3 including the center G of gravity crosses the surface of the movable section 3. The centers X and Y are equidistant from the point O (L1=L2) and from the center G of gravity of the movable section 3 (M1=M2).

In the fourth embodiment described above, it is possible to change in various fashions the shape of the movable section driving electrode in accordance with the magnitude of the electrostatic force required for allowing the movable section 3 to make movement between the stators 1 and 2 so as to make it possible to widen the range of design. Incidentally, if the applied voltage and the distance between the movable section and the stator are constant, the magnitude of the required electrostatic force is proportional to the area of the stator electrode/movable section driving electrode or the weight of the movable section 3. It follows that the electrostatic force required for the movement is increased with increase in the area of each of the electrodes and in the weight of the movable section 3.

Fifth Embodiment

Figure 20:
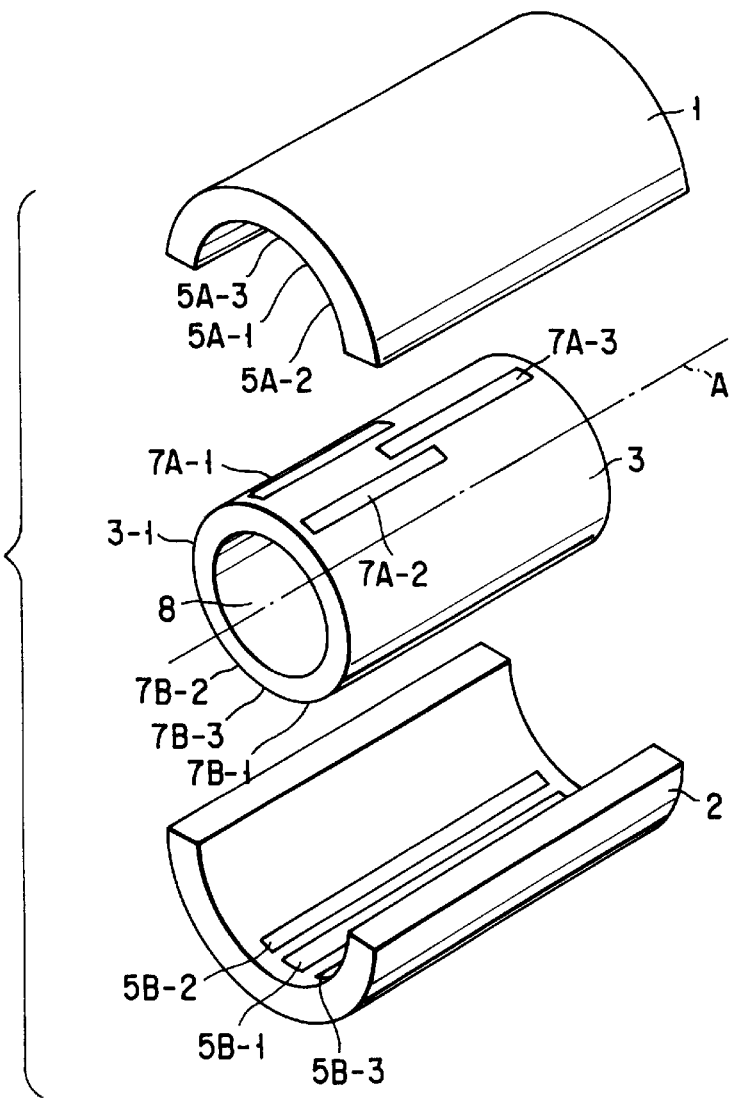
FIG. 20 is an oblique view schematically showing in a dismantled fashion an electrostatic actuator according to a fifth embodiment of the present invention.

An electrostatic actuator according to a fifth embodiment of the present invention will now be described with reference to FIGS. 20, 21A and 21B. FIG. 20 is an oblique view showing in a dismantled fashion the construction of the electrostatic actuator according to the fifth embodiment of the present invention. On the other hand, FIGS. 21A and 21B are lateral cross sectional views collectively showing the electrostatic actuator shown in FIG. 20.

Figure 21A:
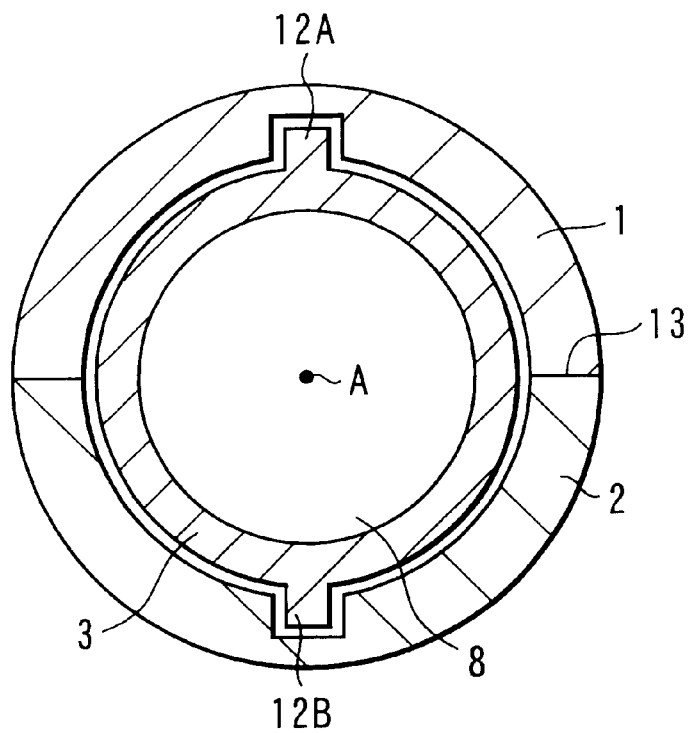
FIGS. 21A and 21B are lateral cross sectional views each showing the electrostatic actuator shown in FIG. 20.
Figure 21B:
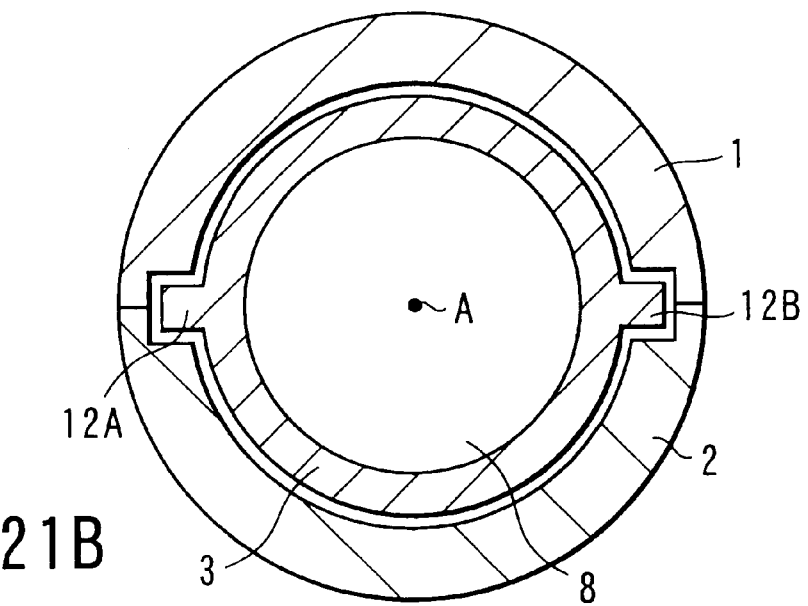

In the electrostatic actuator according to the fifth embodiment of the present invention, the stators 1, 2 and the movable section 3 are formed cylindrical, as shown in FIGS. 20, 21A and 21B. In the fifth embodiment shown in FIGS. 20, 21A and 21B, each of the stator electrodes and each of the movable section driving electrodes are equal in shape to each of the stator electrodes and each of the movable section driving electrodes included in the electrostatic actuator for the first embodiment.

Each of the stators 1 and 2 is formed in the shape of a semicylinder having a substantially U-shaped cross section. These stators 1 and 2 are combined to form a hollow cylindrical structure. Stator electrodes 5A-1, 5A-2 and 5A-3 are formed on the inner surface of the stator 1. Likewise, stator electrodes 5B-1, 5B-2 and 5B-3 are formed on the inner surface of the stator 2. The stators 1 and 2 are combined to permit the stator electrodes 5A-1, 5A-2 and 5A-3 of the stator 1 to face the stator electrode 5B-1, 5B-2 and 5B-3 of the stator 2, respectively. The movable section 3 is inserted into the hollow space that is formed when the stators 1 and 2 are combined to form a cylindrical structure. The movable section 3 is inserted into the hollow space, which defines an optical path, such that a gap is provided between the outer surface of the movable section 3 and the inner surface of each of the stators 1 and 2. The movable section 3 comprises a support body 3-1 for supporting a plurality of lenses 8 arranged within the hollow space defining the optical path, and the movable section driving electrodes 7A-1 to 7A-3 and 7B-1 to 7B-3 arranged to face the stator electrodes 5A-1 to 5A-3 and 5B-1 to 5B-3. The movable section 3 is moved along an axis A.

The mechanism for preventing the movable section 3 from being rotated during the axial movement will now be described with reference to FIGS. 21A and 21B.

As shown in FIG. 21A, the movable section 3 comprises projecting sections 12A and 12B projecting upward and downward, respectively, from the outer surface of the movable section 3. These projecting section 12A and 12B extend on the outer surface of the movable section 3 in the direction of the axis A. In other words, the projecting sections 12A and 12B are positioned in symmetry with respect to the axis A, or arranged 180° apart from each other relative to the axis A. On the other hand, concave portions into which the projecting sections 12A and 12B are inserted are formed in those portions of the inner surfaces of the stators 1 and 2 which correspond to the projecting sections 12A and 12B. Naturally, these concave portions are formed to extend in the direction of the axis A. Incidentally, the stators 1 and 2 are joined to each other in a substantially horizontal bonding plane 13. Alternatively, it is possible for the projecting portions 12A and 12B to be formed to extend outward to the left and to the right, respectively, as shown in FIG. 21B. Needless to say, in this case, the concave portions into which the projecting sections 12A, 12B are inserted are formed in the bonding portions between the stators 1 and 2.

Even if rotation of the movable section 3 about the axis A is induced when the movable section 3 is moved, the rotation is inhibited by the coupling between the projecting sections 12A, 12B and the concave portions of the stators 1 and 2. The projecting sections 12A, 12B and the concave portions are formed in regions differing from the regions in which the movable section driving electrodes and the stator electrodes are formed.

In the electrostatic actuator according to the fifth embodiment of the present invention, which is described above, the shapes of the movable section 3 and the stators 1 and 2 are determined to conform with the shape of the lens 8. It follows that the electrostatic actuator of the fifth embodiment can be arranged in a small space, compared with the case where the electrostatic actuator is formed substantially in the shape of a parallelepiped.

Sixth Embodiment

An electrostatic actuator according to a sixth embodiment of the present invention will now be described with reference to FIGS. 22 to 25.

Figure 22:
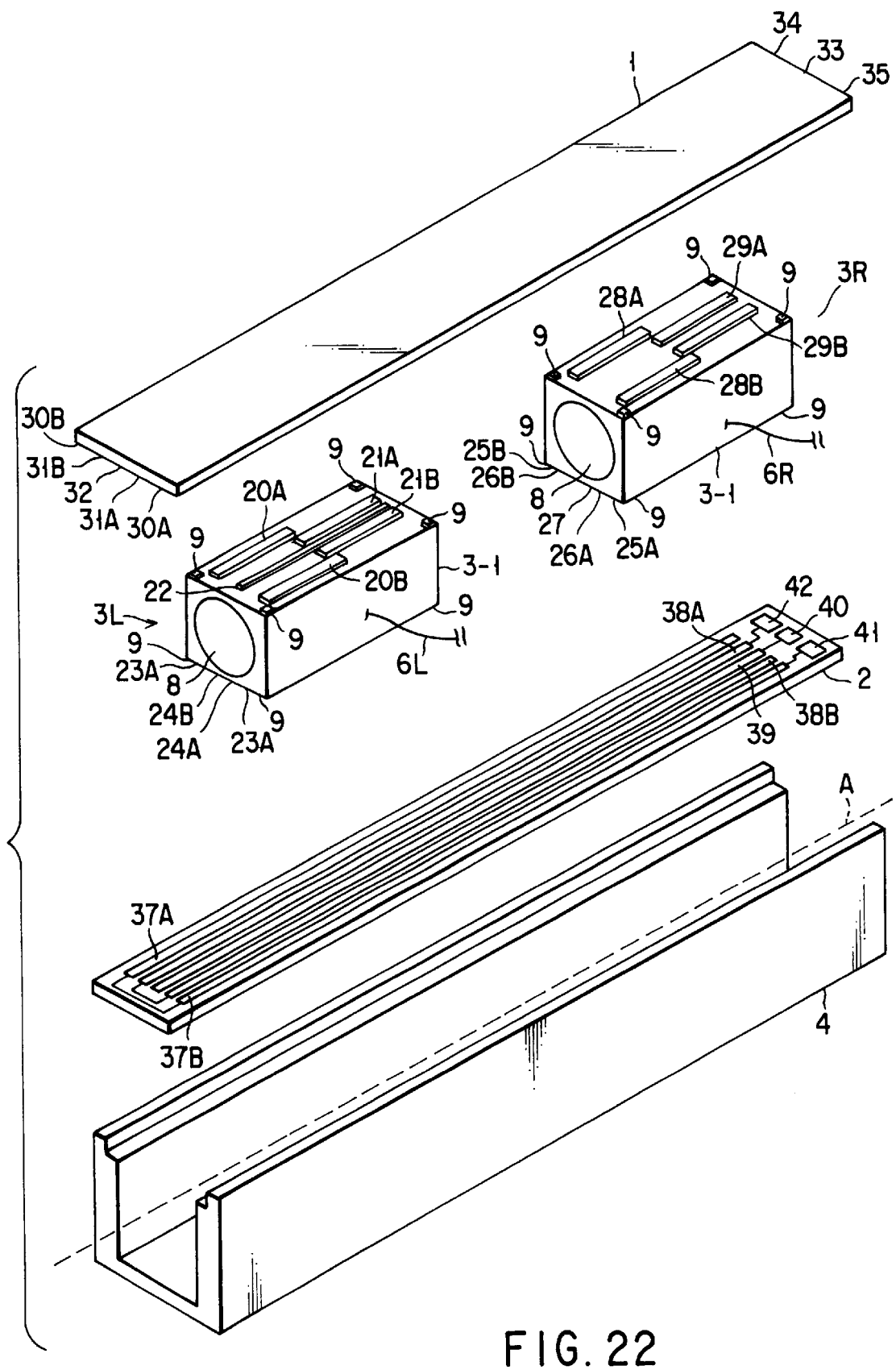
FIG. 22 is an oblique view schematically showing in a dismantled fashion an electrostatic actuator according to a sixth embodiment of the present invention.
Figure 23A:
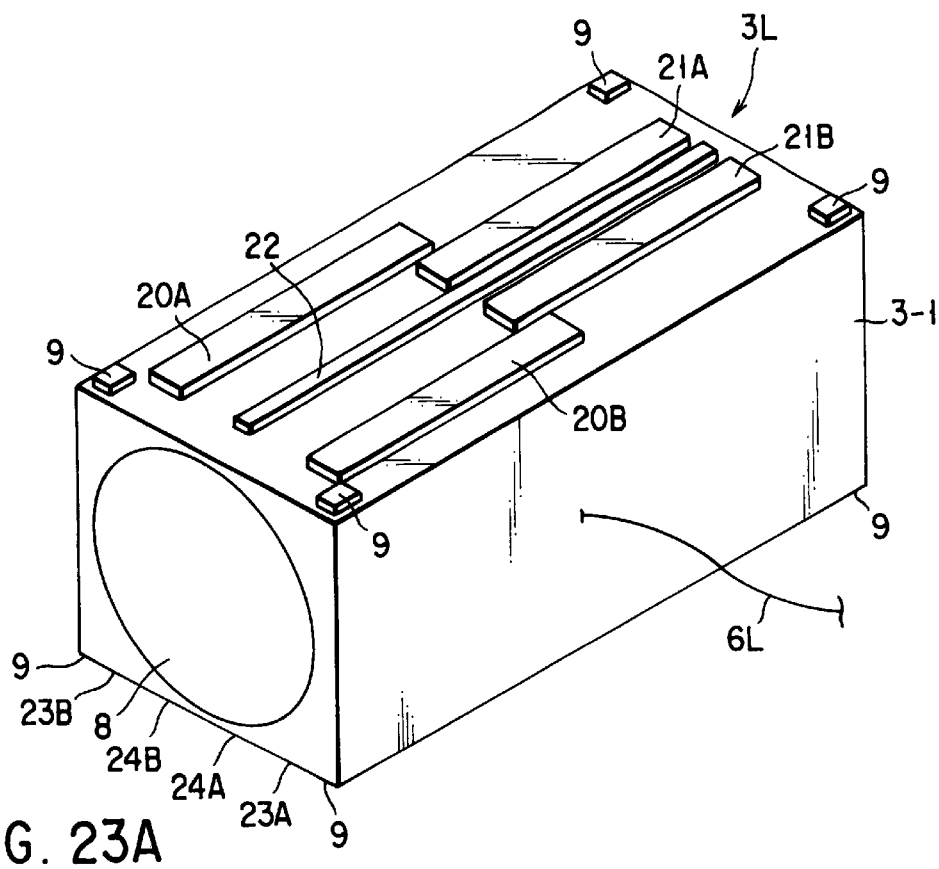
FIGS. 23A and 23B are side views showing the construction of the two movable sections included in the electrostatic actuator shown in FIG. 22.
Figure 23B:
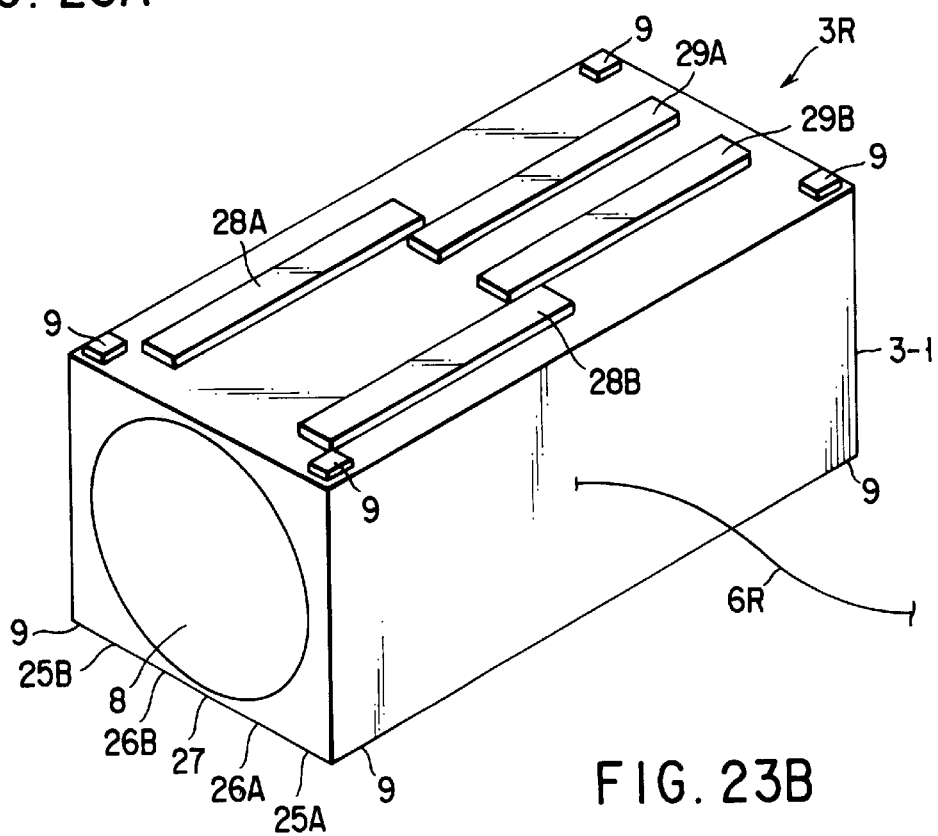

FIG. 22 is an oblique view schematically showing in a dismantled fashion the construction of the electrostatic actuator according to the sixth embodiment of the present invention. FIGS. 23A and 23B are oblique views showing the first movable section 3L and the second movable section 3R, respectively, included in the electrostatic actuator shown in FIG. 22. FIGS. 24A and 24B are plan views showing the upper surface and the lower surface, respectively, of the first movable section 3L shown in FIG. 23A. FIGS. 24C and 24D are plan views showing the upper surface and the lower surface, respectively, of the second movable section 3R shown in FIG. 23B. Further, FIGS. 25A and 25B are plan views showing the stators 1 and 2, respectively, of the electrostatic actuator shown in FIG. 22.

The electrostatic actuator shown in FIGS. 22 to 25B differs from the electrostatic actuator according to the first embodiment of the present invention in the configuration of each of the movable section driving electrodes and each of the stator electrodes, and is substantially equal to the electrostatic actuator according to the first embodiment of the present invention in the other construction.

The electrostatic actuator according to the sixth embodiment of the present invention comprises two movable sections 3L and 3R. In this connection, stator electrodes are formed in the stators 1 and 2 in an arrangement conforming with the two movable sections 3L and 3R. As shown in FIG. 25A, a plurality of stripe-shaped stator electrodes 30A, 30B, 31A, 31B and a holding electrode 32 formed to extend in a predetermined direction on the stator 1. Electrode terminals 33, 34, 35 each connected to a control unit 36 are also formed on the stator 1. Voltage is applied to the holding electrode 32 via the electrode terminal 33. The stator electrodes 30A and 30B are connected to each other, and voltage is applied from the control unit 36 to the stator electrodes 30A, 30B through the electrode terminal 34. The stator electrodes 31A and 31B are also connected to each other, and voltage is applied from the control unit 36 to the stator electrodes 31A, 31B through the electrode terminal 35. The holding electrode 32 extends in the central portion of the stator 1. The stator electrodes 31A and 31B are arranged on both sides of the holding electrode 32. Further, the stator electrodes 30A and 30B are arranged outside the stator electrodes 31A and 31B, respectively.

On the other hand, a plurality of stripe-shaped stator electrodes 37A, 37B, 38A, 38B and a holding electrode 39 formed to extend in a predetermined direction on the stator 2, as shown in FIG. 25B. Electrode terminals 42, 41, 40 each connected to a control unit 36 are also formed on the stator 2. Voltage is applied to the holding electrode 39 via the electrode terminal 40. Likewise, voltage is applied from the control unit 36 to the stator electrodes 37A, 37B through the electrode terminal 41. Further, voltage is applied from the control unit 36 to the stator electrodes 38A, 38B through the electrode terminal 42. The holding electrode 39 extends in the central portion of the stator 2. The stator electrodes 38A and 38B are arranged on both sides of the holding electrode 39. Further, the stator electrodes 37A and 37B are arranged outside the stator electrodes 38A and 38B, respectively.

As shown in FIG. 23A, the movable section 3L comprises a hollow support body 3-1 supporting the lens system and defining the optical path. A plurality of movable section driving electrodes 20B, 20A, 21B, 21A and a holding electrode 22 are formed on the surface of the support body 3-1. Also, a grounded wiring 6L for removing the electric charge from the support body 3-1 is connected to the support body 3-1.

As shown in FIGS. 23A and 24A, oblong movable section driving electrodes 20B, 20A, 21B, 21A and a movable section fixing electrode 22 are arranged on that surface of the movable section 3L which faces the stator 1 in a manner to face the stator electrodes 30A, 30B, 31A, 31B and the holding electrode 32. The movable section driving electrodes 20A and 20B are arranged to extend from the central region on the upper surface of the movable section 3L in the moving direction of the movable section. On the other hand, the movable section driving electrodes 21A and 21B are arranged to extend in the backward direction, which is opposite to the moving direction of the movable section, from the central region on the upper surface of the movable section 3L. These movable section driving electrodes 20B, 20A, 21B and 21A are substantially equal to each other in length, and each of these movable section driving electrodes has a length about half the length of the movable section 3. In the central region on the upper surface of the movable section 3L, the edge portions of the movable section driving electrodes 21A and 21B are interposed between the edge portions of the movable section driving electrodes 20A and 20B. The movable section fixing electrode 22 is substantially equal in length to the movable section 3L. Also, stoppers 9 higher than each of the movable section driving electrodes and the movable section fixing electrode 22 are formed in the four corners on the upper surface of the movable section 3L.

As shown in FIG. 24B, oblong movable section driving electrodes 23B, 23A, 24B and 24A are arranged on that surface of the movable section 3L which faces the stator 2 in a manner to face the stator electrodes 37A, 37B, 38A and 38B. The movable section driving electrodes 23A and 23B are arranged to extend from the central region on the upper surface of the movable section 3L in the moving direction of the movable section. On the other hand, the movable section driving electrodes 24A and 24B are arranged to extend in the backward direction, which is opposite to the moving direction of the movable section, from the central region on the upper surface of the movable section 3L. These movable section driving electrodes 23B, 23A, 24B and 24A are substantially equal to each other in length, and each of these movable section driving electrodes has a length about half the length of the movable section 3L. In the central region on the upper surface of the movable section 3L, the edge portions of the movable section driving electrodes 24A and 24B are interposed between the edge portions of the movable section driving electrodes 23A and 23B. Also, stoppers 9 higher than each of the movable section driving electrodes 23A, 23B, 24A and 24B are formed in the four corners on the upper surface of the movable section 3L.

As shown in FIG. 23B, the movable section 3R comprises a hollow support body 3-1 supporting the lens system and defining the optical path. A plurality of movable section driving electrodes 28B, 28A, 29B, and 29A are formed on the surface of the support body 3-1. Also, a grounded wiring 6R for removing the electric charge from the support body 3-1 is connected to the support body 3-1.

Oblong movable section driving electrodes 28A, 28B, 29A and 29B are arranged on that surface of the movable section 3R which faces the stator 1 in a manner to face the stator electrodes 30A, 30B, 31A, 31B. The movable section driving electrodes 28A and 28B are arranged to extend from the central region on the upper surface of the movable section 3R in the moving direction of the movable section. On the other hand, the movable section driving electrodes 29A and 29B are arranged to extend in the backward direction, which is opposite to the moving direction of the movable section, from the central region on the upper surface of the movable section 3R. These movable section driving electrodes 28B, 28A, 29B and 29A are substantially equal to each other in length, and each of these movable section driving electrodes has a length about half the length of the movable section 3R. In the central region on the upper surface of the movable section 3R, the edge portions of the movable section driving electrodes 29A and 29B are interposed between the edge portions of the movable section driving electrodes 28A and 28B. Also, stoppers 9 higher than each of the movable section driving electrodes 28B, 28A, 29B and 29A are formed in the four corners on the upper surface of the movable section 3R.

Oblong movable section driving electrodes 25B, 25A, 26B and 26A are arranged on that surface of the movable section 3R which faces the stator 2 in a manner to face the stator electrodes 37A, 37B, 38A, 38B and the holding electrode 39. The movable section driving electrodes 25A and 25B are arranged to extend from the central region on the upper surface of the movable section 3R in the moving direction of the movable section. On the other hand, the movable section driving electrodes 26A and 26B are arranged to extend in the backward direction, which is opposite to the moving direction of the movable section, from the central region on the upper surface of the movable section 3R. These movable section driving electrodes 25B, 25A, 26B and 26A are substantially equal to each other in length, and each of these movable section driving electrodes has a length about half the length of the movable section 3R. In the central region on the upper surface of the movable section 3R, the edge portions of the movable section driving electrodes 26A and 26B are interposed between the edge portions of the movable section driving electrodes 25A and 25B. The movable section fixing electrode 27 has a length substantially equal to the length of the movable section 3R. Also, stoppers 9 higher than each of the movable section driving electrodes and the movable section fixing electrode 27 are formed in the four corners on the upper surface of the movable section 3R.

As shown in FIGS. 23A and 24A, the movable section driving electrodes 20A, 20B, 21A and 21B included in the movable section 3L have substantially the same shape. Likewise, the movable section driving electrodes 23A, 23B, 24A and 24B have substantially the same shape, as shown in FIG. 24B. Further, the movable section driving electrodes 20A, 20B, 21A and 21B have the same height.

As shown in FIGS. 23B and 24C, the movable section driving electrodes 28A, 28B, 29A and 29B included in the movable section 3R have substantially the same shape. Likewise, the movable section driving electrodes 25A, 25B, 26A and 26B have substantially the same shape, as shown in FIG. 24B. Further, the movable section driving electrodes 20A, 20B, 21A and 21B have the same height.

The movable section driving electrodes 20A and 20B are positioned in symmetry with respect to the center of gravity of the movable section 3L. The movable section driving electrodes 21A and 21B are also positioned in symmetry with respect to the center of gravity of the movable section 3L. The movable section driving electrodes 23A and 23B are also positioned in symmetry with respect to the center of gravity of the movable section 3L. The movable section driving electrodes 24A and 24B are also positioned in symmetry with respect to the center of gravity of the movable section 3L. The movable section driving electrodes 28A and 28B are also positioned in symmetry with respect to the center of gravity of the movable section 3L. The movable section driving electrodes 29A and 29B are also positioned in symmetry with respect to the center of gravity of the movable section 3L. The movable section driving electrodes 25A and 25B are also positioned in symmetry with respect to the center of gravity of the movable section 3L. Further, the movable section driving electrodes 26A and 26B are also positioned in symmetry with respect to the center of gravity of the movable section 3L.

As shown in FIG. 25A, the electrode terminal 33 formed in the vicinity of the edge of the stator 1 is connected to the holding electrode 32 by patterning. Also, the electrode terminal 34 is connected to the stator electrode 30B by patterning, and the stator electrode 30B is connected to the stator electrode 30A by patterning. Further, the electrode terminal 35 is connected to the stator electrode 31B by patterning, and the stator electrode 31B is connected to the stator electrode 31A by patterning. Each of the electrode terminals 33 to 35 is connected to the control unit 36.

The control unit 36 comprises a memory storing as a voltage pattern the value of the voltage applied to each of the stator electrodes 30A, 30B, 31A, 31B or to the holding electrode 32 and the voltage application timing. The voltage applied to each of the stator electrodes or to the holding electrode 32 is controlled in accordance with the voltage pattern stored in the memory noted above.

Also, as shown in FIG. 25B, the electrode terminal 40 is connected to the holding electrode 39 by patterning. Also, the electrode terminal 41 is connected to the stator electrode 37B by patterning, and the stator electrode 37B is connected to the stator electrode 37A by patterning. Further, the electrode terminal 42 is connected to the stator electrode 38A by patterning, and the stator electrode 38A is connected to the stator electrode 38B by patterning. Each of the electrode terminals 40 to 42 is connected to the control unit 36.

The control unit 36 comprises a memory storing as a voltage pattern the value of the voltage applied to each of the stator electrodes 37A, 37B, 38A, 38B or to the holding electrode 39 and the voltage application timing. The voltage applied to each of the stator electrodes or to the holding electrode 39 is controlled in accordance with the voltage pattern stored in the memory noted above.

The operation of the electrostatic actuator shown in FIGS. 22 to 25B will now be described.

Where the movable sections 3L and 3R are moved in a predetermined direction, there are four motion patterns as described below.

I. The case where both the movable sections 3L and 3R are moved to the left in FIG. 22 (forward direction).

II. The case where both the movable sections 3L and 3R are moved to the right in FIG. 22 (backward direction).

III. The case where the movable section 3L alone is moved to the left in FIG. 22 (forward direction) or to the right (backward direction), with the movable section 3R being fixed and not moved.

IV. The case where the movable section 3R alone is moved to the left in FIG. 22 (forward direction) or to the right (backward direction), with the movable section 3L being fixed and not moved.

The control unit 36 applies the voltage to the stator electrodes and the holding electrode depending on the motion patterns of cases I to IV described above and on the step in each motion pattern. The particular relationship is as shown in Table 1 below. In Table 1, the expression Cuse denotes that voltage is applied to the particular electrode during the motion patterns of cases I to IV. Also, the expression "nonuse" denotes that voltage is not applied at all to the particular electrode during the motion pattern.

TABLE 1

| motion pattern | driving electrode 31A, 31B, 32A, 32B, 37A, 37B, 38A, 38B | holding electrode 32 | holding electrode 39 |
|---|---|---|---|
| I | Use | nonuse | nonuse |
| II | Use | nonuse | nonuse |
| III | Use | nonuse | use |
| IV | Use | use | nonuse |

Motion patterns I and II will now be described first.

In the case of the motion pattern I or II, each of the movable section driving electrodes and each of the stator electrodes shown in FIGS. 22 to 25B correspond to each of the movable section driving electrodes and each of the stator electrodes shown in FIGS. 5 to 8B as shown in Tables 2 and 3 given below:

TABLE 2

| | reference numerals in FIGS. 5 to 7B | reference numerals in FIGS. 22 to 25B |
|---|---|---|
| movable section driving electrode | 20A | 7A-1 |
| movable section driving electrode | 20B | 7A-2 |
| movable section driving electrode | 21A | 7A-3 |
| movable section driving electrode | 21B | 7A-3 |
| movable section driving electrode | 22 | none |
| movable section driving electrode | 23A | 7B-1 |
| movable section driving electrode | 23B | 7B-2 |
| movable section driving electrode | 24A | 7B-3 |
| movable section driving electrode | 24B | 7B-3 |
| movable section driving electrode | 25A | 7B-1 |
| movable section driving electrode | 25B | 7B-1 |
| movable section driving electrode | 26A | 7B-3 |
| movable section driving electrode | 26B | 7B-3 |
| movable section driving electrode | 27 | none |
| movable section driving electrode | 28A | 7A-1 |
| movable section driving electrode | 28B | 7A-2 |
| movable section driving electrode | 29A | 7A-3 |
| movable section driving electrode | 29B | 7A-3 |

TABLE 3

| | reference numerals in FIGS. 5 to 7B | reference numerals in FIGS. 22 to 25B |
|---|---|---|
| stator driving electrode | 30A | 5A-2 |
| stator driving electrode | 30B | 5A-3 |
| stator driving electrode | 31A | 5A-1 |
| stator driving electrode | 31B | 5A-1 |
| stator driving electrode | 32 | none |
| stator driving electrode | 37A | 5B-2 |
| stator driving electrode | 37B | 5B-3 |
| stator driving electrode | 38A | 5B-1 |
| stator driving electrode | 38B | 5B-1 |
| stator driving electrode | 39 | none |

As apparent from Tables 1 to 3, if the voltage of the control unit 36 is controlled such that voltage is not applied to the holding electrodes 32 and 39, the motion pattern I or II is equal to the procedure of applying the voltage for moving the movable section 3, which was described previously with reference to FIGS. 9 to 13E, in the electrostatic actuator according to the first embodiment of the present invention shown in FIGS. 5 to 8B. Therefore, the description thereof is omitted. Incidentally, it is apparent that, in the electrostatic actuator according to the first embodiment of the present invention shown in FIGS. 5 to 8B, it is possible to employ the procedure, which is described previously with reference to FIGS. 14A to 17D, of applying the voltage for moving the movable section.

Incidentally, where the movable sections 3L and 3R are moved in accordance with the motion pattern I or II, these movable sections 3L and 3R are moved, with the distance between the movable sections 3L and 3R maintained constant.

The motion pattern III will now be described.

Since the movable section 3L is movable with the movable section 3R kept fixed, the movable section 3L is moved in accordance with the motion pattern I or II. To be more specific, if the movable section 3R is held fixed, the movable section 3L can be moved by applying voltage to the driving electrodes by the procedure of applying voltage for moving the electrode section 3, which was described previously with reference to FIGS. 9 to 13E or FIGS. 14A to 17D. The operation for temporarily fixing the movable section 3R will now be described.

In the first step, voltage V [V] is applied to the holding electrode 39 of the stator 2. If the voltage is applied, a large electrostatic force is generated between the movable section fixing electrode 27 corresponding to the holding electrode 39 and the holding electrode 39. By this electrostatic force, the movable section 3R is attracted by the stator 2, with the result that the stopper 9 on the lower surface of the movable section 3R is brought into contact with the stator 2 so as to permit the movable section 3 to be held temporarily on the side of the stator 2. It should be noted that the voltage is kept applied to the holding electrode 39 for the time during which it is desired to hold the movable section 3R, e.g., during movement of the movable section 3L.

Even if voltage is applied to, for example, the stator electrodes 30A, 30B, 31A and 31B while voltage being applied to the holding electrode 39, the movable section 3R continues to be held by the stator 2, because the distance between the movable section 3R held by the stator 2 and the stator is scores of microns and, thus, it is impossible to obtain an electrostatic.force larger than the force with which the movable section 3R is held by the stator 2, if the applied voltage is V [V].

Incidentally, the movable section 3L, which is movable, is moved within the range within which the movable section 3L is not brought into contact with the movable section 3R, which is temporarily held. The movable section 3L, which is movable, is moved by a method similar to the method employed in the first embodiment of the present invention described previously.

The motion pattern IV will now be described.

The movable section 3R, which is movable, is moved in a desired direction in accordance with the motion pattern I or II. In this case, the movable section 3L is temporarily held fixed to the stator 2 during movement of the movable section 3R.

The operation for temporarily holding the movable section 3L will now be described.

In the first step, voltage V [V] is applied to the holding electrode 32 of the stator 1, with the result that a large electrostatic force is generated between the movable section fixing electrode 22 corresponding to the holding electrode 32 and the holding electrode 32. By this electrostatic force, the movable section 3L is attracted by the stator 1. Also, the stopper 9 on the upper surface of the movable section 3L is brought into contact with the stator 1 so as to permit the movable section 3L to be temporarily held on the side of the stator 1. In this case, voltage is kept applied to the holding electrode 32 by the control unit 36 for the time during which it is desired to fix the movable section 3L, e.g., during movement of the movable section 3R.

Even if voltage is applied to, for example, the driving electrodes 37A, 37B, 38A and 38B on the side of the stator 2 while voltage being applied to the holding electrode 32, the movable section 3L continues to be held on the side of the stator 1, because the distance between the movable section 3L and the stator 2 is scores of microns and, thus, it is impossible to obtain an electrostatic force larger than the force with which the movable section 3L is held by the stator 1, if the applied voltage is V [V].

Incidentally, the movable section 3R, which is movable, is moved within the range within which the movable section 3R is not brought into contact with the movable section 3L, which is temporarily held. The movable section 3R, which is movable, is moved by a method similar to the method employed in the first embodiment of the present invention described previously.

In the sixth embodiment of the present invention described above, it is of course possible to move the movable sections 3L and 3R within a range broader than that in the prior art. In addition, it is possible to realize the focusing of the image formed by the lens 8 and the operation to magnify and reduce the image by moving the movable sections 3L and 3R simultaneously in a predetermined direction or by moving any one of the movable sections 3L and 3R in a predetermined direction.

Seventh Embodiment

Figure 26:
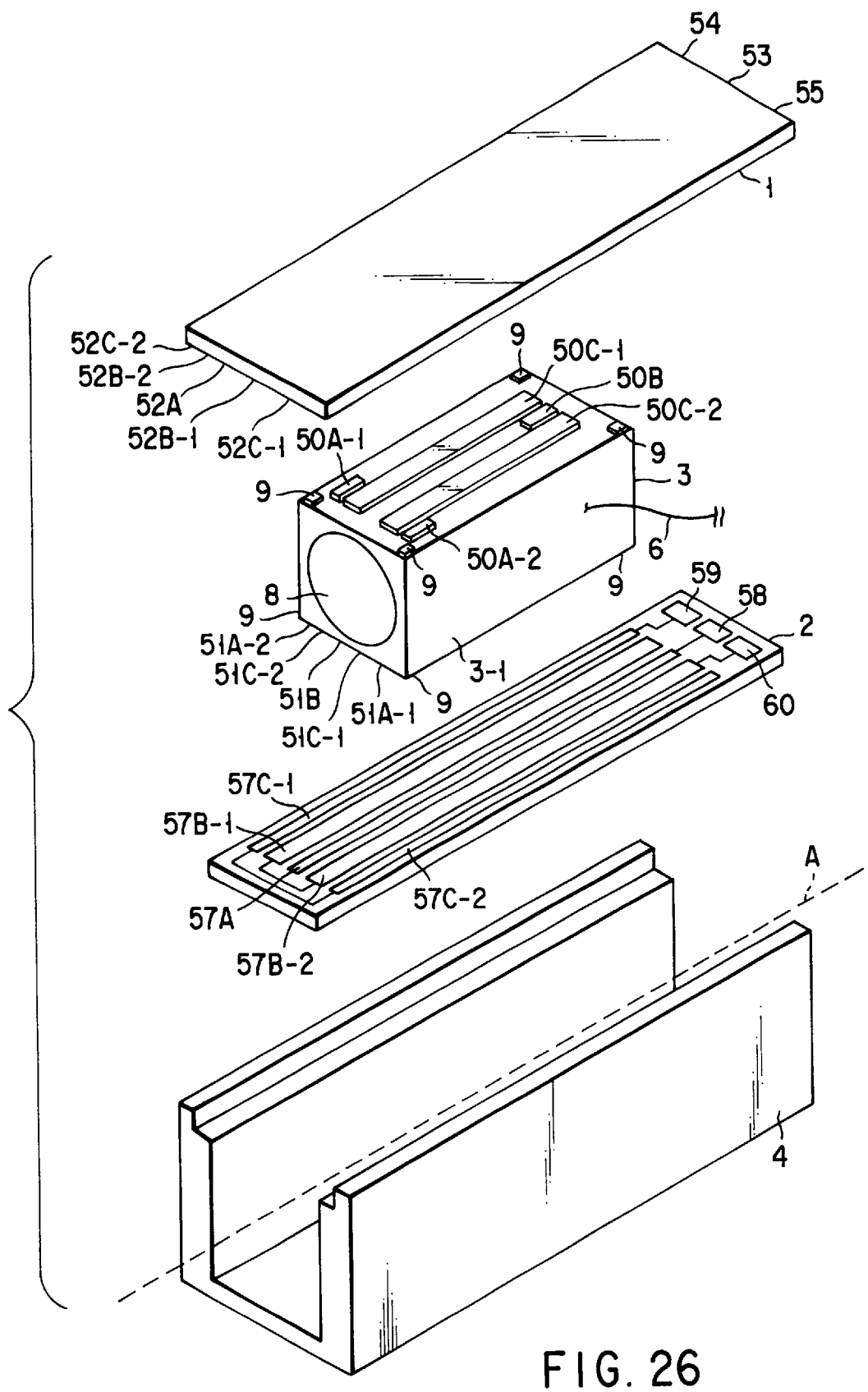
FIG. 26 is an oblique view schematically showing in a dismantled fashion the construction of an electrostatic actuator according to a seventh embodiment of the present invention.
Figure 27:
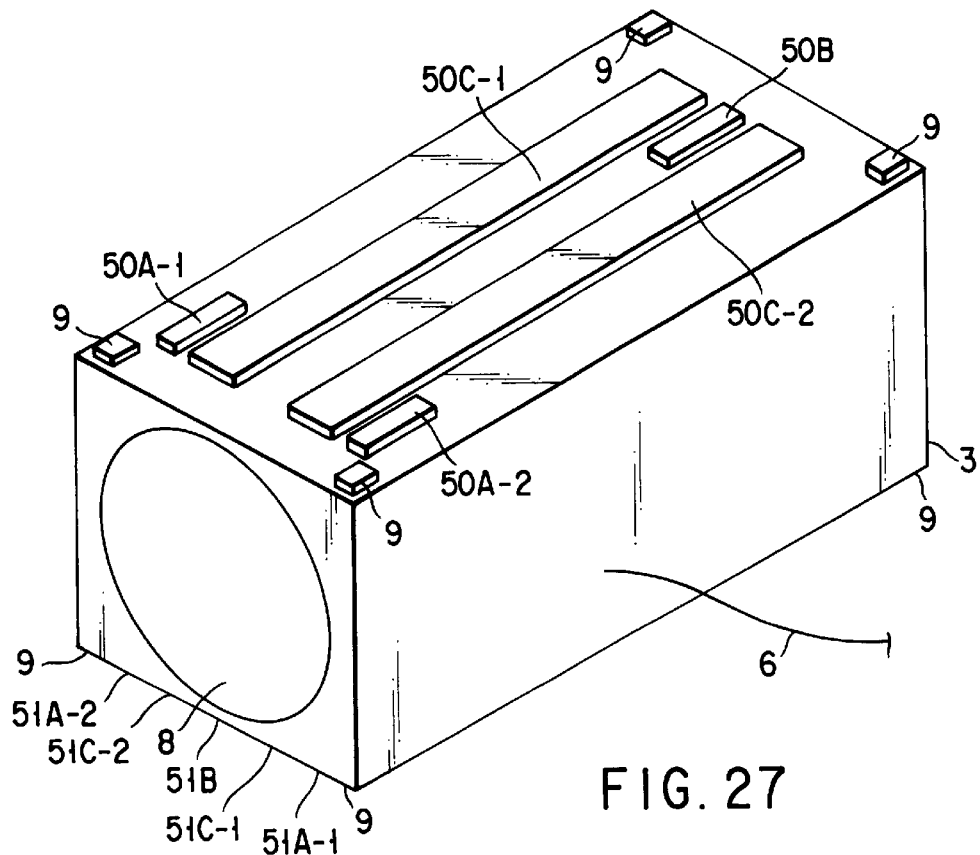
FIG. 27 is a side view showing the construction of the movable section included in the electrostatic actuator shown in FIG. 26.
Figure 28A:
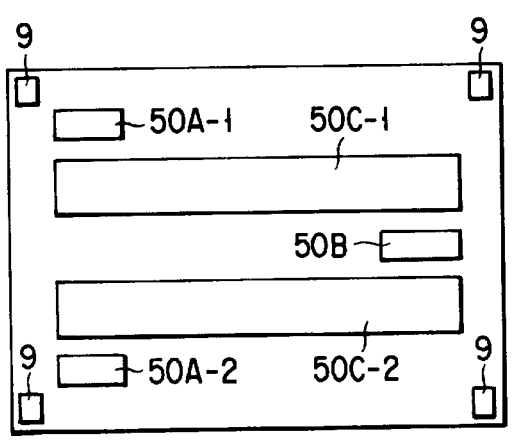
FIGS. 28A and 28B are plan views showing the upper surface and the lower surface, respectively, of the movable section shown in FIG. 27.
Figure 28B:
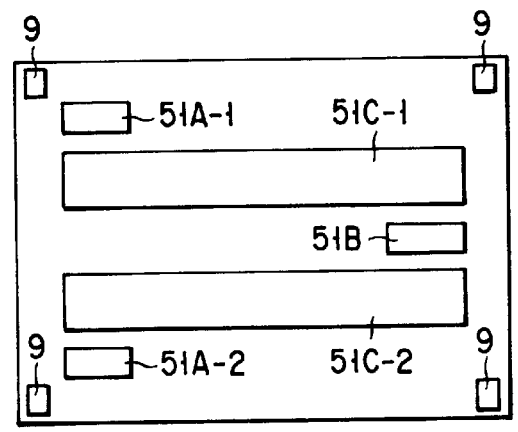

An electrostatic actuator according to a seventh embodiment of the present invention will now be described with reference to FIGS. 26 to 29B. FIG. 26 is an oblique view showing in the dismantled fashion the construction of the electrostatic actuator according to the seventh embodiment of the present invention. FIG. 27 is an oblique view showing the movable section 3 included in the electrostatic actuator shown in FIG. 26. FIGS. 28A and 28B are an upper view and a lower view, respectively, of the movable section 3 shown in FIG. 27. Further, FIGS. 29A and 29B are plan views collectively showing the stators included in the electrostatic actuator shown in FIG. 26.

In the electrostatic actuator according to the seventh embodiment of the present invention, the movable section driving electrodes formed on the movable section 3 are formed longer than the movable section driving electrodes included in the electrostatic actuator according to the first embodiment of the present invention. The electrostatic actuator according to the seventh embodiment is substantially equal to the electrostatic actuator according to the first embodiment in the construction of each of the stator electrodes and each of the movable section driving electrodes.

Figure 29A:
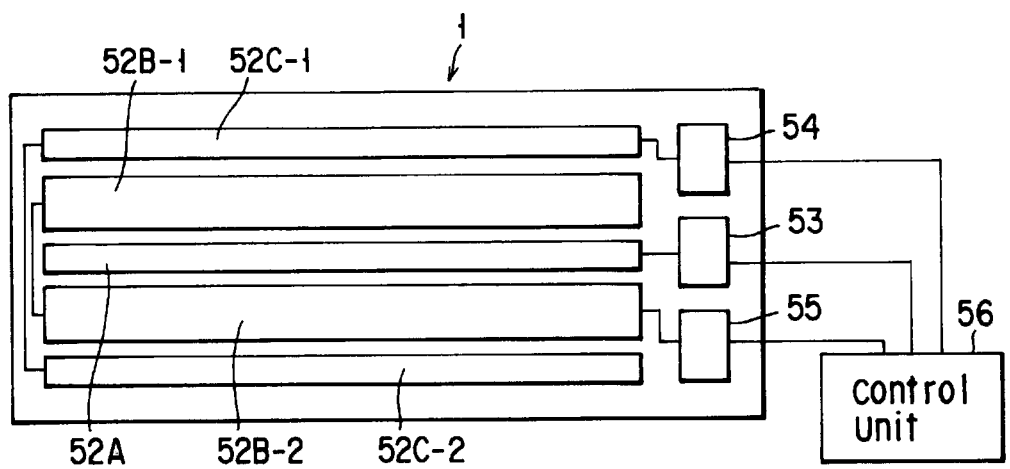
FIGS. 29A and 29B are plan views each showing the stator included in the electrostatic actuator shown in FIG. 26.

As shown in FIG. 29A, a plurality of stripe-shaped stator electrodes 52A, 52C-1, 52C-2, 52B-1 and 52B-2 are formed to extend in a predetermined direction on the stator 1. In addition, electrode terminals 53, 54 and 55 each connected to a control unit 56 are also formed on the stator 1. The stator electrodes 52B-1 and 52B-2 are connected to each other such that voltage is applied from the control unit 56 to these stator electrodes 52B-1 and 52B-2 through the electrode terminal 55. Voltage is also applied from the control unit 56 to the stator electrode 52A through the electrode terminal 53. Further, the stator electrodes 52C-1 and 52C-2 are connected to each other such that voltage is applied from the control unit 56 to these stator electrodes 52C-1 and 52C-2 through the electrode terminal 54. As shown in the drawing, the stator electrode 52A is formed in the central region on the surface of the stator 1. Also, the stator electrodes 52B-1 and 52B-2 are arranged on both sides of the stator electrode 52A. Further, the stator electrodes 52C-1 and 52C-2 are arranged outside the stator electrodes 52B-1 and 52B-2, respectively.

Figure 29B:
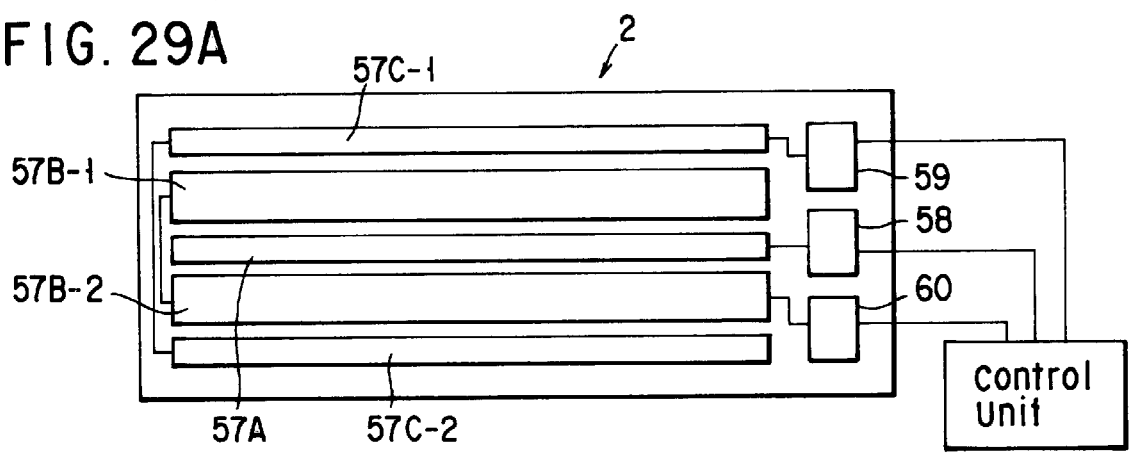

As shown in FIG. 29B, a plurality of stripe-shaped stator electrodes 57A, 57C-1, 57C-2, 57B-1 and 57B-2 are formed to extend in a predetermined direction on the stator 2. In addition, electrode terminals 58, 59 and 60 each connected to a control unit 56 are also formed on the stator 2. The stator electrodes 57B-1 and 57B-2 are connected to each other such that voltage is applied from the control unit 56 to these stator electrodes 57B-1 and 57B-2 through the electrode terminal 60. Voltage is also applied from the control unit 56 to the stator electrode 57A through the electrode terminal 58. Further, the stator electrodes 57C-1 and 57C-2 are connected to each other such that voltage is applied from the control unit 56 to these stator electrodes 57C-1 and 57C-2 through the electrode terminal 59. As shown in the drawing, the stator electrode 57A is formed in the central region on the surface of the stator 2. Also, the stator electrodes 57B-1 and 57B-2 are arranged on both sides of the stator electrode 57A. Further, the stator electrodes 57C-1 and 57C-2 are arranged outside the stator electrodes 57B-1 and 57B-2, respectively.

As shown in FIG. 27, the movable section 3 comprises a hollow support body 3-1 substantially in the form of a parallelepiped and made of a conductive material or a resistive material. The support body 3-1 supports a lens system and has an optical path defined therein. A plurality of movable section driving electrodes 50B, 50A-2, 50A-1, 50C-2 and 50C-1 are formed on the surface of the support body 3-1. Also, a grounded wiring 6 for removing the electric charge from the support body 3-1 is connected to the support body 3-1.

As shown in FIG. 28A, oblong movable section driving electrodes 52B, 50A-2, 50A-1, 50C-2 and 50C-1 are arranged on that surface of the movable section 3 which faces the stator 1 in a manner to face the stator electrodes 52A, 52C-1, 52C-2, 52B-1 and 52B-2, respectively. The movable section driving electrodes 50A-1 and 50A-2 are arranged in the both side regions in the forward direction on the movable section 3, and the movable section driving electrode 50B is arranged in the central region in the backward direction of the movable section 3. The movable section driving electrodes 50A-1, 50A-2 and 50B are substantially equal to each other in length, and the length of these movable section driving electrodes 50A-1, 50A-2 and 50B is set smaller than half the length of the movable section 3. Also, the movable section driving electrodes 50C-1 and 50C-2 are substantially equal to each other. Further, stoppers 9 higher than each of the movable section driving electrodes are formed to project upward from the four corners on the upper surface of the movable section 3.

As shown in FIG. 28B, oblong movable section driving electrodes 51B, 51C-1, 51C-2, 51A-2 and 51A-1 are arranged on that surface of the movable section 3 which faces the stator 2 in a manner to face the stator electrodes 57A, 57C-1, 57C-2, 57B-1 and 57B-2, respectively. The movable section driving electrodes 51A-1 and 51A-2 are arranged in the both side regions in the forward direction on the movable section 3, and the movable section driving electrode 51B is arranged in the central region in the backward direction of the movable section 3. The movable section driving electrodes 51A-1, 51A-2 and 51B are substantially equal to each other in length, and the length of these movable section driving electrodes 51A-1, 51A-2 and 51B is set smaller than half the length of the movable section 3. Further, stoppers 9 lower than each of the movable section driving electrodes are formed to project downward from the four corners on the lower surface of the movable section 3.

As shown in FIG. 26, the movable section driving electrodes 50A-1, 50A-2 and 50B are substantially equal to each other in shape. Also, the movable section driving electrodes 51A-1, 51A-2 and 51B are substantially equal to each other in shape. Further, the movable section driving electrodes 50A-1, 50A-2, 50B, 50C-1 and 50C-2 are substantially equal to each other in height.

The movable section driving electrodes 50A-1 and 50A-2 are arranged in symmetry with respect to the center of gravity of the movable section 3. Also, the movable section driving electrodes 50C-1 and 50C-2 are arranged in symmetry with respect to the center of gravity of the movable section 3. Further, the movable section driving electrodes 51A-1 and 51A-2 are arranged in symmetry with respect to the center of gravity of the movable section 3. Still further, the movable section driving electrodes 51C-1 and 51C-2 are arranged in symmetry with respect to the center of gravity of the movable section 3.

As shown in FIGS. 29A and 29B, the electrode terminal 53 formed in the vicinity of the edge portion of the stator 1 is connected to the stator electrode 52A by patterning a conductive layer. The electrode terminal 54 is connected to the stator electrode 52C-1 by patterning a conductive layer, and the stator electrode 52C-1 is connected to the stator electrode 52C-2 by patterning a conductive layer. Also, the electrode terminal 55 is connected to the stator electrode 52B-2 by patterning a conductive layer, and the stator electrode 52B-2 is connected to the stator electrode 52B-1 by patterning a conductive layer. Further, each of the electrode terminals 53 to 55 is connected to the control unit 56.

The control unit 56 includes a memory section storing the voltage applied to the stator electrodes 52A to 52C-1 and 52C-2 or to the stator electrodes 52B-1 and 52B-2 and the timing of applying the voltage as a voltage pattern. The voltage applied to each of the stator electrodes is controlled in accordance with the voltage pattern.

Also, as shown in FIG. 29B, the electrode terminal 58 is connected to the stator electrode 57A by patterning a conductive layer. The electrode terminal 59 is connected to the stator electrode 57C-1 by patterning a conductive layer, and the stator electrode 57C-1 is connected to the stator electrode 57C-2 by patterning a conductive layer. Also, the electrode terminal 60 is connected to the stator electrode 57B-2 by patterning a conductive layer, and the stator electrode 57B-2 is connected to the stator electrode 57B-1 by patterning a conductive layer. Further, each of the electrode terminals 58 to 60 is connected to the control unit 56.

The control unit 56 includes a memory section storing the voltage applied to the stator electrodes 57A to 57C-1 and 57C-2 or to the stator electrodes 57B-1 and 57B-2 and the timing of applying the voltage as a voltage pattern. The voltage applied to each of the stator electrodes is controlled in accordance with the voltage pattern.

The operation of the electrostatic actuator according to the seventh embodiment of the present invention described above will now be described with reference to FIGS. 30 to 32F.

Figure 30:
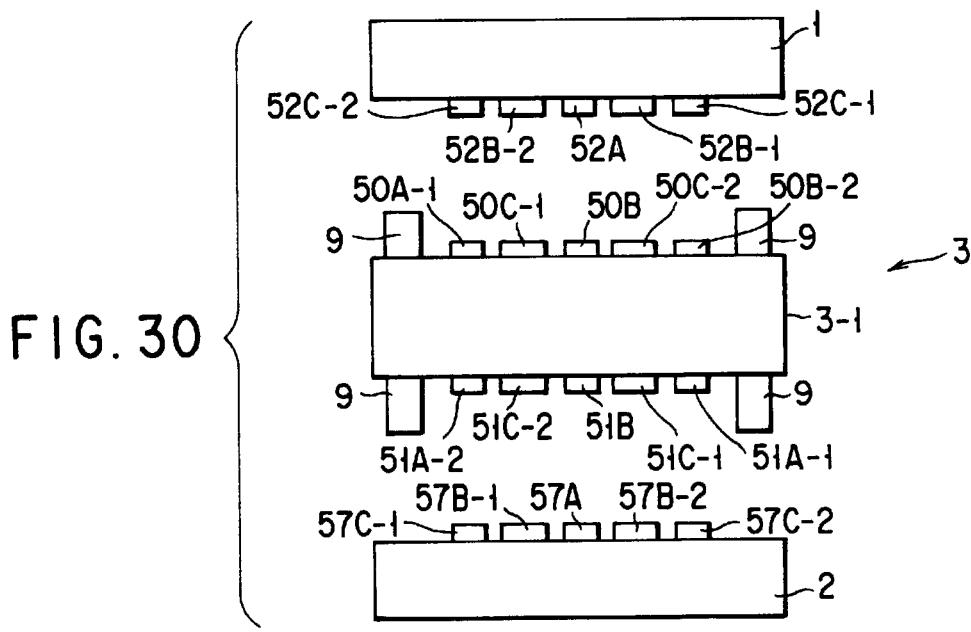
FIG. 30 is a front view as viewed in the moving direction of the electrostatic actuator shown in FIG. 26.

FIG. 30 is a front view as viewed in the moving direction of the electrostatic actuator according to the seventh embodiment of the present invention. FIG. 31A is a timing chart showing the pattern of the voltage applied to the stator electrodes 52B-1 and 52B-2. FIG. 31B is a timing chart showing the pattern of the voltage applied to the stator electrodes 57B-1 and 57B-2. FIG. 31C is a timing chart showing the pattern of the voltage applied to the stator electrode 52A. FIG. 31D is a timing chart showing the pattern of the voltage applied to the stator electrode 57A. FIG. 31E is a timing chart showing the pattern of the voltage applied to the stator electrodes 52C-1 and 52C-2. Further, FIG. 31F is a timing chart showing the pattern of the voltage applied to the stator electrodes 57C-1 and 57C-2.

A predetermined voltage is applied to each of the stator electrodes at the timings of t1 to t5 so as to move the movable section 3 in a predetermined direction.

(1) In the first step, voltage V [V] is applied to the stator electrodes 57A, 57B-1, 57B-2, 57C-1 and 57C-2 during the time period between time points t0 and t1 as shown in FIGS. 31B, 31D and 31F. As a result, the stator electrodes 51B, 51C-2, 51C-1, 51A-2 and 51A-1 are electrostatically attracted by the stator electrodes 57A, 57B-1, 57B-2, 57C-1 and 57C-2, respectively, as shown in FIG. 11A so as to permit the movable section 3 to be temporarily held on the side of the stator 2, with the stopper 9 on the lower surface of the movable section 3 brought into contact with the stator 2.

(2) In the next step, voltage V [V] is applied to the stator electrodes 52A, 57C-1, 57C-2, 52B-1 and 52B-2 during the time period between time points t1 and t2 as shown in FIGS. 31A, 31C and 31F. As a result, the movable section driving electrodes 50C-2, 50C-1 and 50B are electrostatically attracted by the stator electrodes 52B-1, 52B-2 and 52A so as to cause the movable section 3 to be swung in the counterclockwise direction about a point α. In this step, the movable section 3 is held temporarily, with the stopper 9 near the movable section driving electrode 50B kept in contact with the stator 1.

(3) Then, voltage V [V] is applied to the stator electrodes 52B-1, 52B-2, 52A, 52C-1 and 52C-2 during the time period between time points t2 and t3 as shown in FIGS. 31A, 31C and 31E. As a result, the movable section driving electrodes 50A-1, 50A-2, 50C-2 and 50C-1 are electrostatically attracted by the stator electrodes 52C-2, 52C-1, 52B-2 and 52B-1 so as to cause the movable section 3 to be swung in the clockwise direction about a point β, as shown in FIG. 11C. In this step, the movable section 3 is held temporarily, with the stoppers 9, 9 near the movable section driving electrodes 50A-1, 50A-2 kept in contact with the stator 1. Under this condition, the movable section 3 is moved to the left in the drawing (forward direction) by a distance δ, compared with the movable section 3 shown in FIG. 11A.

(4) Further, voltage V [V] is applied to the stator electrodes 57B-1, 57B-2, 57A, 52C-1 and 52C-2 during the time period between time points t3 and t4 as shown in FIGS. 31B, 31D and 31E. As a result, the movable section driving electrodes 51B, 51C-1 and 51C-2 are electrostatically attracted by the stator electrodes 57A, 57B-2 and 57B-1 so as to cause the movable section 3 to be swung in the clockwise direction about a point γ. In this step, the movable section 3 is held temporarily, with the stopper 9 near the movable section driving electrode 51B kept in contact with the stator 2.

(5) Still further, voltage V [V] is applied to the stator electrodes 57B-1, 57B-2, 57A, 57C-1 and 57C-2 during the time period between time points t4 and t5 as shown in FIGS. 31B, 31D and 31F. As a result, the movable section driving electrodes 51A-1, 51A-2, 51C-2 and 51C-1 are electrostatically attracted by the stator electrodes 57C-2, 57C-1, 57B-1 and 57B-2 so as to cause the movable section 3 to be swung in the counterclockwise direction about a point ε. In this step, the movable section 3 is held temporarily, with the stoppers 9, 9 near the movable section driving electrodes 51A-1, 51A-2 kept in contact with the stator 2. Under this condition, the movable section 3 is moved to the left in the drawing (forward direction) by a distance 2δ, compared with the movable section 3 shown in FIG. 11A.

By the procedure of the voltage application described in items (1) to (5) given above, the movable section 3 is moved in a predetermined direction. It is possible to move the movable section to the left in FIG. 26 (forward direction) by a desired moving distance by repeating the procedure described in items (1) to (5) given above.

Let us describe the case where the movable section 3 is moved in the backward direction opposite to the forward direction described above.

FIG. 32A is a timing chart showing the pattern of the voltage applied to the stator electrodes 52B-1 and 52B-2. FIG. 32B is a timing chart showing the pattern of the voltage applied to the stator electrodes 57B-1 and 57B-2. FIG. 32C is a timing chart showing the pattern of the voltage applied to the stator electrodes 52A. FIG. 32D is a timing chart showing the pattern of the voltage applied to the stator electrodes 57A. FIG. 32E is a timing chart showing the pattern of the voltage applied to the stator electrodes 52C-1 and 52C-2. Further, FIG. 32F is a timing chart showing the pattern of the voltage applied to the stator electrodes 57C-1 and 57C-2.

A predetermined voltage is applied to each of the stator electrodes at the timings of t1 to t5 so as to move the movable section 3 in a desired direction.

(1) In the first step, voltage V [V] is applied to the stator electrodes 57B-1, 57B-2, 57A, 57C-1 and 57C-2 during the time period between time points t0 and t1 as shown in FIGS. 32B, 32D and 32F. As a result, the stator electrodes 51A-1, 51A-2, 51B, 51C-1 and 51C-2 are electrostatically attracted by the stator electrodes 57C-2, 57C-1, 57A, 57B-2 and 57B-1, respectively, as shown in FIG. 13A so as to permit the movable section 3 to be temporarily held on the side of the stator 2, with the stopper 9 on the lower surface of the movable section 3 brought into contact with the stator 2.

(2) In the next step, voltage V [V] is applied to the stator electrodes 52B-1, 52B-2, 57A, 52C-1 and 52C-2 during the time period between time points t1 and t2 as shown in FIGS. 32A, 32D and 32E. As a result, the movable section driving electrodes 50A-1, 50A-2, 50C-1, and 50C-2 are electrostatically attracted by the stator electrodes 52C-2, 52C-1, 52B-2 and 52B-1 so as to cause the movable section 3 to be swung in the clockwise direction about a point α. In this step, the movable section 3 is held temporarily, with the stoppers 9, 9 near the movable section driving electrode 50A-1 and 50A-2 kept in contact with the stator 1.

(3) Then, voltage V [V] is applied to the stator electrodes 52B-1, 52B-2, 52A, 52C-1 and 52C-2 during the time period between time points t2 and t3 as shown in FIGS. 32A, 32C and 32E. As a result, the movable section driving electrodes 50B, 50C-1 and 50C-2 are electrostatically attracted by the stator electrodes 52A, 52B-2 and 52B-1 so as to cause the movable section 3 to be swung in the counterclockwise direction about a point β, as shown in FIG. 13C. In this step, the movable section 3 is held temporarily, with the stopper 9 near the movable section driving electrodes 50B kept in contact with the stator 1. Under this condition, the movable section 3 is moved to the right in the drawing (backward direction) by a distance δ, compared with the movable section 3 shown in FIG. 13A.

(4) Further, voltage V [V] is applied to the stator electrodes 57B-1, 57B-2, 52A, 57C-1 and 57C-2 during the time period between time points t3 and t4 as shown in FIGS. 32B, 32C and 32F. As a result, the movable section driving electrodes 51A-1, 51A-2, 51C-1 and 51C-2 are electrostatically attracted by the stator electrodes 57C-2, 57C-1, 57B-2 and 57B-1 so as to cause the movable section 3 to be swung in the counterclockwise direction about a point γ. In this step, the movable section 3 is held temporarily, with the stopper 9 near the movable section driving electrodes 51A-1 and 51A-2 kept in contact with the stator 2.

(5) Still further, voltage V [V] is applied to the stator electrodes 57B-1, 57B-2, 57A, 57C-1 and 57C-2 during the time period between time points t4 and t5 as shown in FIGS. 32B, 32D and 32F. As a result, the movable section driving electrodes 51B is electrostatically attracted by the stator electrode 57A so as to cause the movable section 3 to be swung in the clockwise direction about a point ε. In this step, the movable section 3 is held temporarily, with the stoppers 9, 9 near the movable section driving electrode 51B kept in contact with the stator 2. Under this condition, the movable section 3 is moved to the right in the drawing (backward direction) by a distance 2δ, compared with the movable section 3 shown in FIG. 13A.

By the procedure of the voltage application described in items (1) to (5) given above, the movable section 3 is moved in a desired direction. It is possible to move the movable section to the right in FIG. 26 (backward direction) by a desired moving distance by repeating the procedure described in items (1) to (5) given above.

As described above, in the electrostatic actuator according to the seventh embodiment of the present invention, it is possible to enlarge the moving range of the movable section 3, compared with the conventional electrostatic actuator. It follows that it is possible to enlarge the range within which the focusing can be performed in the electrostatic actuator provided with a lens system. It should also be noted that the movable section 3 can be moved to any one of the stators more promptly than in the electrostatic actuator according to the first embodiment of the present invention by generating an electrostatic force between the stator electrodes 52B-1, 52B-2, 57B-1, 57B-2 and the movable section 3 so as to improve the response performance.

Eighth Embodiment

An electrostatic actuator according to an eighth embodiment of the present invention will now be described with reference to FIGS. 33 to 35B.

The electrostatic actuator according to the eighth embodiment of the present invention shown in FIGS. 33 to 35B differs from the electrostatic actuator according to the seventh embodiment of the present invention shown in FIGS. 26 to 29B in the shapes of the movable section driving electrodes and the stator electrodes.

Figure 33:
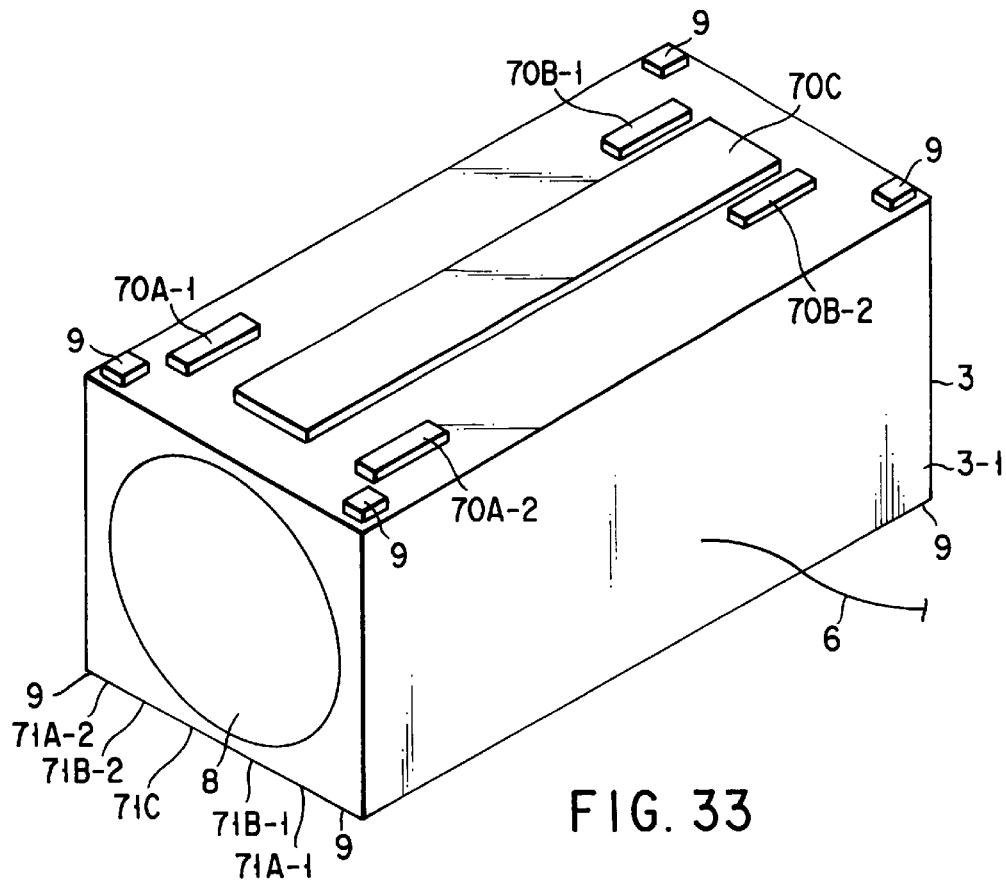
FIG. 33 is an oblique view schematically showing the construction of the movable section included in an electrostatic actuator according to an eighth embodiment of the present invention.
Figure 34A:
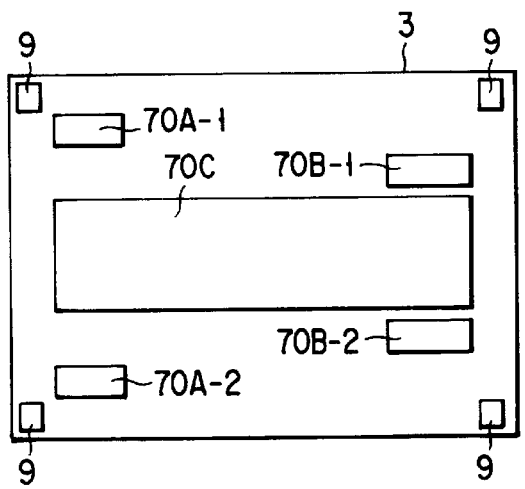
FIGS. 34A and 34B are plan views showing the upper surface and the lower surface, respectively, of the movable section shown in FIG. 33.
Figure 34B:
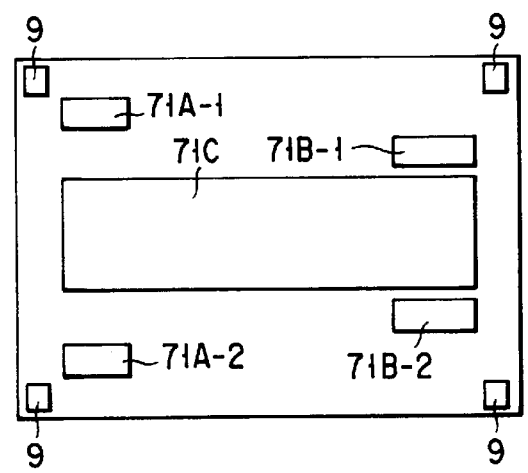

FIG. 33 is an oblique view showing the movable section included in the electrostatic actuator according to the eighth embodiment of the present invention. FIGS. 34A and 34B are plan views showing the upper surface and the lower surface, respectively, of the movable section 3 shown in FIG. 33. Further, FIGS. 35A and 35B are plan views showing the stators 1 and 2, respectively, of the electrostatic actuator shown in FIG. 33.

As shown in FIGS. 33, 34A and 34B, the movable section 3 includes a hollow support body 3-1, which is substantially in the shape of a parallelepiped and made of a conductive material or a resistive material. The support body 3-1 supports a lens system and has an optical path defined therein. A plurality of movable section driving electrodes 70C, 70A-1, 70A-2, 70B-1 and 70B-2 are formed on the surface of the support body 3-1. Also, stoppers 9 of the same size and same shape are mounted to project upward from the four corners on the surface of the support body 3-1. A grounded wiring 6 for removing the electric charge accumulated in the support body 3-1 is connected to the support body 3-1.

Oblong movable section driving electrodes 70A-1, 70A-2, 70B-1, 70B-2 and 70C are formed on the upper surface of the movable section 3 by selectively etching a conductive layer. These movable section driving electrodes 70A-1, 70A-2, 70B-1, 70B-2 and 70C are positioned apart from each other and extend in parallel in a predetermined direction. Each of the movable section driving electrodes 70A-1, 70A-2, 70B-1 and 70B-2 has a length smaller than half the length of the movable section 3. On the other hand, the movable section driving electrode 70C has a length substantially equal to the length of the movable section 3.

The movable section driving electrodes 70A-1 and 70A-2 are substantially equal to each other in the area, and the movable section driving electrodes 70B-1 and 70B-2 are also substantially equal to each other in the area. Also, the movable section fixing electrode 70C extends in a predetermined direction in the central region on the upper surface of the movable section 3. The movable section driving electrodes 70B-1 and 70B-2 are arranged on both side regions in the edge portion in the forward direction of the movable section fixing electrode 70C, and the movable section driving electrodes 70A-1 and 70A-2 are arranged on both side regions in the edge portion in the backward direction of the movable section fixing electrode 70C. The movable section driving electrodes 70B-1 and 70B-2 are arranged in symmetry with respect to the center line of the movable section fixing electrode 70C. Likewise, the movable section driving electrodes 70A-1 and 70A-2 are arranged in symmetry with respect to the center line of the movable section fixing electrode 70C.

Also, movable section driving electrodes 71A-1, 71A-2, 71B-1, 71B-2, a movable section fixing electrode 71C and stoppers 9 are formed on the lower surface of the movable section 3 in a manner to correspond to the movable section driving electrodes 70A-1, 70A-2, 70B-1, 70B-2, the movable section fixing electrode 70C and the stoppers 9 formed on the upper surface of the movable section 3.

The centers of the movable section driving electrodes 70A-1 and 70A-2 are equidistant from the center of gravity of the movable section 3. Also, the centers of the movable section driving electrodes 70B-1 and 70B-2 are equidistant from the center of gravity of the movable section 3. On the other hand, the center of the movable section fixing electrode 70C substantially coincides with the center of gravity of the movable section 3 in the vertical direction. Likewise, centers of the movable section driving electrodes 71A-1 and 71A-2 are equidistant from the center of gravity of the movable section 3. Also, the centers of the movable section driving electrodes 71B-1 and 71B-2 are equidistant from the center of gravity of the movable section 3. Further, the center of the movable section fixing electrode 71C substantially coincides with the center of gravity of the movable section 3 in the vertical direction.

As shown in FIG. 35A, four substantially oblong driving electrodes 72A-1, 72A-2, 72B-1, 72B-2 and a holding electrode 72C are formed on a glass surface in the stator 1. These driving electrodes 72A-1, 72A-2, 72B-1, 72B-2 and the holding electrode 72C are formed apart from each other and extend in parallel in a predetermined direction. The driving electrodes 72B-1 and 72B-2 are arranged on both sides of the holding electrode 72C, and the driving electrodes 72A-1 and 72A-2 are arranged outside the driving electrodes 72B-1 and 72B-2, respectively. These driving electrodes 72A-1, 72A-2, 72B-1, 72B-2 are formed substantially equal to each other in shape.

An electrode terminal 73 is connected to one end of the driving electrode 72A-1, and the driving electrode 72A-2 is connected to the other end of the driving electrode 72A-1. Also, an electrode terminal 74 is connected to one end of the driving electrode 72C. Further, an electrode terminal 75 is connected to one end of the driving electrode 72B-1, and the driving electrode 72B-2 is connected to the other end of the driving electrode 72B-1. These electrode terminals 73 to 75 are connected to a control unit 76. The control unit 76 includes a memory storing as a voltage pattern the value of the voltage applied to the driving electrodes 72A-1, 72A-2, 72B-1, 72B-2 and the holding electrode 72C and the timing of applying the voltage. Voltage is applied to each of the driving electrodes and the holding electrode in accordance with the voltage pattern stored in the memory of the control unit.

As shown in FIG. 35B, four substantially oblong driving electrodes 77A-1, 77A-2, 77B-1, 77B-2 and a holding electrode 77C are formed on a glass surface in the stator 2. These driving electrodes 77A-1, 77A-2, 77B-1, 77B-2 and the holding electrode 77C are formed apart from each other and extend in parallel in a predetermined direction. The driving electrodes 77B-1 and 77B-2 are arranged on both sides of the holding electrode 77C, and the driving electrodes 77A-1 and 77A-2 are arranged outside the driving electrodes 77B-1 and 77B-2, respectively. These driving electrodes 77A-1, 77A-2, 77B-1, 77B-2 are formed substantially equal to each other in shape.

An electrode terminal 78 is connected to one end of the driving electrode 77A-1, and the driving electrode 77A-2 is connected to the other end of the driving electrode 77A-1. Also, an electrode terminal 79 is connected to one end of the driving electrode 77C. Further, an electrode terminal 80 is connected to one end of the driving electrode 77B-1, and the driving electrode 77B-2 is connected to the other end of the driving electrode 77B-1. These electrode terminals 78 to 80 are connected to a control unit 76. The control unit 76 includes a memory storing as a voltage pattern the value of the voltage applied to the driving electrodes 77A-1, 77A-2, 77B-1, 77B-2 and the holding electrode 77C and the timing of applying the voltage. Voltage is applied to each of the driving electrodes and the holding electrode in accordance with the voltage pattern stored in the memory of the control unit.

The electrostatic actuator shown in FIGS. 33 to 35B is driven by the driving method substantially equal to the driving method of the electrostatic actuator according to the seventh embodiment of the present invention described previously. To be more specific, the movable section driving electrodes 70A-1, 70A-2, 70B-1, 70B-2, 71A-1, 71A-2, 71B-1 and 71B-2 correspond to the movable section driving electrodes 50A-1, 50A-2, 50B-1, 50B-2, 51A-1, 51A-2, 51B-1 and 51B-2, respectively, included in the electrostatic actuator according to the seventh embodiment of the present invention and, thus, a similar voltage pattern is applied to the movable section driving electrodes 70A-1, 70A-2, 70B-1, 70B-2, 71A-1, 71A-2, 71B-1 and 71B-2. The movable section fixing electrode 70C corresponds to the movable section driving electrodes 50C-1 and 50C-2 in the seventh embodiment and, thus, a similar voltage pattern is applied to thereto. Also, the movable section fixing electrode 71C corresponds to the movable section driving electrodes 51C-1 and 51C-2 in the seventh embodiment and, thus, a similar voltage pattern is applied to thereto.

Further, the movable section driving electrodes 72A-1, 72A-2, 72B-1 and 72B-2 correspond to the stator electrodes 52C-1, 52C-2, 52A-1 and 51A-2, respectively, included in the electrostatic actuator according to the seventh embodiment of the present invention and, thus, a similar voltage pattern is applied thereto. Also, the holding electrode 72C corresponds to the stator electrodes 52B-1 and 52B-2 in the seventh embodiment and, thus, a similar voltage pattern is applied thereto. Further, the holding electrode 77C corresponds to the stator electrodes 57B-1 and 57B-2 in the seventh embodiment and, thus, a similar voltage pattern is applied thereto.

It follows that the control unit 76 applies voltage to the electrode terminals 73 to 75 and 78 to 80 in accordance with the predetermined voltage pattern. As a result, an electrostatic force is generated as shown in FIGS. 11A to 11E and in FIGS. 13A to 13E so as to move the movable section in a desired direction. Attentions should be paid to FIGS. 31 to 32F referred to in conjunction with the seventh embodiment in respect of the voltage pattern for moving the movable section in a predetermined direction.

The eighth embodiment of the present invention described above permits broadening the range of the design of each electrode, compared with the seventh embodiment described previously. Also, since the centers of the movable section driving electrodes 70C and 71C are positioned on the vertical line passing through the center of gravity of the movable section 3, the movable section 3 can be moved between the stators 1 and 2 with an electrostatic force smaller than that in the seventh embodiment.

Ninth Embodiment

An electrostatic actuator according to an ninth embodiment of the present invention will now be described with reference to FIGS. 36 to 40B.

The electrostatic actuator according to the ninth embodiment of the present invention, which is shown in FIGS. 36 to 40B, comprises movable section driving electrodes and stator electrodes differing in shape from the movable section driving electrodes and the stator electrodes included in the electrostatic actuator according to the seventh embodiment of the present invention, which is shown in FIGS. 26 to 29B.

Figure 36:
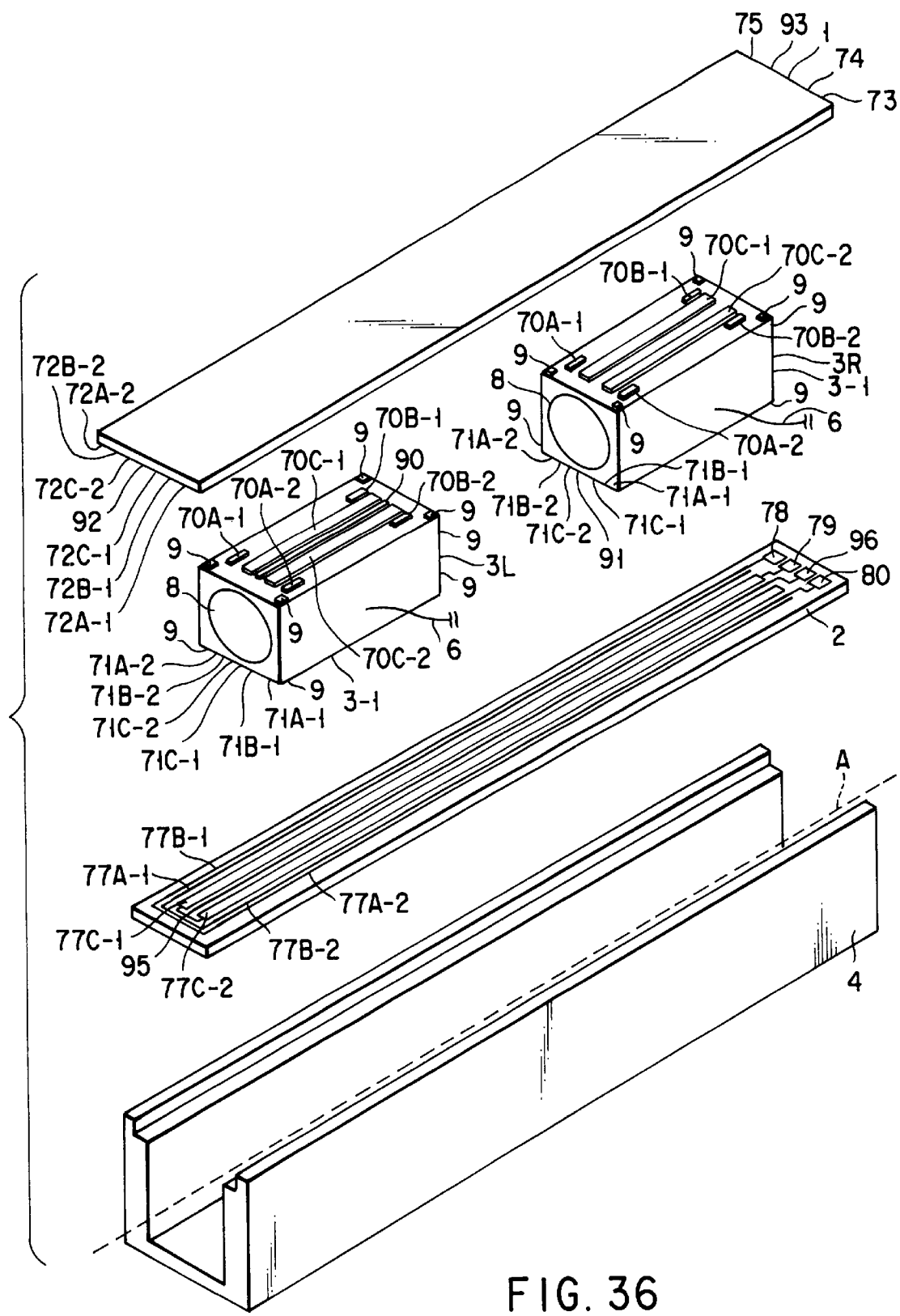
FIG. 36 is an oblique view schematically showing in a dismantled fashion the electrostatic actuator according to a ninth embodiment of the present invention.
Figure 37A:
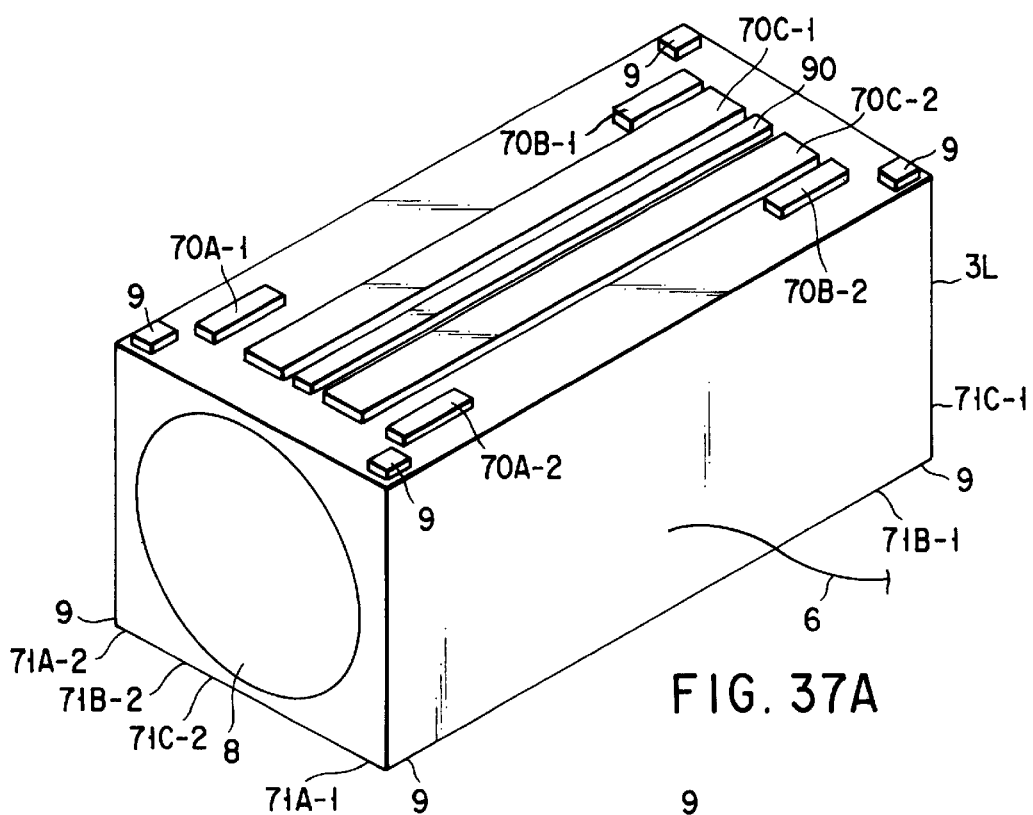
FIGS. 37A and 37B are side views showing the two movable sections included in the electrostatic actuator shown in FIG. 36.
Figure 37B:
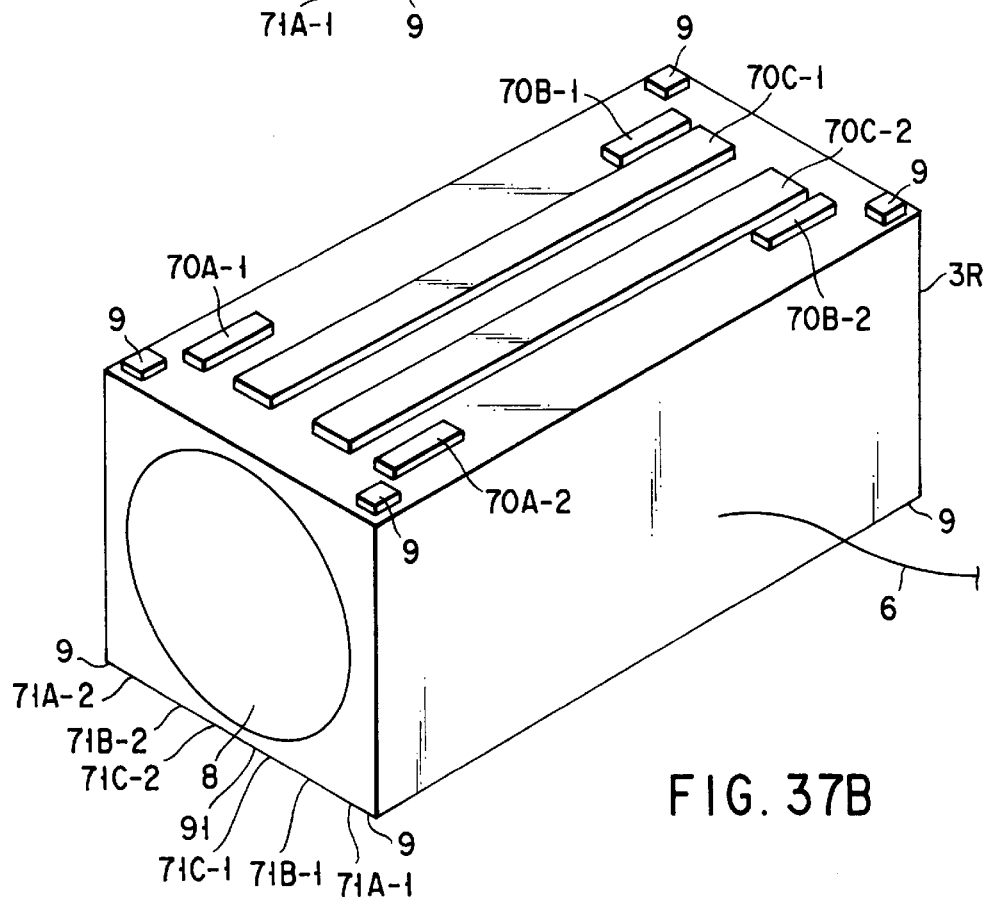
Figure 38A:
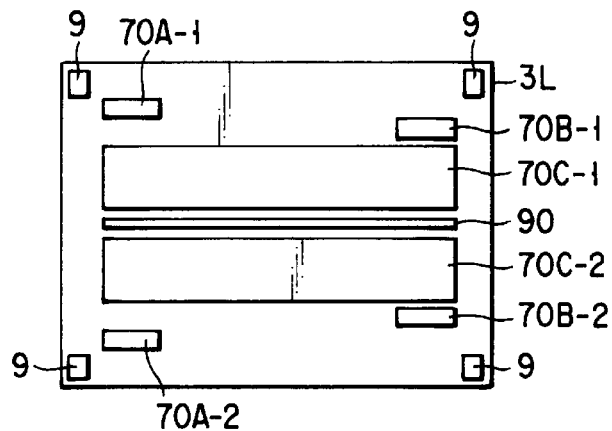
FIGS. 38A and 38B are plan views showing the upper surface and the lower surface, respectively, of one movable section shown in FIG. 37A.
Figure 38B:
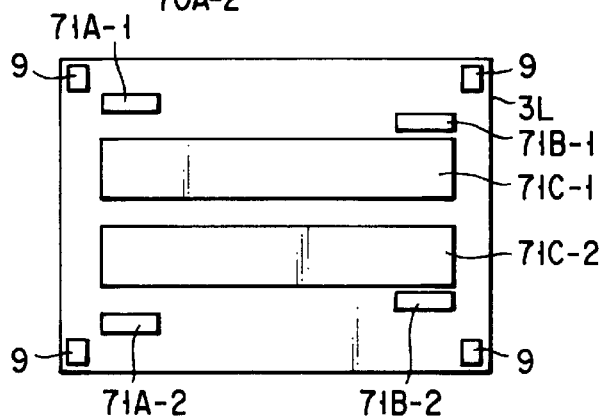
Figure 38C:
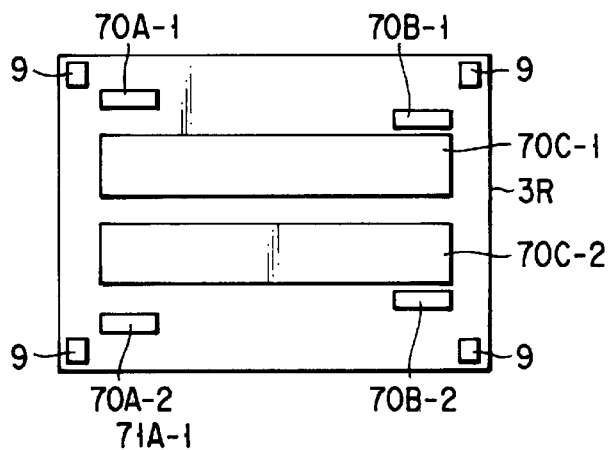
FIGS. 38C and 38D are plan views showing the upper surface and the lower surface, respectively, of the other movable section shown in FIG. 37B.
Figure 38D:
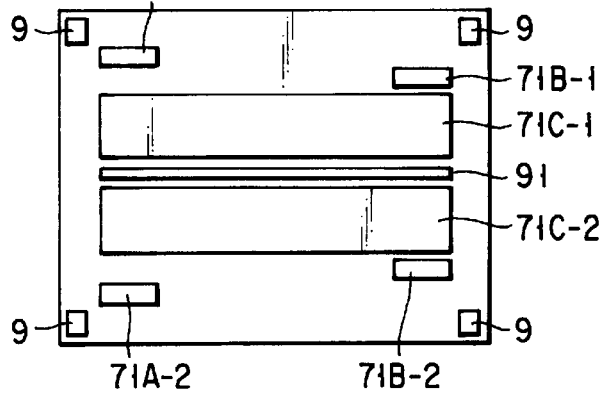
Figure 39A:
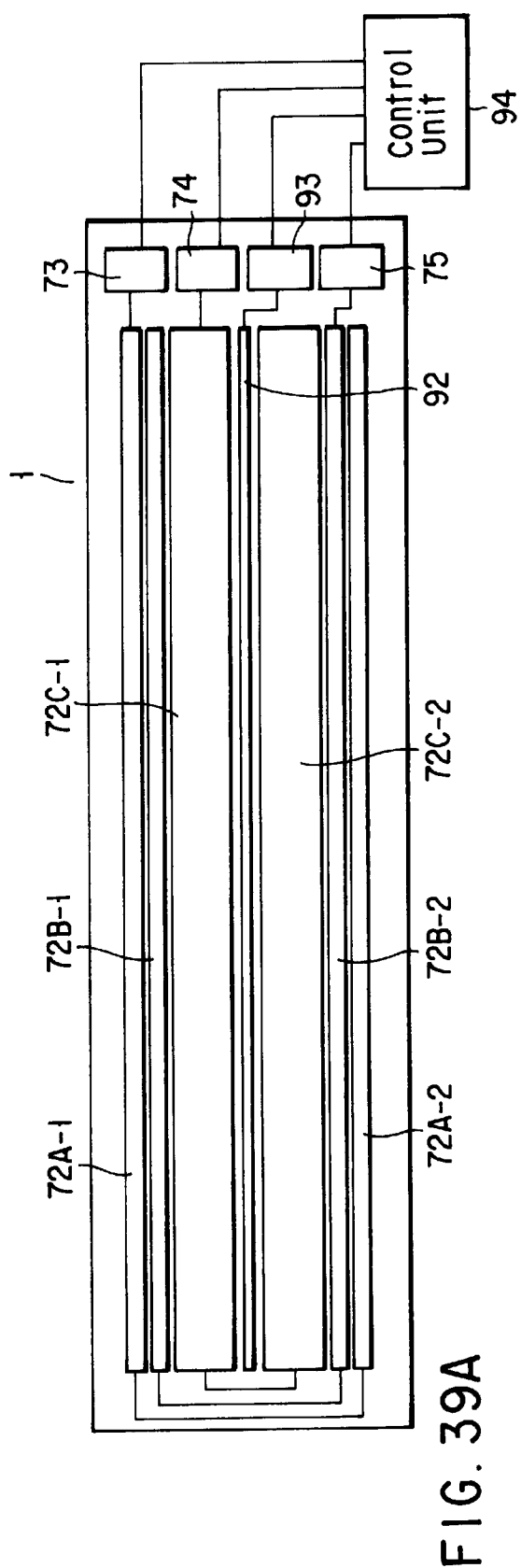
FIGS. 39A and 39B are plan views showing the stators included in the electrostatic actuator shown in FIG. 22.
Figure 39B:
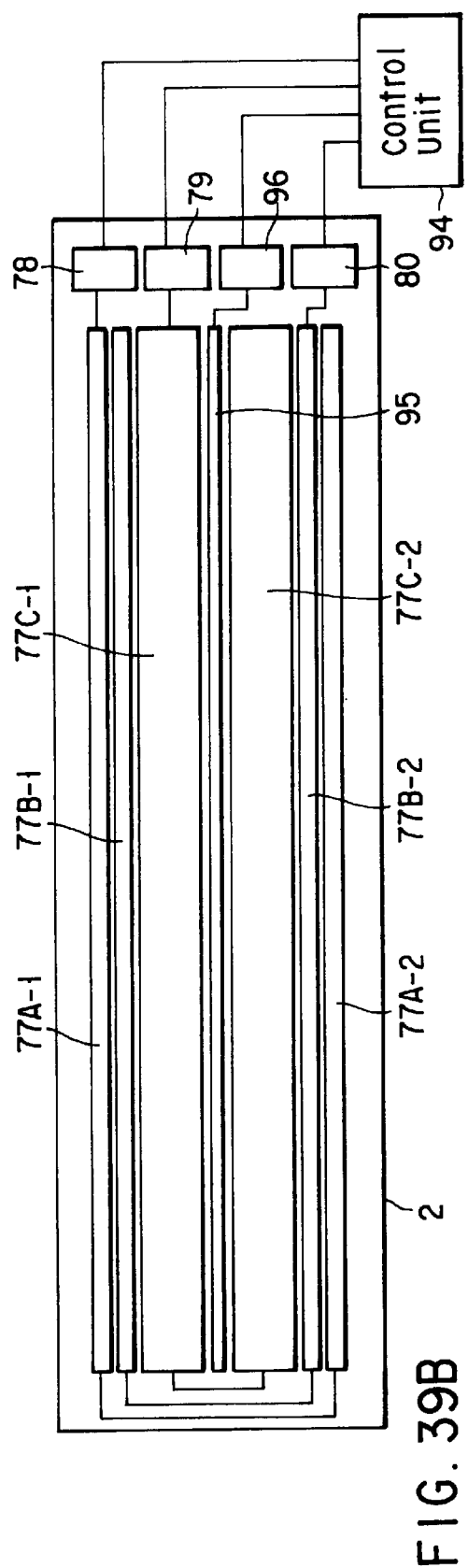

FIG. 36 is an oblique view showing in a dismantled fashion the construction of the movable section included in the electrostatic actuator according to the ninth embodiment of the present invention. FIGS. 37A and 37B are oblique views showing the first movable section 3L and the second movable section 3R, respectively, included in the electrostatic actuator shown in FIG. 36. FIGS. 38A and 38B are plan views showing the upper surface and the lower surface, respectively, of the first movable section 3L shown in FIG. 37A. FIGS. 38C and 38D are plan views showing the upper surface and the lower surface, respectively, of the second movable section 3R shown in FIG. 37B. Also, FIGS. 39A and 39B are plan views showing the stators 1 and 2, respectively, of the electrostatic actuator shown in FIG. 36.

As shown in FIG. 36, the electrostatic actuator according to the ninth embodiment of the present invention includes two movable sections 3L and 3R equal to those included in the eighth embodiment shown in FIG. 33.

As shown in FIGS. 36, 37A and 37B, each of the movable sections 3L and 3R includes a hollow support body 3-1 made of a conductive material or a resistive material. The support body 3-1 holds a lens system and has an optical path defined therein. A plurality of movable section driving electrodes 70A-1, 70A-2, 70B-1, 70B-2, 70C-1, 70C-2 and a movable section fixing electrode 90 are formed on the surface of the support body 3-1. Also, stoppers 9 of the same size and same shape are mounted to project upward from the four corners on the surface of the support body 3-1. A grounded wiring 6 for removing the electric charge accumulated in the support body 3-1 is connected to the support body 3-1.

Oblong movable section driving electrodes 70A-1, 70A-2, 70B-1, 70B-2, 70C-1, 70C-2 and the movable section fixing electrode 90 are formed on the upper surfaces of the movable sections 3L and 3R by selectively etching a conductive layer. These movable section driving electrodes 70A-1, 70A-2, 70B-1, 70B-2, 70C-1, 70C-2 and the movable section fixing electrode 90 are positioned apart from each other and extend in parallel in a predetermined direction. Each of the movable section driving electrodes 70A-1, 70A-2, 70B-1 and 70B-2 has a length smaller than half the length of the movable section 3. On the other hand, the movable section driving electrode 70C-1, 70C-2 and 90 has a length substantially equal to the length of the movable section 3.

The movable section driving electrodes 70A-1, 70A-2, 70B-1 and 70B-2 are substantially equal to each other in the area and shape, and the movable section driving electrodes 70C-1 and 70C-2 are also substantially equal to each other in the area and shape. Also, the movable section driving electrodes 70C-1 and 70C-2 extend in a predetermined direction in the central region on the upper surface of the movable section. The movable section driving electrodes 70B-1 and 70B-2 are arranged on both side regions in the edge portion in the forward direction of the movable section driving electrodes 70C-1 and 70C-2, and the movable section driving electrodes 70A-1 and 70A-2 are arranged on both side regions in the edge portion in the backward direction of the movable section driving electrodes 70C-1 and 70C-2. The movable section driving electrodes 70B-1 and 70B-2 are arranged in symmetry with respect to the center line between the movable section driving electrodes 70C-1 and 70C-2. Likewise, the movable section driving electrodes 70A-1 and 70A-2 are arranged in symmetry with respect to the center line between the movable section driving electrodes 70C-1 and 70-C. An oblong movable section fixing electrode 90 extending between the movable section driving electrodes 70A-1 and 70A-2 is formed on the upper surface of the movable section 3R.

Also, movable section driving electrodes 71A-1, 71A-2, 71B-1, 71B-2, movable section fixing electrodes 71C-1 and 71C-2 and stoppers 9 are formed on the lower surfaces of the movable sections 3L and 3R in a manner to correspond to the movable section driving electrodes 70A-1, 70A-2, 70B-1, 70B-2, the movable section fixing electrodes 70C-1, 70C-2 and the stoppers 9 formed on the upper surfaces of the movable sections 3L and 3R. Further, an oblong movable section fixing electrode 91 is formed between the movable section driving electrodes 71C-1 and 71C-2 on the lower surface of the movable section 3R.

FIG. 38A is an upper view of the movable section 3L shown in FIG. 37A, and FIG. 38B is an lower view of the movable section 3L shown in FIG. 37A. Likewise, FIG. 38C is an upper view of the movable section 3R shown in FIG. 37B, and FIG. 38D is a lower view of the movable section 3R shown in FIG. 37B. The centers of the movable section driving electrodes 70A-1 and 70A-2 are equidistant from the center of gravity of the movable section 3. Also, the centers of the movable section driving electrodes 70B-1 and 70B-2 are equidistant from the center of gravity of the movable section 3. On the other hand, the centers of the movable section fixing electrodes 90 and 91 substantially coincide with the center of gravity of the movable section 3 in the vertical direction.

The stators 1 and 2 shown in FIG. 36 will now be described with reference to FIGS. 39A and 39B. FIG. 39A is a plan view of the stator 1, and FIG. 39B is a plan view of the stator 2.

As shown in FIG. 39A, the driving electrodes 72A-2, 72A-1, 72B-2, 72B-1, 72C-2, 72C-1 and a holding electrode 92 are formed on a glass surface in the stator 1. These driving electrodes 72A-2, 72A-1, 72B-2, 72B-1, 72C-2, 72C-1 and the holding electrode 92C are formed apart from each other and extend in parallel in a predetermined direction. The holding electrode 92 is arranged in the central region. The driving electrodes 72C-1 and 72C-2 are arranged on both sides of the holding electrode 92, and the driving electrodes 72B-1 and 72B-2 are arranged outside the driving electrodes 72C-1 and 72C-2, respectively. These driving electrodes and the holding electrode 92 are formed substantially equal in length to the stator 1, and these driving electrodes are substantially equal to each other in shape.

An electrode terminal 73 is connected to one end of the driving electrode 72A-1, and the driving electrode 72A-2 is connected to the other end of the driving electrode 72A-1. Also, an electrode terminal 75 is connected to one end of the driving electrode 72B-2 and the driving electrode 72B-1 is connected to the other end of the driving electrode 72B-2. Further, an electrode terminal 74 is connected to one end of the driving electrode 72C-1, and the driving electrode 72C-2 is connected to the other end of the driving electrode 72C-1. Still further, an electrode terminal 93 is connected to the holding electrode 92.

As shown in FIG. 39B, the driving electrodes 77A-2, 77A-1, 77B-2, 77B-1, 77C-2, 77C-1 and a holding electrode 95 are formed on a glass surface in the stator 2. These driving electrodes 77A-2, 77A-1, 77B-2, 77B-1, 77C-2, 77C-1 and the holding electrode 95 are formed apart from each other and extend in parallel in a predetermined direction. The holding electrode 95 is arranged in the central region. On the other hand, the driving electrodes 77C-1 and 77C-2 are arranged on both sides of the holding electrode 95, and the driving electrodes 77B-1 and 77B-2 are arranged outside the driving electrodes 77C-1 and 77C-2, respectively. These driving electrodes and the holding electrode 95 are substantially equal in length to the stator 2 and are formed substantially equal to each other in shape.

An electrode terminal 78 is connected to one end of the driving electrode 77A-1, and the driving electrode 77A-2 is connected to the other end of the driving electrode 77A-1. Also, an electrode terminal 80 is connected to one end of the driving electrode 77B-2 and the driving electrode 77B-1 is connected to the other end of the driving electrode 77B-2. Further, an electrode terminal 79 is connected to one end of the driving electrode 77C-1, and the driving electrode 77C-2 is connected to the other end of the driving electrode 77C-1. Still further, an electrode terminal 96 is connected to the holding electrode 95.

In each of the movable sections 3L and 3R, the driving electrodes and the holding electrode 90 formed on the upper surface are substantially equal to each other in height. Likewise, the driving electrodes and the holding electrode 90 formed on the lower surface are substantially equal to each other in height.

The electrode terminals 73 to 75 and 93 and the electrode terminals 78 to 80 and 96 are connected to a control unit 94. The control unit 94 includes a memory storing as a voltage pattern the value of the voltage applied to the driving electrodes 72A-1, 72A-2, 72B-1, 72B-2, 72C-1, 72C-2, the holding electrode 92, the driving electrodes 77A-1, 77A-2, 77B-1, 77B-2, 77C-1, 77C-2 and the holding electrode 95 and the timing of applying the voltage. Voltage is applied to each of the driving electrodes and the holding electrode in accordance with the voltage pattern stored in the memory of the control unit.

The operation of the electrostatic actuator shown in FIGS. 36 to 39B will now be described.

Where the movable sections 3L and 3R are moved in a predetermined direction, there are four motion patterns as described below:

I. The case where both the movable sections 3L and 3R are moved to the left in FIG. 36 (forward direction).

II. The case where both the movable sections 3L and 3R are moved to the right in FIG. 36 (backward direction).

III. The case where the movable section 3L alone is moved to the left in FIG. 36 (forward direction) or to the right (backward direction), with the movable section 3R being fixed and not moved.

IV. The case where the movable section 3R alone is moved to the left in FIG. 36 (forward direction) or to the right (backward direction), with the movable section 3L being fixed and not moved.

The driving electrodes and the holding electrode to which voltage is applied from the control unit 94 differ depending on the motion patterns of cases I to IV given above. The particular relationship is shown in Table 4 below:

TABLE 4

| motion pattern | driving electrode 72A-1, 72A-2, 72B-1, 72B-2, 72C-1, 72C-2, 77A-1, 77A-2, 77B-1, 77B-2, 77C-1, 77C-2, | holding electrode | holding electrode |
|---|---|---|---|
| I | Use | nonuse | nonuse |
| II | Use | nonuse | nonuse |
| III | Use | nonuse | use |
| IV | Use | use | nonuse |

The motion patterns I and II will now be described first.

In each of the motion patterns I and II, it is possible to move the movable sections 3L and 3R in a predetermined direction under the voltage pattern equal to that described previously in conjunction with the eighth embodiment, if the voltage is controlled by the control unit 94 such that voltage is not applied to the holding electrodes 92 and 95.

Where the movable sections 3L and 3R are moved in accordance with the motion pattern I or II, the distance between the movable sections 3L and 3R before the start-up of the movement is maintained during the movement of the movable sections 3L and 3R.

The motion pattern III will now be described.

Since it is possible to move the movable section 3L alone with the movable section 3R held temporarily on the side of the stator 2, it is possible to move the movable section 3L alone in a desired direction in accordance with the motion pattern I or II.

Let us describe the case where the movable section 3R is temporarily held.

In the first step, voltage V [V] is applied to the holding electrode 95 of the stator 2. As a result, an electrostatic force is generated between the movable section fixing electrode 91 corresponding to the holding electrode 95 and the holding electrode 95. By the electrostatic force thus generated, the movable section 3R is attracted by the stator 2 so as to be brought into contact with the stopper 9 positioned closest to the movable section fixing electrode 91, with the result that the movable section 3R is temporarily held on the side of the stator 2.

Voltage is kept applied to the holding electrode 95 for the time during which it is desired to hold the movable section 3R on the side of the stator 2, i.e., the time during which the movable section 3L is being moved or longer than the particular time noted above.

Even if voltage is applied to, for example, the driving electrodes 72A-1, 72A-2, 72B-1, 72B-2, 72C-1 and 72C-2 on the side of the stator 1 while voltage is being applied to the holding electrode 95, the movable section 3R is kept maintained on the side of the stator 2. This is because the distance between the movable section 3R and the stator 1 is only tens and several microns and, thus, if the voltage applied to the driving electrodes on the side of the stator 1 is V [V], it is impossible to obtain an electrostatic force larger than the force with which the movable section 3R is held on the side of the stator 2.

Incidentally, the movable section 3L, which is moved, is moved within a range in which the movable section 3L is not brought into contact with the movable section 3R that is held temporarily.

Then, the motion pattern IV will now be described.

Since it is possible to move the movable section 3R alone with the movable section 3L held temporarily on the side of the stator 2, it is possible to move the movable section 3R alone in a desired direction in accordance with the motion pattern I or II.

Let us describe the case where the movable section 3L is temporarily held.

In the first step, voltage V [V] is applied to the holding electrode 92 of the stator 1. As a result, an electrostatic force is generated between the movable section fixing electrode 90 corresponding to the holding electrode 92 and the holding electrode 92. By the electrostatic force thus generated, the movable section 3L is attracted by the stator 1 so as to be brought into contact with the stoppers 9, 9 positioned closest to the movable section fixing electrode 90, with the result that the movable section 3L is temporarily held on the side of the stator 1.

Voltage is kept applied to the holding electrode 92 for the time during which it is desired to hold the movable section 3L, i.e., the time during which the movable section 3R is being moved or longer than the particular time noted above.

Even if voltage is applied to, for example, the driving electrodes 72A-1, 72A-2, 72B-1, 72B-2, 72C-1 and 72C-2 on the side of the stator 2 while voltage is being applied to the holding electrode 92, the movable section 3L is kept maintained on the side of the stator 1. This is because the distance between the movable section 3L and the stator 2 is only tens and several microns and, thus, if the voltage applied to the driving electrodes on the side of the stator 2 is V [V], it is impossible to obtain an electrostatic force larger than the force with which the movable section 3L is held on the side of the stator 1.

Incidentally, the movable section 3R, which is moved, is moved within a range in which the movable section 3R is not brought into contact with the movable section 3L that is held temporarily.

As described above, in the ninth embodiment of the present invention, it is of course possible to move the movable sections 3L and 3R within a range broader than that in prior art. In addition, it is possible to perform the focusing of the image formed by the lens 8 and to magnify or reduce the image by moving the movable sections 3L and 3R simultaneously or by moving any one alone of the movable sections 3L and 3R. Further, it is possible to move the movable sections 3L and 3R promptly between the stators 1 and 2.

Tenth Embodiment

An electrostatic actuator according to a tenth embodiment of the present invention will now be described with reference to FIGS. 40A and 40B.

In the electrostatic actuator according to the tenth embodiment of the present invention each of the stator electrodes 5A-1, 5A-2, 5A-3, 5B-1, 5B-2 and 5B-3 in the first embodiment is separated into two electrode segments.

Figure 40A:
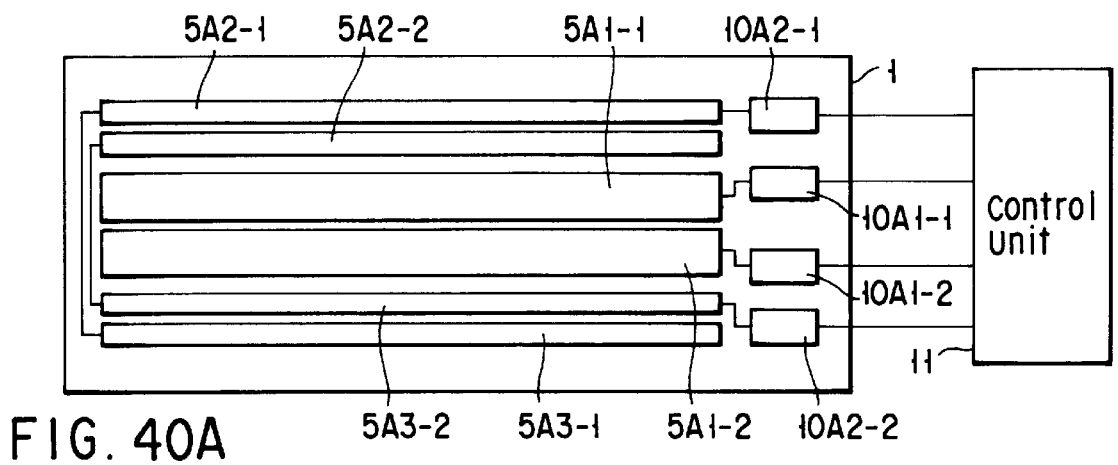
FIGS. 40A and 40B are plan views each showing the stator included in the electrostatic actuator according to a tenth embodiment of the present invention.
Figure 40B:
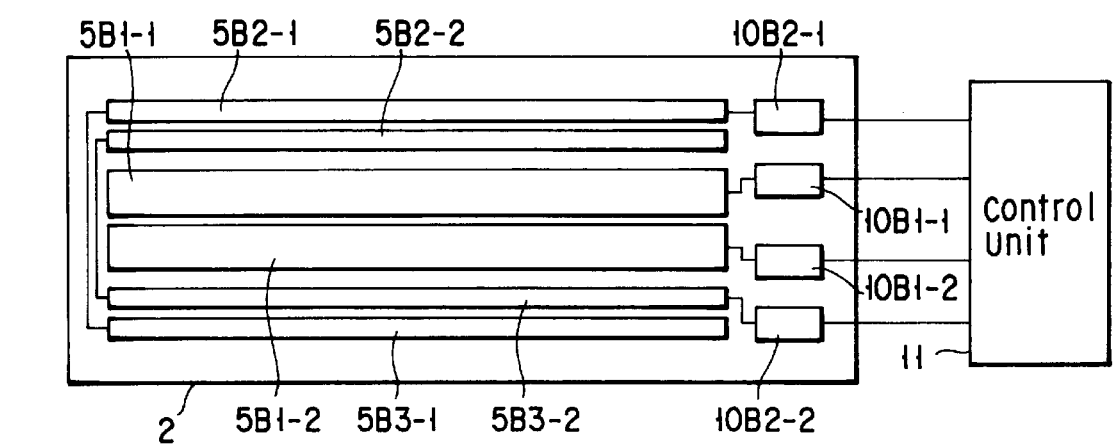

FIG. 40A is a plan view of the stator 1, and FIG. 40B is a plan view of the stator 2. It should be noted that the stator electrodes are formed on those surfaces of the stators 1 and 2 which are positioned to face each other.

As shown in FIG. 40A, each of the stator electrodes 5A-1, 5A-2 and 5A-3 is divided into two segments in the stator 1 in a predetermined direction (extending direction), and six stator electrode segments 5A1-1, 5A1-2, 5A2-1, 5A2-2, 5A3-1 and 5A3-2 are formed on the surface of the stator 1.

Incidentally, the stator electrode segments 5A1-1 and 5A1-2 are equal to each other in the area. The stator electrode segments 5A2-1 and 5A2-2 are equal to each other in the area. Further, the stator electrode segments 5A3-1 and 5A3-2 are equal to each other in the area.

Further, an electrode terminal 10A2-1 is connected to one end of the stator electrode segment 5A2-1, and the stator electrode segment 5A3-1 is connected to the other end of the stator electrode segment 5A1-1. Also, an electrode terminal 10A1-1 is connected to one end of the stator electrode segment 5A1-1, and the electrode terminal 10A1-1 is connected to the stator electrode segment 5A1-1. Further, an electrode terminal 10A2-2 is connected to one end of the stator electrode segment 5A3-2, and the stator electrode segment 5A2-2 is connected to the other end of the stator electrode segment 5A3-2. Each of these electrode terminals 10A1-1, 10A1-2, 10A2-1 and 10A2-2 is connected to a control unit 11.

On the other hand, as shown in FIG. 40B, each of the stator electrodes 5B-1, 5B-2 and 5B-3 is divided into two segments in the stator 2 in a predetermined direction (extending direction), and six stator electrode segments 5B1-1, 5B1-2, 5B2-1, 5B2-2, 5B3-1 and 5B3-2 are formed on the surface of the stator 2. Incidentally, the stator electrode segments 5B1-1 and 5B1-2 are equal to each other in the area. The stator electrode segments 5B2-1 and 5B2-2 are equal to each other in the area. Further, the stator electrode segments 5B3-1 and 5B3-2 are equal to each other in the area.

Further, an electrode terminal 10B-2-1 is connected to one end of the stator electrode segment 5B2-1, and the stator electrode segment 5B3-1 is connected to the other end of the stator electrode segment 5B1-1. Also, an electrode terminal 10B-1-1 is connected to the stator electrode segment 5B1-1, and the electrode terminal 10B-1-1 is connected to the stator electrode segment 5B1-2. Further, an electrode terminal 10B-2-2 is connected to one end of the stator electrode segment 5B3-2, and the stator electrode segment 5B2-2 is connected to the other end of the stator electrode segment 5B3-2. Each of these electrode terminals 10B-1-1, 10B-1-2, 10B-2-1 and 10B-2-2 is connected to a control unit 11.

The operation will now be described, covering the case where the movable section is moved in a predetermined direction.

Figure 41:
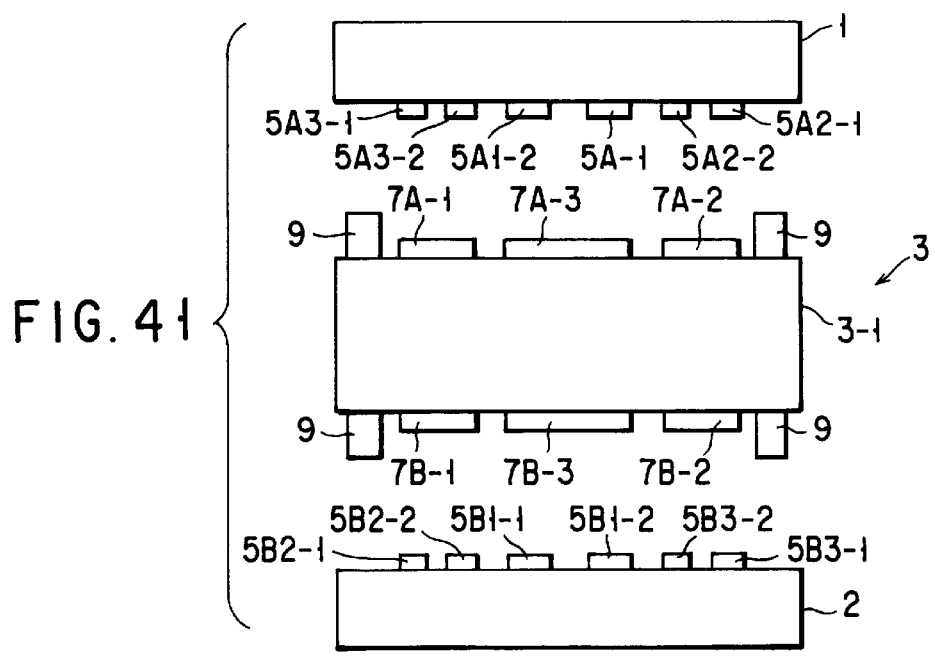
FIG. 41 is a front view showing the electrostatic actuator according to the tenth embodiment of the present invention as viewed in the moving direction.
Figure 42A:
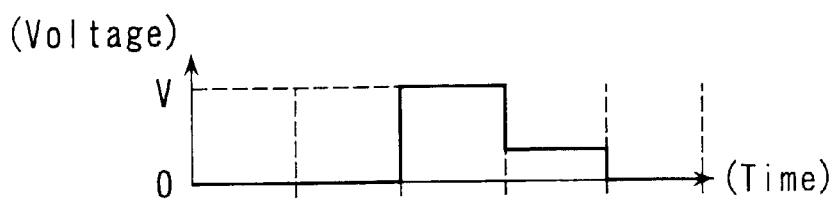
FIGS. 42A to 42H are timing charts each showing the relationship between the voltage applied to the stator electrode of the electrostatic actuator shown in FIG. 41 and time, covering the case where the movable section is moved to the right.
Figure 42B:
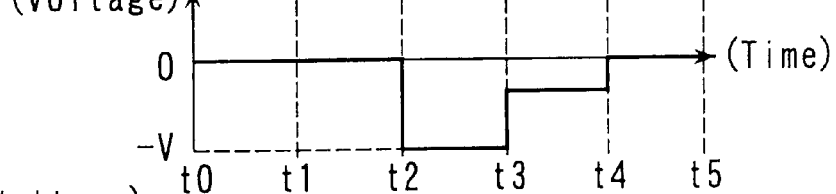
Figure 42C:
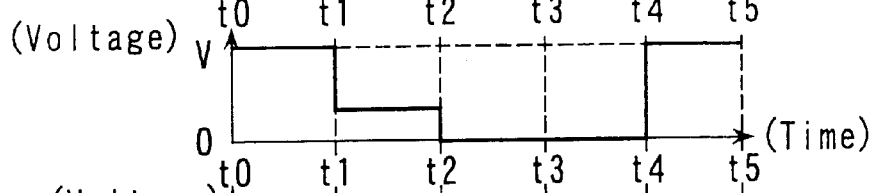
Figure 42D:
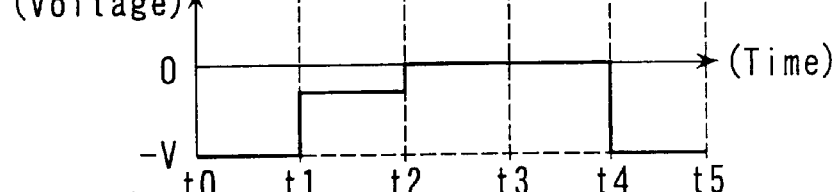
Figure 42E:
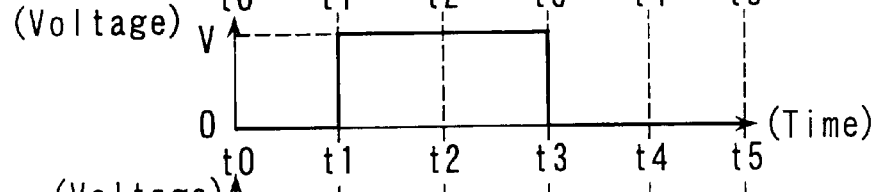
Figure 42F:
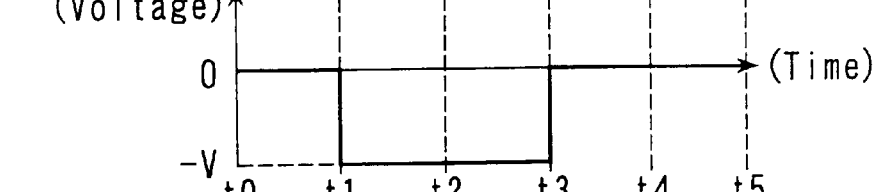
Figure 42G:
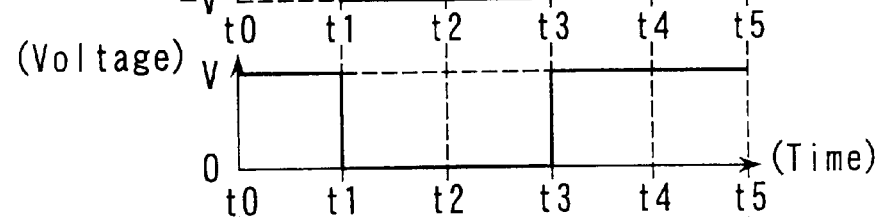

FIG. 41 is a front view of the electrostatic actuator as viewed in the moving direction. FIG. 42A shows the voltage pattern of the voltage applied to the stator electrode segments 5A2-2 and 5A3-2. FIG. 42B shows the voltage pattern of the voltage applied to the stator electrode segments 5A2-1 and 5A3-1. FIG. 42C shows the voltage pattern of the voltage applied to the stator electrode segments 5B3-2 and 5B2-2. FIG. 42D shows the voltage pattern of the voltage applied to the stator electrode segments 5B3-1 and 5B2-1. FIG. 42E shows the voltage pattern of the voltage applied to the stator electrode segments 5A1-1. FIG. 42F shows the voltage pattern of the voltage applied to the stator electrode segments 5A1-2. FIG. 42G shows the voltage pattern of the voltage applied to the stator electrode segments 5B1-1. Further, FIG. 42H shows the voltage pattern of the voltage applied to the stator electrode segments 5B1-2.

Figure 42H:
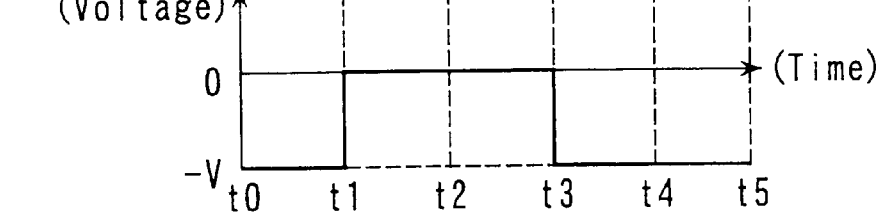

(1) In the first step, voltage V [V] is applied to the stator electrode segments 5A2-1, 5A3-1, 5B3-2, 5B3-2 and 5B1-1 as shown in FIGS. 42B, 42C, 42F and 42G, and voltage V [V] is also applied to the stator electrode segments 5B3-1, 5B2-1 and 5B1-2 as shown in FIGS. 42D and 42H during the time period between time points t0 and t1. As a result, the movable section driving electrodes 7B-2, 7B-1 and 7B-3 are electrostatically attracted by the stator electrode segments 5B2-1, 5B2-2, 5B1-1, 5B1-2, 5B3-1 and 5B3-2, with the result that the movable section 3 is temporarily held on the side of the stator 2 under the state that the stopper 9 on the lower surface of the movable section 3 is brought into contact with the stator 2.

During the time period between the time points t0 and t1, a line of electric force is formed to extend from the stator electrode segment 5B3-2 to reach the segment 5B3-1. Similarly, a line of electric force is formed to extend from the stator electrode segment 5B2-2 to reach the segment 5B2-1, and a line of electric force is also formed to extend from the stator electrode segment 5B1-1 to reach the segment 5B1-2.

(2) In the next step, voltage V [V] is applied to the stator electrode segments 5A2-1 and 5A3-1 as shown in FIG. 42B, voltage 2/3V [V] is applied to 5B3-2 and 5B3-2 as shown in FIG. 42C, voltage −1/3V [V] is applied to stator electrode segments 5B3-1 and 5B3-2 as shown in FIG. 42D, voltage V [V] is applied to the stator electrode segment 5A1-1 as shown in FIG. 42E, and voltage −V [V] is also applied to the stator electrode segments 5A1-2 as shown in FIG. 42F during the time period between time points t1 and t2. As a result, the movable section driving electrodes 7A-3 is electrostatically attracted by the stator electrode segments 5A1-1 and 5A1-2, with the result that the movable section 3 is swung about a point α in the counterclockwise direction. It follows that the movable section 3 is temporarily held under the state the stoppers 9, 9 positioned close to the movable section driving electrode 7A-3 are kept in contact with the stator 1.

During the time period between the time points t1 and t2, a line of electric force is formed to extend from the stator electrode segment 5B3-2 to reach the segment 5B3-1. Similarly, a line of electric force is formed to extend from the stator electrode segment 5B2-2 to reach the segment 5B2-1, and a magnetic line of force is also formed to extend from the stator electrode segment 5A1-1 to reach the segment 5A1-2.

(3) In the next step, voltage V [V] is applied to the stator electrode segments 5A2-2, 5A3-2 and 5A1-1 as shown in FIG. 42A, and voltage −V [V] is applied to the stator electrode segments 5A2-1, 5A3-1 and 5A1-2 as shown in FIGS. 42B and 42F during the time period between time points t2 and t3. As a result, the movable section driving electrodes 7A-1 and 7A-2 are electrostatically attracted by the stator electrode segments 5A2-1, 5A2-2, 5A3-1 and 5A3-2, with the result that the movable section 3 is swung about a point β in the clockwise direction. Also, the movable section 3 is temporarily held under the state that the stoppers 9, 9 positioned close to the movable section driving electrodes 7A-1 and 7A-2, respectively, are brought into contact with the stator 1. Under this state, the movable section 3 is moved to the left in FIG. 36 (forward direction) by a distance δ relative to the position of the uppermost stage movable section 3.

During the time period between the time points t2 and t3, a line of electric force is formed to extend from the stator electrode segment 5A2-2 to reach the segment 5A2-1. Similarly, a line of electric force is formed to extend from the stator electrode segment 5A3-2 to reach the segment 5A3-1, and a line of electric force is also formed to extend from the stator electrode segment 5A1-1 to reach the segment 5A1-2.

(4) In the next step, voltage 1/3V [V] is applied to the stator electrode segments 5A2-2 and 5A3-2 as shown in FIG. 42A, voltage −1/3V [V] is applied to 5A2-1 and 5A3-1 as shown in FIG. 42B, voltage V [V] is applied to stator electrode segments 5B1-1 as shown in FIG. 42G, and voltage V [V] is applied to stator electrode segments 5B1-1 as shown in FIG. 42H during the time period between time points t3 and t4. As a result, the movable section driving electrodes 7B-3 is electrostatically attracted by the stator electrode segments 5B1-1 and 5B1-2, with the result that the movable section 3 is swung about a point γ in the clockwise direction. It follows that the movable section 3 is temporarily held under the state the stopper 9 positioned close to the movable section driving electrode 7B-3 is kept in contact with the stator 2.

During the time period between the time points t3 and t4, a line of electric force is formed to extend from the stator electrode segment 5A2-2 to reach the segment 5A2-1. Similarly, a line of electric force is formed to extend from the stator electrode segment 5A3-2 to reach the segment 5A3-1, and a line of electric force is also formed to extend from the stator electrode segment 5B1-1 to reach the segment 5B1-2.

(5) Further, voltage V [V] is applied to the stator electrode segments 5A2-1, 5A3-1, 5B3-2 and 5A2-2 as shown in FIGS. 42B and 42C, voltage −V [V] is applied to 5A3-1 and 5B2-1 as shown in FIG. 42D, voltage V [V] is applied to stator electrode segment 5B1-1 as shown in FIG. 42G, and voltage −V [V] is applied to stator electrode segments 5B1-2 as shown in FIG. 42H during the time period between time points t4 and t5. As a result, the movable section driving electrodes 7B-1 and 7B-2 are electrostatically attracted by the stator electrode segments 5B2-1, 5B2-2, 5B3-1 and 5B1-2, with the result that the movable section 3 is swung about a point ε in the counterclockwise direction. It follows that the movable section 3 is temporarily held under the state the stopper 9 positioned close to the movable section driving electrodes 7B-1 and 7B-2 is kept in contact with the stator 2. Under this state, the movable section 3 is moved to the left in FIG. 36 (forward direction) by a distance 2δ relative to the position of the movable section 3 shown in FIG. 11A.

During the time period between the time points t4 and t5, a line of electric force is formed to extend from the stator electrode segment 5B3-2 to reach the segment 5B3-1. Similarly, a line of electric force is formed to extend from the stator electrode segment 5B2-2 to reach the segment 5A2-1, and a line of electric force is also formed to extend from the stator electrode segment 5B1-1 to reach the segment 5B1-2.

The movable section is moved in a predetermined direction by the procedure of the voltage application described in items (1) to (5) given above. Then, the movable section 3 is moved to the left in FIG. 36 (forward direction) by a desired moving distance by repeating the procedure given in items (1) to (5).

After the movable section 3 is moved by a desired distance, the light incident on the lens is focused in a predetermined position by a plurality of lenses mounted within the movable section so as to obtain a video signal by, for example, a CCD camera arranged in the predetermined position.

As described above, in the electrostatic actuator according to the tenth embodiment of the present invention, the stator electrode corresponding to a single movable section driving electrode is divided into two segments. It should be noted that the movable section can be moved in a predetermined direction more promptly by applying voltages equal to each other in the magnitude and opposite to each other in the polarity to the divided stator electrode segments.

Needless to say, the present invention is not limited to each of the embodiments described above and can be worked in variously modified fashions within the technical scope of the present invention. For example, it is possible to arrange three or more movable sections in the electrostatic actuator of the present invention in order to obtain a desired magnification in place of arranging a single movable section or two movable sections as in the embodiments described above.

Also, in each of the embodiments of the present invention described above, the voltage pattern such as the voltage applied to the stator electrodes and the holding electrodes and the timing of applying the voltage is stored in the control unit. However, it is also possible to operate the electrostatic actuator by allowing the external apparatus such as an electronic apparatus (a personal computer or a remote controller) to output a control signal (voltage pattern) by a wireless system and by allowing the receiving section of various apparatuses having the electrostatic actuator arranged therein to receive the control signal.

Additional advantages and modifications will readily occur to those skilled in the art. Therefore, the present invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electrostatic actuator, comprising:
   a first stator provided with a first group including first, second and third stator electrodes extending substantially in a predetermined direction, the first stator electrode of the first group being arranged between the second and third stator electrodes of the first group and electrically isolated from the second and third stator electrodes of the first group, and the second and third stator electrodes of the first group being electrically connected to each other;
   a second stator arranged to face the first stator with a space therebetween, and provided with a second group including first, second and third stator electrodes extending substantially along the predetermined direction, the first stator electrode of the second group being arranged between the second and third stator electrodes of the second group and being electrically isolated from the second and third stator electrodes of the second group, and the second and third stator electrodes of the second group being electrically connected to each other;
   a movable section located in the space to be movable along the predetermined direction and having first and second electrode surfaces which include first and second center regions and are faced to the first and second stators, respectively, the movable section comprising a third group including first, second and third movable section electrodes and extending on the first electrode surfaces substantially in the predetermined direction, and a fourth groups including first, second and third movable section electrodes and extending on the second electrode surface substantially in the predetermined direction, the first centers of the first movable section electrodes of the third and fourth groups being so positioned as to deviate from the first and second center regions in one side of the predetermined direction, respectively, and the second and third centers of the second and third electrodes of the third and fourth groups being so positioned as to deviate from the first and second center regions in the other side of the predetermined direction, respectively.

2. The electrostatic actuator according to claim 1, wherein the first movable section electrodes of the third and fourth groups extend from the first and second center regions in the one side of the predetermined direction, respectively, and the second and third movable section electrodes of the third and fourth groups extend from the first and second center regions in the other side of the predetermined direction, respectively.

3. The electrostatic actuator according to claim 1, wherein the movable section comprises first and second groups of stoppers configured to prevent the third and fourth groups from directly contacting the first and second groups, respectively.

4. The electrostatic actuator according to claim 3, wherein each of the first and second electrode surfaces includes corner regions, the stoppers of the first group are mounted on the corner regions of the first electrode surface, and the stoppers of the second group are mounted on the corner regions of the second electrode surface.

5. The electrostatic actuator according to claim 1, wherein the first, second and third stator electrodes of the first and second groups have substantially same length and same width.

6. The electrostatic actuator according to claim 1, wherein the movable section has a longitudinal length along the predetermined direction, and the first, second and third movable section electrodes of the third and fourth groups have substantially half the longitudinal length of the movable section.

7. The electrostatic actuator according to claim 1, wherein the movable section includes a hollow support body and a lens system having an optical axis, the lens system being so arranged in the hollow support body as to align the optical axis with the predetermined direction.

8. The electrostatic actuator according to claim 1, further comprising a control unit configured to apply driving signal to the first, second and third stator electrodes of the first and second groups, the movable section being subjected to tilting and deviating motions repeatedly in the space in response to the driving signal so that the movable section is shifted along the predetermined direction.

9. The electrostatic actuator according to claim 1, further comprising a guiding mechanism configured to guide the movable section along the predetermined direction and prevent the movable section from being rotated around the predetermined direction.

10. The electrostatic actuator according to claim 1, further comprising:

a second movable section located apart from the first movable section in the space to be movable in the predetermined direction and having third and fourth electrode surfaces which include first and second center regions and are faced to the first and second stators, respectively, the second movable section including a fifth group including fourth, fifth and sixth movable section electrodes and extending on the third electrode surface substantially in the predetermined direction, and a sixth groups including fourth, fifth and sixth movable section electrodes and extending on the fourth electrode surfaces substantially in the predetermined direction, the fourth centers of the fourth movable section electrodes of the fifth and sixth groups being so positioned as to deviate from the third and fourth center regions in one side of the predetermined direction, respectively, and the fifth and sixth centers of the fifth and sixth electrodes of the fifth and sixth groups being so positioned as to deviate from the third and fourth center regions in the other side of the predetermined direction, respectively.

11. The electrostatic actuator according to claim 10, wherein the second movable section comprises third and fourth groups of stoppers configured to prevent the third and fourth groups from directly contacting the first and second groups, respectively.

12. The electrostatic actuator according to claim 11, wherein each of the third and fourth electrode surfaces includes corner regions, the stoppers of the third group are mounted on the corner regions of the third electrode surface, and the stoppers of the fourth group are mounted on the corner regions of the fourth electrode surface.

13. The electrostatic actuator according to claim 10, wherein the movable section has a longitudinal length along the predetermined direction, and the fourth, fifth and sixth movable section electrodes of the fifth and sixth groups have substantially half the longitudinal length of the second movable section.

14. The electrostatic actuator according to claim 10, wherein the second movable section includes a hollow support body and a lens system having an optical axis, the lens system being so arranged in the hollow support body as to align the optical axis with the predetermined direction.

* * * * *